US010754981B2

(12) United States Patent
Barday et al.

(10) Patent No.: US 10,754,981 B2
(45) Date of Patent: *Aug. 25, 2020

(54) DATA PROCESSING SYSTEMS FOR FULFILLING DATA SUBJECT ACCESS REQUESTS AND RELATED METHODS

(71) Applicant: OneTrust, LLC, Atlanta, GA (US)

(72) Inventors: Kabir A. Barday, Atlanta, GA (US); Jason L. Sabourin, Brookhaven, GA (US); Jonathan Blake Brannon, Smyrna, GA (US); Mihir S. Karanjkar, Marietta, GA (US); Kevin Jones, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,348

(22) Filed: Feb. 14, 2020

(65) Prior Publication Data

US 2020/0184104 A1 Jun. 11, 2020

Related U.S. Application Data

(63) Continuation of application No. 16/659,437, filed on Oct. 21, 2019, now Pat. No. 10,565,397, which is a
(Continued)

(51) Int. Cl.
*G06F 9/44* (2018.01)
*G06F 21/62* (2013.01)
(Continued)

(52) U.S. Cl.
CPC .......... *G06F 21/6245* (2013.01); *G06F 21/31* (2013.01); *G06K 9/00442* (2013.01); *G06F 2221/2141* (2013.01)

(58) Field of Classification Search
CPC .. G06F 21/6245; G06F 21/31; G06K 9/00442
See application file for complete search history.

(56) References Cited

U.S. PATENT DOCUMENTS

| 4,536,866 A | 8/1985 | Jerome et al. |
| 5,193,162 A | 3/1993 | Bordsen et al. |

(Continued)

FOREIGN PATENT DOCUMENTS

| EP | 1394698 | 3/2004 |
| EP | 2031540 | 3/2009 |

(Continued)

OTHER PUBLICATIONS

Muhammad Imran and Helmut Hlavacs, Searching in Cloud Object Storage by Using a Metadata Model, IEEE, 2014, retrieved online on Apr. 1, 2020, pp. 121-128. Retrieved from the Internet: <URL: https://ieeexplore.ieee.org/stamp/stamp.jsp?>. (Year: 2013).*

(Continued)

*Primary Examiner* — Hanh Thi-Minh Bui
(74) *Attorney, Agent, or Firm* — Brient IP Law, LLC

(57) ABSTRACT

In particular embodiments, in response a data subject submitting a request to delete their personal data from an organization's systems, the system may: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems).

19 Claims, 50 Drawing Sheets

Related U.S. Application Data continuation-in-part of application No. 16/410,566, filed on May 13, 2019, now Pat. No. 10,452,866, which is a continuation-in-part of application No. 16/055,083, filed on Aug. 4, 2018, now Pat. No. 10,289,870, which is a continuation-in-part of application No. 15/996,208, filed on Jun. 1, 2018, now Pat. No. 10,181,051, which is a continuation-in-part of application No. 15/853,674, filed on Dec. 22, 2017, now Pat. No. 10,019,597, which is a continuation-in-part of application No. 15/619,455, filed on Jun. 10, 2017, now Pat. No. 9,851,966, which is a continuation-in-part of application No. 15/254,901, filed on Sep. 1, 2016, now Pat. No. 9,729,583.

(60) Provisional application No. 62/360,123, filed on Jul. 8, 2016, provisional application No. 62/353,802, filed on Jun. 23, 2016, provisional application No. 62/348,695, filed on Jun. 10, 2016, provisional application No. 62/541,613, filed on Aug. 4, 2017, provisional application No. 62/537,839, filed on Jul. 27, 2017, provisional application No. 62/547,530, filed on Aug. 18, 2017.

(51) Int. Cl.
*G06K 9/00* (2006.01)
*G06F 21/31* (2013.01)

(56) References Cited

U.S. PATENT DOCUMENTS

| | | |
|---|---|---|
| 5,276,735 A | 1/1994 | Boebert et al. |
| 5,404,299 A | 4/1995 | Tsurubayashi et al. |
| 5,535,393 A | 7/1996 | Reeve et al. |
| 5,560,005 A | 9/1996 | Hoover et al. |
| 5,668,986 A | 9/1997 | Nilsen et al. |
| 5,761,529 A | 6/1998 | Raji |
| 5,764,906 A | 6/1998 | Edelstein et al. |
| 6,016,394 A | 1/2000 | Walker |
| 6,122,627 A | 9/2000 | Carey et al. |
| 6,148,342 A | 11/2000 | Ho |
| 6,240,416 B1 | 5/2001 | Immon et al. |
| 6,253,203 B1 | 6/2001 | OFlaherty et al. |
| 6,263,335 B1 | 7/2001 | Paik et al. |
| 6,272,631 B1 | 8/2001 | Thomlinson et al. |
| 6,275,824 B1 | 8/2001 | OFlaherty et al. |
| 6,374,237 B1 | 4/2002 | Reese |
| 6,374,252 B1 | 4/2002 | Althoff et al. |
| 6,427,230 B1 | 7/2002 | Goiffon et al. |
| 6,442,688 B1 | 8/2002 | Moses et al. |
| 6,446,120 B1 | 9/2002 | Dantressangle |
| 6,484,180 B1 | 11/2002 | Lyons et al. |
| 6,591,272 B1 | 7/2003 | Williams |
| 6,601,233 B1 | 7/2003 | Underwood |
| 6,606,744 B1 | 8/2003 | Mikurak |
| 6,611,812 B2 | 8/2003 | Hurtado et al. |
| 6,625,602 B1 | 9/2003 | Meredith et al. |
| 6,662,192 B1 | 12/2003 | Rebane |
| 6,725,200 B1 | 4/2004 | Rost |
| 6,732,109 B2 | 5/2004 | Lindberg et al. |
| 6,755,344 B1 | 6/2004 | Mollett et al. |
| 6,757,888 B1 | 6/2004 | Knutson et al. |
| 6,816,944 B2 | 11/2004 | Peng |
| 6,826,693 B1 | 11/2004 | Yoshida et al. |
| 6,886,101 B2 | 4/2005 | Glazer et al. |
| 6,901,346 B2 | 5/2005 | Tracy et al. |
| 6,904,417 B2 | 6/2005 | Clayton et al. |
| 6,925,443 B1 | 8/2005 | Baggett, Jr. et al. |
| 6,938,041 B1 | 8/2005 | Brandow et al. |
| 6,980,987 B2 | 12/2005 | Kaminer |
| 6,983,221 B2 | 1/2006 | Tracy et al. |
| 6,985,887 B1 | 1/2006 | Sunstein et al. |
| 6,990,454 B2 | 1/2006 | McIntosh |
| 6,993,448 B2 | 1/2006 | Tracy et al. |
| 6,993,495 B2 | 1/2006 | Smith, Jr. et al. |
| 6,996,807 B1 | 2/2006 | Vardi et al. |
| 7,013,290 B2 | 3/2006 | Ananian |
| 7,017,105 B2 | 3/2006 | Flanagin et al. |
| 7,039,654 B1 | 5/2006 | Eder |
| 7,047,517 B1 | 5/2006 | Brown et al. |
| 7,051,036 B2 | 5/2006 | Rosnow et al. |
| 7,051,038 B1 | 5/2006 | Yeh et al. |
| 7,058,970 B2 | 6/2006 | Shaw |
| 7,069,427 B2 | 6/2006 | Adler et al. |
| 7,076,558 B1 | 7/2006 | Dunn |
| 7,095,854 B1 | 8/2006 | Ginter et al. |
| 7,120,800 B2 | 10/2006 | Ginter et al. |
| 7,124,101 B1 | 10/2006 | Mikurak |
| 7,127,705 B2 | 10/2006 | Christfort et al. |
| 7,127,741 B2 | 10/2006 | Bandini et al. |
| 7,139,999 B2 | 11/2006 | Bowman-Amuah |
| 7,143,091 B2 | 11/2006 | Charnock et al. |
| 7,167,842 B1 | 1/2007 | Josephson, II et al. |
| 7,171,379 B2 | 1/2007 | Menninger et al. |
| 7,181,438 B1 | 2/2007 | Szabo |
| 7,203,929 B1 | 4/2007 | Vinodkrishnan et al. |
| 7,213,233 B1 | 5/2007 | Vinodkrishnan et al. |
| 7,216,340 B1 | 5/2007 | Vinodkrishnan et al. |
| 7,219,066 B2 | 5/2007 | Parks et al. |
| 7,223,234 B2 | 5/2007 | Stupp et al. |
| 7,225,460 B2 | 5/2007 | Barzilai et al. |
| 7,234,065 B2 | 6/2007 | Breslin et al. |
| 7,251,624 B1 | 7/2007 | Lee et al. |
| 7,260,830 B2 | 8/2007 | Sugimoto |
| 7,275,063 B2 | 9/2007 | Horn |
| 7,284,232 B1 | 10/2007 | Bates et al. |
| 7,287,280 B2 | 10/2007 | Young |
| 7,290,275 B2 | 10/2007 | Baudoin et al. |
| 7,302,569 B2 | 11/2007 | Betz et al. |
| 7,313,575 B2 | 12/2007 | Carr et al. |
| 7,313,699 B2 | 12/2007 | Koga |
| 7,315,849 B2 | 1/2008 | Bakalash et al. |
| 7,330,850 B1 | 2/2008 | Seibel et al. |
| 7,340,447 B2 | 3/2008 | Ghatare |
| 7,340,776 B2 | 3/2008 | Zobel et al. |
| 7,343,434 B2 | 3/2008 | Kapoor et al. |
| 7,353,204 B2 | 4/2008 | Liu |
| 7,356,559 B1 | 4/2008 | Jacobs et al. |
| 7,367,014 B2 | 4/2008 | Griffin |
| 7,370,025 B1 | 5/2008 | Pandit |
| 7,391,854 B2 | 6/2008 | Salonen et al. |
| 7,398,393 B2 | 7/2008 | Mont et al. |
| 7,401,235 B2 | 7/2008 | Mowers et al. |
| 7,403,942 B1 | 7/2008 | Bayliss |
| 7,412,402 B2 | 8/2008 | Cooper |
| 7,430,585 B2 | 9/2008 | Sibert |
| 7,454,457 B1 | 11/2008 | Lowery et al. |
| 7,454,508 B2 | 11/2008 | Mathew et al. |
| 7,478,157 B2 | 1/2009 | Bohrer et al. |
| 7,480,755 B2 | 1/2009 | Herrell et al. |
| 7,487,170 B2 | 2/2009 | Stevens |
| 7,512,987 B2 | 3/2009 | Williams |
| 7,516,882 B2 | 4/2009 | Cucinotta |
| 7,523,053 B2 | 4/2009 | Pudhukottai et al. |
| 7,529,836 B1 | 5/2009 | Bolen |
| 7,548,968 B1 | 6/2009 | Bura et al. |
| 7,552,480 B1 | 6/2009 | Voss |
| 7,567,541 B2 | 7/2009 | Karimi et al. |
| 7,584,505 B2 | 9/2009 | Mondri et al. |
| 7,590,705 B2 | 9/2009 | Mathew et al. |
| 7,590,972 B2 | 9/2009 | Axelrod et al. |
| 7,603,356 B2 | 10/2009 | Schran et al. |
| 7,606,790 B2 | 10/2009 | Levy |
| 7,607,120 B2 | 10/2009 | Sanyal et al. |
| 7,613,700 B1 | 11/2009 | Lobo et al. |
| 7,620,644 B2 | 11/2009 | Cote et al. |
| 7,630,874 B2 | 12/2009 | Fables et al. |
| 7,630,998 B2 | 12/2009 | Zhou et al. |
| 7,636,742 B1 | 12/2009 | Olavarrieta et al. |
| 7,640,322 B2 | 12/2009 | Wendkos et al. |
| 7,653,592 B1 | 1/2010 | Flaxman et al. |

(56) References Cited

U.S. PATENT DOCUMENTS

| | | |
|---|---|---|
| 7,657,476 B2 | 2/2010 | Barney |
| 7,657,694 B2 | 2/2010 | Mansell et al. |
| 7,665,073 B2 | 2/2010 | Meijer et al. |
| 7,668,947 B2 | 2/2010 | Hutchinson et al. |
| 7,673,282 B2 | 3/2010 | Amaru et al. |
| 7,685,561 B2 | 3/2010 | Deem et al. |
| 7,685,577 B2 | 3/2010 | Pace et al. |
| 7,693,593 B2 | 4/2010 | Ishibashi et al. |
| 7,707,224 B2 | 4/2010 | Chastagnol et al. |
| 7,712,029 B2 | 5/2010 | Ferreira et al. |
| 7,716,242 B2 | 5/2010 | Pae et al. |
| 7,725,474 B2 | 5/2010 | Tamai et al. |
| 7,725,875 B2 | 5/2010 | Waldrep |
| 7,729,940 B2 | 6/2010 | Harvey et al. |
| 7,730,142 B2 | 6/2010 | Levasseur et al. |
| 7,752,124 B2 | 7/2010 | Green et al. |
| 7,756,987 B2 | 7/2010 | Wang et al. |
| 7,774,745 B2 | 8/2010 | Fildebrandt et al. |
| 7,788,212 B2 | 8/2010 | Beckmann et al. |
| 7,788,222 B2 | 8/2010 | Shah et al. |
| 7,788,632 B2 | 8/2010 | Kuester et al. |
| 7,788,726 B2 | 8/2010 | Teixeira |
| 7,801,758 B2 | 9/2010 | Gracie et al. |
| 7,822,620 B2 | 10/2010 | Dixon |
| 7,827,523 B2 | 11/2010 | Ahmed et al. |
| 7,849,143 B2 | 12/2010 | Vuong |
| 7,853,468 B2 | 12/2010 | Callahan et al. |
| 7,853,470 B2 | 12/2010 | Sonnleithner et al. |
| 7,870,540 B2 | 1/2011 | Zare et al. |
| 7,870,608 B2 | 1/2011 | Shraim et al. |
| 7,873,541 B1 | 1/2011 | Klar et al. |
| 7,877,327 B2 | 1/2011 | Gwiazda et al. |
| 7,877,812 B2 | 1/2011 | Koved et al. |
| 7,885,841 B2 | 2/2011 | King |
| 7,895,260 B2 | 2/2011 | Archer et al. |
| 7,904,487 B2 | 3/2011 | Ghatare |
| 7,917,963 B2 | 3/2011 | Goyal et al. |
| 7,921,152 B2 | 4/2011 | Ashley et al. |
| 7,930,753 B2 | 4/2011 | Mellinger et al. |
| 7,953,725 B2 | 5/2011 | Burris et al. |
| 7,954,150 B2 | 5/2011 | Croft et al. |
| 7,958,087 B2 | 6/2011 | Blumenau |
| 7,958,494 B2 | 6/2011 | Chaar et al. |
| 7,962,900 B2 | 6/2011 | Barraclough et al. |
| 7,966,310 B2 | 6/2011 | Sullivan et al. |
| 7,966,599 B1 | 6/2011 | Malasky et al. |
| 7,966,663 B2 | 6/2011 | Strickland et al. |
| 7,975,000 B2 | 7/2011 | Dixon et al. |
| 7,991,559 B2 | 8/2011 | Dzekunov et al. |
| 7,996,372 B2 | 8/2011 | Rubel, Jr. |
| 8,010,612 B2 | 8/2011 | Costea et al. |
| 8,019,881 B2 | 9/2011 | Sandhu et al. |
| 8,032,721 B2 | 10/2011 | Murai |
| 8,037,409 B2 | 10/2011 | Jacob et al. |
| 8,041,913 B2 | 10/2011 | Wang |
| 8,069,161 B2 | 11/2011 | Bugir et al. |
| 8,069,471 B2 | 11/2011 | Boren |
| 8,082,539 B1 | 12/2011 | Schelkogonov |
| 8,095,923 B2 | 1/2012 | Harvey et al. |
| 8,146,054 B2 | 3/2012 | Baker et al. |
| 8,146,074 B2 | 3/2012 | Ito et al. |
| 8,150,717 B2 | 4/2012 | Whitmore |
| 8,156,158 B2 | 4/2012 | Rolls et al. |
| 8,166,406 B1 | 4/2012 | Goldfeder et al. |
| 8,176,177 B2 | 5/2012 | Sussman et al. |
| 8,176,334 B2 | 5/2012 | Vainstein |
| 8,176,470 B2 | 5/2012 | Klumpp et al. |
| 8,180,759 B2 | 5/2012 | Hamzy |
| 8,196,176 B2 | 6/2012 | Berteau et al. |
| 8,234,377 B2 | 7/2012 | Cohn |
| 8,239,244 B2 | 8/2012 | Ginsberg et al. |
| 8,250,051 B2 | 8/2012 | Bugir et al. |
| 8,255,468 B2 | 8/2012 | Vitaldevara et al. |
| 8,266,231 B1 | 9/2012 | Golovin et al. |
| 8,275,632 B2 | 9/2012 | Awaraji et al. |
| 8,275,793 B2 | 9/2012 | Ahmad et al. |
| 8,286,239 B1 | 10/2012 | Sutton |
| 8,312,549 B2 | 11/2012 | Goldberg et al. |
| 8,316,237 B1 | 11/2012 | Felsher et al. |
| 8,332,908 B2 | 12/2012 | Hatakeyama et al. |
| 8,346,929 B1 | 1/2013 | Lai |
| 8,364,713 B2 | 1/2013 | Pollard |
| 8,380,743 B2 | 2/2013 | Convertino et al. |
| 8,381,180 B2 | 2/2013 | Rostoker |
| 8,418,226 B2 | 4/2013 | Gardner |
| 8,423,954 B2 | 4/2013 | Ronen et al. |
| 8,429,597 B2 | 4/2013 | Prigge |
| 8,429,630 B2 | 4/2013 | Nickolov et al. |
| 8,429,758 B2 | 4/2013 | Chen et al. |
| 8,438,644 B2 | 5/2013 | Watters et al. |
| 8,463,247 B2 | 6/2013 | Misiag |
| 8,468,244 B2 | 6/2013 | Redlich et al. |
| 8,474,012 B2 | 6/2013 | Ahmed et al. |
| 8,494,894 B2 | 7/2013 | Jaster et al. |
| 8,504,481 B2 | 8/2013 | Motahari et al. |
| 8,510,199 B1 | 8/2013 | Erlanger |
| 8,516,076 B2 | 8/2013 | Thomas |
| 8,533,746 B2 | 9/2013 | Nolan et al. |
| 8,539,359 B2 | 9/2013 | Rapaport et al. |
| 8,560,956 B2 | 10/2013 | Curtis et al. |
| 8,561,153 B2 | 10/2013 | Grason et al. |
| 8,565,729 B2 | 10/2013 | Moseler et al. |
| 8,571,909 B2 | 10/2013 | Miller et al. |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,578,501 B1 | 11/2013 | Ogilvie |
| 8,583,694 B2 | 11/2013 | Siegel et al. |
| 8,583,766 B2 | 11/2013 | Dixon et al. |
| 8,589,183 B2 | 11/2013 | Awaraji et al. |
| 8,601,467 B2 | 12/2013 | Hofhansl et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,620,952 B2 | 12/2013 | Bennett et al. |
| 8,621,637 B2 | 12/2013 | Al-Harbi et al. |
| 8,627,114 B2 | 1/2014 | Resch et al. |
| 8,640,110 B2 | 1/2014 | Kopp et al. |
| 8,656,456 B2 | 2/2014 | Maxson et al. |
| 8,667,074 B1 | 3/2014 | Farkas |
| 8,667,487 B1 | 3/2014 | Boodman et al. |
| 8,677,472 B1 | 3/2014 | Dotan et al. |
| 8,681,984 B2 | 3/2014 | Lee et al. |
| 8,682,698 B2 | 3/2014 | Cashman et al. |
| 8,683,502 B2 | 3/2014 | Shkedi et al. |
| 8,688,601 B2 | 4/2014 | Jaiswal |
| 8,700,699 B2 | 4/2014 | Shen et al. |
| 8,706,742 B1 | 4/2014 | Ravid et al. |
| 8,712,813 B2 | 4/2014 | King |
| 8,713,098 B1 | 4/2014 | Adya et al. |
| 8,713,638 B2 | 4/2014 | Hu et al. |
| 8,732,839 B2 | 5/2014 | Hohl |
| 8,744,894 B2 | 6/2014 | Christiansen et al. |
| 8,751,285 B2 | 6/2014 | Deb et al. |
| 8,763,071 B2 | 6/2014 | Sinha et al. |
| 8,767,947 B1 | 7/2014 | Ristock et al. |
| 8,769,242 B2 | 7/2014 | Tkac et al. |
| 8,769,671 B2 | 7/2014 | Shraim et al. |
| 8,788,935 B1 | 7/2014 | Hirsch et al. |
| 8,793,614 B2 | 7/2014 | Wilson et al. |
| 8,793,650 B2 | 7/2014 | Hilerio et al. |
| 8,793,809 B2 | 7/2014 | Falkenburg et al. |
| 8,805,707 B2 | 8/2014 | Schumann, Jr. et al. |
| 8,805,806 B2 | 8/2014 | Amarendran et al. |
| 8,805,925 B2 | 8/2014 | Price et al. |
| 8,812,342 B2 | 8/2014 | Barcelo et al. |
| 8,812,752 B1 | 8/2014 | Shih et al. |
| 8,812,766 B2 | 8/2014 | Kranendonk et al. |
| 8,819,253 B2 | 8/2014 | Simeloff et al. |
| 8,819,617 B1 | 8/2014 | Koenig et al. |
| 8,826,446 B1 | 9/2014 | Liu et al. |
| 8,832,649 B2 | 9/2014 | Bishop et al. |
| 8,832,854 B1 | 9/2014 | Staddon et al. |

(56) References Cited

U.S. PATENT DOCUMENTS

| | | |
|---|---|---|
| 8,839,232 B2 | 9/2014 | Taylor et al. |
| 8,843,487 B2 | 9/2014 | McGraw et al. |
| 8,856,534 B2 | 10/2014 | Khosravi et al. |
| 8,862,507 B2 | 10/2014 | Sandhu et al. |
| 8,875,232 B2 | 10/2014 | Blom et al. |
| 8,893,078 B2 | 11/2014 | Schaude et al. |
| 8,893,286 B1 | 11/2014 | Oliver |
| 8,914,263 B2 | 12/2014 | Shimada et al. |
| 8,914,299 B2 | 12/2014 | Pesci-Anderson et al. |
| 8,914,342 B2 | 12/2014 | Kalaboukis et al. |
| 8,914,902 B2 | 12/2014 | Moritz et al. |
| 8,918,306 B2 | 12/2014 | Cashman et al. |
| 8,918,392 B1 | 12/2014 | Brooker et al. |
| 8,918,632 B1 | 12/2014 | Sartor |
| 8,930,896 B1 | 1/2015 | Wiggins |
| 8,935,198 B1 | 1/2015 | Phillips et al. |
| 8,935,266 B2 | 1/2015 | Wu |
| 8,935,342 B2 | 1/2015 | Patel |
| 8,935,804 B1 | 1/2015 | Clark et al. |
| 8,943,076 B2 | 1/2015 | Stewart et al. |
| 8,943,548 B2 | 1/2015 | Drokov et al. |
| 8,949,137 B2 | 2/2015 | Crapo et al. |
| 8,959,584 B2 | 2/2015 | Piliouras |
| 8,966,575 B2 | 2/2015 | McQuay et al. |
| 8,966,597 B1 | 2/2015 | Saylor et al. |
| 8,977,234 B2 | 3/2015 | Chava |
| 8,977,643 B2 | 3/2015 | Schindlauer et al. |
| 8,978,158 B2 | 3/2015 | Rajkumar et al. |
| 8,983,972 B2 | 3/2015 | Kriebel et al. |
| 8,984,031 B1 | 3/2015 | Todd |
| 8,990,933 B1 | 3/2015 | Magdalin |
| 8,996,417 B1 | 3/2015 | Channakeshava |
| 8,996,480 B2 | 3/2015 | Agarwala et al. |
| 8,997,213 B2 | 3/2015 | Papakipos et al. |
| 9,003,295 B2 | 4/2015 | Baschy |
| 9,003,552 B2 | 4/2015 | Goodwin et al. |
| 9,009,851 B2 | 4/2015 | Droste et al. |
| 9,021,469 B2 | 4/2015 | Hilerio et al. |
| 9,026,526 B1 | 5/2015 | Bau et al. |
| 9,030,987 B2 | 5/2015 | Bianchetti et al. |
| 9,032,067 B2 | 5/2015 | Prasad et al. |
| 9,043,217 B2 | 5/2015 | Cashman et al. |
| 9,043,480 B2 | 5/2015 | Barton et al. |
| 9,047,463 B2 | 6/2015 | Porras |
| 9,047,582 B2 | 6/2015 | Hutchinson et al. |
| 9,049,314 B2 | 6/2015 | Pugh et al. |
| 9,055,071 B1 | 6/2015 | Gates et al. |
| 9,064,033 B2 | 6/2015 | Jin et al. |
| 9,069,940 B2 | 6/2015 | Hars |
| 9,076,231 B1 | 7/2015 | Hill et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,778 B2 | 8/2015 | Stogaitis et al. |
| 9,106,691 B1 | 8/2015 | Burger et al. |
| 9,111,105 B2 | 8/2015 | Barton et al. |
| 9,111,295 B2 | 8/2015 | Tietzen et al. |
| 9,123,339 B1 | 9/2015 | Shaw et al. |
| 9,129,311 B2 | 9/2015 | Schoen et al. |
| 9,135,261 B2 | 9/2015 | Maunder et al. |
| 9,141,823 B2 | 9/2015 | Dawson |
| 9,152,820 B1 | 10/2015 | Pauley, Jr. et al. |
| 9,154,514 B1 | 10/2015 | Prakash |
| 9,154,556 B1 | 10/2015 | Dotan et al. |
| 9,158,655 B2 | 10/2015 | Wadhwani et al. |
| 9,170,996 B2 | 10/2015 | Lovric et al. |
| 9,172,706 B2 | 10/2015 | Krishnamurthy et al. |
| 9,177,293 B1 | 11/2015 | Gagnon et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,085 B2 | 12/2015 | Mawdsley et al. |
| 9,215,076 B1 | 12/2015 | Roth et al. |
| 9,215,252 B2 | 12/2015 | Smith et al. |
| 9,224,009 B1 | 12/2015 | Liu et al. |
| 9,231,935 B1 | 1/2016 | Bridge et al. |
| 9,232,040 B2 | 1/2016 | Barash et al. |
| 9,235,476 B2 | 1/2016 | McHugh et al. |
| 9,240,987 B2 | 1/2016 | Barrett-Bowen et al. |
| 9,241,259 B2 | 1/2016 | Daniela et al. |
| 9,245,126 B2 | 1/2016 | Christodorescu et al. |
| 9,253,609 B2 | 2/2016 | Hosier, Jr. |
| 9,264,443 B2 | 2/2016 | Weisman |
| 9,280,581 B1 | 3/2016 | Grimes et al. |
| 9,286,282 B2 | 3/2016 | Ling, III et al. |
| 9,288,118 B1 | 3/2016 | Pattan |
| 9,317,697 B2 | 4/2016 | Maier et al. |
| 9,317,715 B2 | 4/2016 | Schuette et al. |
| 9,336,324 B2 | 5/2016 | Lomme et al. |
| 9,336,332 B2 | 5/2016 | Davis et al. |
| 9,336,400 B2 | 5/2016 | Milman et al. |
| 9,338,188 B1 | 5/2016 | Ahn |
| 9,344,297 B2 | 5/2016 | Shah et al. |
| 9,344,424 B2 | 5/2016 | Tenenboym et al. |
| 9,344,484 B2 | 5/2016 | Ferris |
| 9,348,802 B2 | 5/2016 | Massand |
| 9,348,862 B2 | 5/2016 | Kawecki, III |
| 9,350,718 B2 | 5/2016 | Sondhi et al. |
| 9,355,157 B2 | 5/2016 | Mohammed et al. |
| 9,356,961 B1 | 5/2016 | Todd et al. |
| 9,369,488 B2 | 6/2016 | Woods et al. |
| 9,384,199 B2 | 7/2016 | Thereska et al. |
| 9,384,357 B2 | 7/2016 | Patil et al. |
| 9,386,104 B2 | 7/2016 | Adams et al. |
| 9,396,332 B2 | 7/2016 | Abrams et al. |
| 9,401,900 B2 | 7/2016 | Levasseur et al. |
| 9,411,967 B2 | 8/2016 | Parecki et al. |
| 9,411,982 B1 | 8/2016 | Dippenaar et al. |
| 9,424,021 B2 | 8/2016 | Zamir |
| 9,460,136 B1 | 10/2016 | Todd et al. |
| 9,460,171 B2 | 10/2016 | Marrelli et al. |
| 9,460,307 B2 | 10/2016 | Breslau et al. |
| 9,462,009 B1 | 10/2016 | Kolman et al. |
| 9,465,702 B2 | 10/2016 | Gventer et al. |
| 9,465,800 B2 | 10/2016 | Lacey |
| 9,473,446 B2 | 10/2016 | Vijay et al. |
| 9,473,535 B2 | 10/2016 | Sartor |
| 9,477,523 B1 | 10/2016 | Warman et al. |
| 9,477,660 B2 | 10/2016 | Scott et al. |
| 9,477,942 B2 | 10/2016 | Adachi et al. |
| 9,483,659 B2 | 11/2016 | Bao et al. |
| 9,489,366 B2 | 11/2016 | Scott et al. |
| 9,507,960 B2 | 11/2016 | Bell et al. |
| 9,509,674 B1 | 11/2016 | Nasserbakht et al. |
| 9,509,702 B2 | 11/2016 | Grigg et al. |
| 9,521,166 B2 | 12/2016 | Wilson |
| 9,529,989 B2 | 12/2016 | Kling et al. |
| 9,536,108 B2 | 1/2017 | Powell et al. |
| 9,537,546 B2 | 1/2017 | Cordeiro et al. |
| 9,549,047 B1 | 1/2017 | Fredinburg et al. |
| 9,552,395 B2 | 1/2017 | Bayer et al. |
| 9,553,918 B1 | 1/2017 | Manion et al. |
| 9,558,497 B2 | 1/2017 | Carvalho |
| 9,569,752 B2 | 2/2017 | Deering et al. |
| 9,571,509 B1 | 2/2017 | Satish et al. |
| 9,571,526 B2 | 2/2017 | Sartor |
| 9,571,991 B1 | 2/2017 | Brizendine et al. |
| 9,582,681 B2 | 2/2017 | Mishra |
| 9,589,110 B2 | 3/2017 | Carey et al. |
| 9,600,181 B2 | 3/2017 | Patel et al. |
| 9,602,529 B2 | 3/2017 | Jones et al. |
| 9,606,971 B2 | 3/2017 | Seolas et al. |
| 9,607,041 B2 | 3/2017 | Himmelstein |
| 9,619,652 B2 | 4/2017 | Slater |
| 9,619,661 B1 | 4/2017 | Finkelstein |
| 9,621,357 B2 | 4/2017 | Williams et al. |
| 9,621,566 B2 | 4/2017 | Gupta et al. |
| 9,626,124 B2 | 4/2017 | Lipinski et al. |
| 9,642,008 B2 | 5/2017 | Wyatt et al. |
| 9,646,095 B1 | 5/2017 | Gottlieb et al. |
| 9,648,036 B2 | 5/2017 | Seiver et al. |
| 9,652,314 B2 | 5/2017 | Mahiddini |

(56) References Cited

U.S. PATENT DOCUMENTS

| | | |
|---|---|---|
| 9,654,506 B2 | 5/2017 | Barrett |
| 9,654,541 B1 | 5/2017 | Kapczynski et al. |
| 9,665,722 B2 | 5/2017 | Nagasundaram et al. |
| 9,672,053 B2 | 6/2017 | Tang et al. |
| 9,691,090 B1 | 6/2017 | Barday |
| 9,705,840 B2 | 7/2017 | Pujare et al. |
| 9,721,078 B2 | 8/2017 | Cornick et al. |
| 9,721,108 B2 | 8/2017 | Krishnamurthy et al. |
| 9,727,751 B2 | 8/2017 | Oliver et al. |
| 9,729,583 B1 | 8/2017 | Barday |
| 9,740,985 B2 | 8/2017 | Byron et al. |
| 9,740,987 B2 | 8/2017 | Dolan |
| 9,749,408 B2 | 8/2017 | Subramani et al. |
| 9,760,620 B2 | 9/2017 | Nachnani et al. |
| 9,760,697 B1 | 9/2017 | Walker |
| 9,760,849 B2 | 9/2017 | Vinnakota |
| 9,762,553 B2 | 9/2017 | Ford et al. |
| 9,767,202 B2 | 9/2017 | Darby et al. |
| 9,767,309 B1 | 9/2017 | Patel et al. |
| 9,785,795 B2 | 10/2017 | Grondin et al. |
| 9,798,749 B2 | 10/2017 | Saner |
| 9,798,826 B2 | 10/2017 | Wilson et al. |
| 9,800,605 B2 | 10/2017 | Baikalov et al. |
| 9,800,606 B1 | 10/2017 | Yumer |
| 9,804,649 B2 | 10/2017 | Cohen et al. |
| 9,804,928 B2 | 10/2017 | Davis et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,825,928 B2 | 11/2017 | Lelcuk et al. |
| 9,836,598 B2 | 12/2017 | Iyer et al. |
| 9,838,407 B1 | 12/2017 | Oprea et al. |
| 9,838,839 B2 | 12/2017 | Vudali et al. |
| 9,842,042 B2 | 12/2017 | Chhatwal et al. |
| 9,842,349 B2 | 12/2017 | Sawczuk et al. |
| 9,852,150 B2 | 12/2017 | Sharpe et al. |
| 9,860,226 B2 | 1/2018 | Thormaehlen |
| 9,864,735 B1 | 1/2018 | Lamprecht |
| 9,877,138 B1 | 1/2018 | Franklin |
| 9,882,935 B2 | 1/2018 | Barday |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,894,076 B2 | 2/2018 | Li et al. |
| 9,898,613 B1 | 2/2018 | Swerdlow et al. |
| 9,898,769 B2 | 2/2018 | Barday |
| 9,912,625 B2 | 3/2018 | Mutha et al. |
| 9,916,703 B2 | 3/2018 | Levinson et al. |
| 9,923,927 B1 | 3/2018 | McClintock et al. |
| 9,934,544 B1 | 4/2018 | Whitfield et al. |
| 9,942,244 B2 | 4/2018 | Lahoz et al. |
| 9,942,276 B2 | 4/2018 | Sartor |
| 9,946,897 B2 | 4/2018 | Lovin |
| 9,948,663 B1 | 4/2018 | Wang et al. |
| 9,953,189 B2 | 4/2018 | Cook et al. |
| 9,959,582 B2 | 5/2018 | Sukman et al. |
| 9,961,070 B2 | 5/2018 | Tang |
| 9,973,585 B2 | 5/2018 | Ruback et al. |
| 9,983,936 B2 | 5/2018 | Dornemann et al. |
| 9,984,252 B2 | 5/2018 | Pollard |
| 9,990,499 B2 | 6/2018 | Chan et al. |
| 9,992,213 B2 | 6/2018 | Sinnema |
| 10,001,975 B2 | 6/2018 | Bharthulwar |
| 10,002,064 B2 | 6/2018 | Muske |
| 10,007,895 B2 | 6/2018 | Vanasco |
| 10,013,577 B1 | 7/2018 | Beaumont et al. |
| 10,015,164 B2 | 7/2018 | Hamburg et al. |
| 10,019,339 B2 | 7/2018 | Von Hanxleden et al. |
| 10,019,588 B2 | 7/2018 | Garcia et al. |
| 10,025,804 B2 | 7/2018 | Vranyes et al. |
| 10,028,226 B2 | 7/2018 | Ayyagari et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,061,847 B2 | 8/2018 | Mohammed et al. |
| 10,069,914 B1 | 9/2018 | Smith |
| 10,073,924 B2 | 9/2018 | Karp et al. |
| 10,075,451 B1 | 9/2018 | Hall et al. |
| 10,091,312 B1 | 10/2018 | Khanwalkar et al. |
| 10,102,533 B2 | 10/2018 | Barday |
| 10,122,760 B2 | 11/2018 | Terrill et al. |
| 10,129,211 B2 | 11/2018 | Heath |
| 10,140,666 B1 | 11/2018 | Wang et al. |
| 10,142,113 B2 | 11/2018 | Zaidi et al. |
| 10,158,676 B2 | 12/2018 | Barday |
| 10,165,011 B2 | 12/2018 | Barday |
| 10,169,762 B2 | 1/2019 | Ogawa |
| 10,176,503 B2 | 1/2019 | Barday et al. |
| 10,181,043 B1 | 1/2019 | Pauley, Jr. et al. |
| 10,181,051 B2 | 1/2019 | Barday et al. |
| 10,204,154 B2 | 2/2019 | Barday et al. |
| 10,212,175 B2 | 2/2019 | Seul et al. |
| 10,223,533 B2 | 3/2019 | Dawson |
| 10,250,594 B2 | 4/2019 | Chathoth et al. |
| 10,257,127 B2 | 4/2019 | Dotan-Cohen et al. |
| 10,268,838 B2 | 4/2019 | Yadgiri et al. |
| 10,275,614 B2 | 4/2019 | Barday et al. |
| 10,282,370 B1 | 5/2019 | Barday et al. |
| 10,284,604 B2 | 5/2019 | Barday et al. |
| 10,289,857 B1 | 5/2019 | Brinskelle |
| 10,289,866 B2 | 5/2019 | Barday et al. |
| 10,289,867 B2 | 5/2019 | Barday et al. |
| 10,289,870 B2 | 5/2019 | Barday et al. |
| 10,311,042 B1 | 6/2019 | Kumar |
| 10,318,761 B2 | 6/2019 | Barday et al. |
| 10,324,960 B1 | 6/2019 | Skvortsov et al. |
| 10,326,768 B2 | 6/2019 | Verweyst et al. |
| 10,333,975 B2 | 6/2019 | Soman et al. |
| 10,346,186 B2 | 7/2019 | Kalyanpur |
| 10,346,635 B2 | 7/2019 | Kumar et al. |
| 10,348,726 B2 | 7/2019 | Caluwaert |
| 10,353,673 B2 | 7/2019 | Barday et al. |
| 10,361,857 B2 | 7/2019 | Woo |
| 10,373,119 B2 | 8/2019 | Driscoll et al. |
| 10,373,409 B2 | 8/2019 | White et al. |
| 10,375,115 B2 | 8/2019 | Mallya |
| 10,387,952 B1 | 8/2019 | Sandhu et al. |
| 10,417,401 B2 | 9/2019 | Votaw et al. |
| 10,430,608 B2 | 10/2019 | Peri et al. |
| 10,437,860 B2 | 10/2019 | Barday et al. |
| 10,438,016 B2 | 10/2019 | Barday et al. |
| 10,445,526 B2 | 10/2019 | Barday et al. |
| 10,452,864 B2 | 10/2019 | Barday et al. |
| 10,452,866 B2 | 10/2019 | Barday et al. |
| 10,481,763 B2 | 11/2019 | Bartkiewicz et al. |
| 10,510,031 B2 | 12/2019 | Barday et al. |
| 10,536,475 B1 | 1/2020 | McCorkle, Jr. et al. |
| 10,546,135 B1 | 1/2020 | Kassoumeh et al. |
| 10,564,935 B2 | 2/2020 | Barday et al. |
| 10,565,161 B2 | 2/2020 | Barday et al. |
| 10,565,236 B1 | 2/2020 | Barday et al. |
| 10,572,684 B2 | 2/2020 | Lafever et al. |
| 10,574,705 B2 | 2/2020 | Barday et al. |
| 10,613,971 B1 | 4/2020 | Vasikarla |
| 2002/0103854 A1 | 8/2002 | Okita |
| 2002/0129216 A1 | 9/2002 | Collins |
| 2002/0161594 A1 | 10/2002 | Bryan et al. |
| 2002/0161733 A1 | 10/2002 | Grainger |
| 2003/0041250 A1 | 2/2003 | Proudler |
| 2003/0097451 A1 | 5/2003 | Bjorksten et al. |
| 2003/0097661 A1 | 5/2003 | Li et al. |
| 2003/0115142 A1 | 6/2003 | Brickell et al. |
| 2003/0130893 A1 | 7/2003 | Farmer |
| 2003/0131001 A1 | 7/2003 | Matsuo |
| 2003/0131093 A1 | 7/2003 | Aschen et al. |
| 2003/0167216 A1 | 9/2003 | Brown et al. |
| 2004/0025053 A1 | 2/2004 | Hayward |
| 2004/0088235 A1 | 5/2004 | Ziekle et al. |
| 2004/0098366 A1 | 5/2004 | Sinclair et al. |
| 2004/0098493 A1 | 5/2004 | Rees |
| 2004/0111359 A1 | 6/2004 | Hudock |
| 2004/0186912 A1 | 9/2004 | Harlow et al. |
| 2004/0193907 A1 | 9/2004 | Patanella |

(56) References Cited

U.S. PATENT DOCUMENTS

| | | |
|---|---|---|
| 2005/0022198 A1 | 1/2005 | Olapurath et al. |
| 2005/0033616 A1 | 2/2005 | Vavul et al. |
| 2005/0076294 A1 | 4/2005 | Dehamer et al. |
| 2005/0114343 A1 | 5/2005 | Wesinger et al. |
| 2005/0144066 A1 | 6/2005 | Cope et al. |
| 2005/0197884 A1 | 9/2005 | Mullen, Jr. |
| 2005/0198177 A1 | 9/2005 | Black |
| 2005/0246292 A1 | 11/2005 | Sarcanin |
| 2005/0278538 A1 | 12/2005 | Fowler |
| 2006/0031078 A1 | 2/2006 | Pizzinger et al. |
| 2006/0075122 A1 | 4/2006 | Lindskog et al. |
| 2006/0149730 A1 | 7/2006 | Curtis |
| 2006/0156052 A1 | 7/2006 | Bodnar et al. |
| 2006/0206375 A1 | 9/2006 | Scott et al. |
| 2006/0224422 A1 | 10/2006 | Cohen |
| 2006/0253597 A1 | 11/2006 | Mujica |
| 2007/0027715 A1 | 2/2007 | Gropper et al. |
| 2007/0130101 A1 | 6/2007 | Anderson et al. |
| 2007/0130323 A1 | 6/2007 | Landsman et al. |
| 2007/0157311 A1 | 7/2007 | Meier et al. |
| 2007/0173355 A1 | 7/2007 | Klein |
| 2007/0179793 A1 | 8/2007 | Bagchi et al. |
| 2007/0180490 A1 | 8/2007 | Renzi et al. |
| 2007/0192438 A1 | 8/2007 | Goei |
| 2007/0266420 A1 | 11/2007 | Hawkins et al. |
| 2007/0283171 A1 | 12/2007 | Breslin et al. |
| 2008/0015927 A1 | 1/2008 | Ramirez |
| 2008/0028065 A1 | 1/2008 | Caso et al. |
| 2008/0028435 A1 | 1/2008 | Strickland et al. |
| 2008/0047016 A1 | 2/2008 | Spoonamore |
| 2008/0120699 A1 | 5/2008 | Spear |
| 2008/0235177 A1 | 9/2008 | Kim et al. |
| 2008/0270203 A1 | 10/2008 | Holmes et al. |
| 2008/0281649 A1 | 11/2008 | Morris |
| 2008/0282320 A1 | 11/2008 | Denovo et al. |
| 2008/0288271 A1 | 11/2008 | Faust |
| 2009/0012896 A1 | 1/2009 | Arnold |
| 2009/0022301 A1 | 1/2009 | Mudaliar |
| 2009/0037975 A1 | 2/2009 | Ishikawa et al. |
| 2009/0158249 A1 | 6/2009 | Tomkins et al. |
| 2009/0172705 A1 | 7/2009 | Cheong |
| 2009/0182818 A1 | 7/2009 | Krywaniuk |
| 2009/0187764 A1 | 7/2009 | Astakhov et al. |
| 2009/0204452 A1 | 8/2009 | Iskandar et al. |
| 2009/0204820 A1 | 8/2009 | Brandenburg et al. |
| 2009/0210347 A1 | 8/2009 | Sarcanin |
| 2009/0216610 A1 | 8/2009 | Chorny |
| 2009/0249076 A1 | 10/2009 | Reed et al. |
| 2009/0303237 A1 | 12/2009 | Liu et al. |
| 2010/0082533 A1 | 4/2010 | Nakamura et al. |
| 2010/0094650 A1 | 4/2010 | Tran et al. |
| 2010/0100398 A1 | 4/2010 | Auker et al. |
| 2010/0121773 A1 | 5/2010 | Currier et al. |
| 2010/0192201 A1 | 7/2010 | Shimoni et al. |
| 2010/0205057 A1 | 8/2010 | Hook et al. |
| 2010/0223349 A1 | 9/2010 | Thorson |
| 2010/0228786 A1 | 9/2010 | Török |
| 2010/0235297 A1 | 9/2010 | Mamorsky |
| 2010/0235915 A1 | 9/2010 | Memon et al. |
| 2010/0268628 A1 | 10/2010 | Pitkow et al. |
| 2010/0281313 A1 | 11/2010 | White et al. |
| 2010/0287114 A1 | 11/2010 | Bartko et al. |
| 2010/0333012 A1 | 12/2010 | Adachi et al. |
| 2011/0006996 A1 | 1/2011 | Smith et al. |
| 2011/0010202 A1 | 1/2011 | Neale |
| 2011/0082794 A1 | 4/2011 | Blechman |
| 2011/0137696 A1 | 6/2011 | Meyer et al. |
| 2011/0191664 A1 | 8/2011 | Sheleheda et al. |
| 2011/0208850 A1 | 8/2011 | Sheleheda et al. |
| 2011/0209067 A1 | 8/2011 | Bogess et al. |
| 2011/0231896 A1 | 9/2011 | Tovar |
| 2012/0084151 A1 | 4/2012 | Kozak et al. |
| 2012/0084349 A1 | 4/2012 | Lee et al. |
| 2012/0102543 A1 | 4/2012 | Kohli et al. |
| 2012/0110674 A1 | 5/2012 | Belani et al. |
| 2012/0116923 A1 | 5/2012 | Irving et al. |
| 2012/0131438 A1 | 5/2012 | Li et al. |
| 2012/0143650 A1 | 6/2012 | Crowley et al. |
| 2012/0144499 A1 | 6/2012 | Tan et al. |
| 2012/0226621 A1 | 9/2012 | Petran et al. |
| 2012/0254320 A1 | 10/2012 | Dove et al. |
| 2012/0259752 A1 | 10/2012 | Agee |
| 2012/0323700 A1 | 12/2012 | Aleksandrovich et al. |
| 2012/0330869 A1 | 12/2012 | Durham |
| 2013/0018954 A1 | 1/2013 | Cheng |
| 2013/0085801 A1 | 4/2013 | Sharpe et al. |
| 2013/0103485 A1 | 4/2013 | Postrel |
| 2013/0111323 A1 | 5/2013 | Taghaddos et al. |
| 2013/0159351 A1 | 6/2013 | Hamann et al. |
| 2013/0171968 A1 | 7/2013 | Wang |
| 2013/0179982 A1 | 7/2013 | Bridges et al. |
| 2013/0218829 A1 | 8/2013 | Martinez |
| 2013/0219459 A1 | 8/2013 | Bradley |
| 2013/0254649 A1 | 9/2013 | ONeill |
| 2013/0254699 A1 | 9/2013 | Bashir et al. |
| 2013/0282466 A1 | 10/2013 | Hampton |
| 2013/0298071 A1 | 11/2013 | Wine |
| 2013/0311224 A1 | 11/2013 | Heroux et al. |
| 2013/0318207 A1 | 11/2013 | Dotter |
| 2013/0326112 A1 | 12/2013 | Park et al. |
| 2013/0332362 A1 | 12/2013 | Ciurea |
| 2013/0340086 A1 | 12/2013 | Blom |
| 2014/0006355 A1 | 1/2014 | Kirihata |
| 2014/0006616 A1 | 1/2014 | Aad et al. |
| 2014/0012833 A1 | 1/2014 | Humprecht |
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Ciurea |
| 2014/0040161 A1 | 2/2014 | Berlin |
| 2014/0040979 A1 | 2/2014 | Barton et al. |
| 2014/0047551 A1 | 2/2014 | Nagasundaram et al. |
| 2014/0052463 A1 | 2/2014 | Cashman et al. |
| 2014/0074645 A1 | 3/2014 | Ingram |
| 2014/0089027 A1 | 3/2014 | Brown |
| 2014/0089039 A1 | 3/2014 | McClellan |
| 2014/0108173 A1 | 4/2014 | Cooper et al. |
| 2014/0142988 A1 | 5/2014 | Grosso et al. |
| 2014/0143011 A1 | 5/2014 | Mudugu et al. |
| 2014/0188956 A1 | 7/2014 | Subba et al. |
| 2014/0196143 A1 | 7/2014 | Fliderman et al. |
| 2014/0208418 A1 | 7/2014 | Libin |
| 2014/0244309 A1 | 8/2014 | Francois |
| 2014/0244325 A1 | 8/2014 | Cartwright |
| 2014/0244399 A1 | 8/2014 | Orduna et al. |
| 2014/0258093 A1 | 9/2014 | Gardiner et al. |
| 2014/0278663 A1 | 9/2014 | Samuel et al. |
| 2014/0278730 A1 | 9/2014 | Muhart et al. |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289862 A1 | 9/2014 | Gorfein et al. |
| 2014/0317171 A1 | 10/2014 | Fox et al. |
| 2014/0324480 A1 | 10/2014 | Dufel et al. |
| 2014/0337466 A1 | 11/2014 | Li et al. |
| 2014/0344015 A1 | 11/2014 | Puértolas-Montañés et al. |
| 2015/0012363 A1 | 1/2015 | Grant et al. |
| 2015/0019530 A1 | 1/2015 | Felch |
| 2015/0033112 A1 | 1/2015 | Norwood et al. |
| 2015/0066577 A1 | 3/2015 | Christiansen et al. |
| 2015/0106867 A1 | 4/2015 | Liang |
| 2015/0106948 A1 | 4/2015 | Holman et al. |
| 2015/0106949 A1 | 4/2015 | Holman et al. |
| 2015/0143258 A1 | 5/2015 | Carolan et al. |
| 2015/0149362 A1 | 5/2015 | Baum et al. |
| 2015/0154520 A1 | 6/2015 | Federgreen et al. |
| 2015/0169318 A1 | 6/2015 | Nash |
| 2015/0178740 A1 | 6/2015 | Borawski et al. |
| 2015/0199534 A1 | 7/2015 | Francis et al. |
| 2015/0199541 A1 | 7/2015 | Koch et al. |
| 2015/0229664 A1 | 8/2015 | Hawthorn et al. |
| 2015/0235050 A1 | 8/2015 | Wouhaybi et al. |
| 2015/0242778 A1 | 8/2015 | Wilcox et al. |
| 2015/0242858 A1 | 8/2015 | Smith et al. |

(56) References Cited

U.S. PATENT DOCUMENTS

| | | |
|---|---|---|
| 2015/0254597 A1 | 9/2015 | Jahagirdar |
| 2015/0261887 A1 | 9/2015 | Joukov |
| 2015/0264417 A1 | 9/2015 | Spitz et al. |
| 2015/0269384 A1 | 9/2015 | Holman et al. |
| 2015/0309813 A1 | 10/2015 | Patel |
| 2015/0310227 A1 | 10/2015 | Ishida et al. |
| 2015/0310575 A1 | 10/2015 | Shelton |
| 2015/0356362 A1 | 12/2015 | Demos |
| 2015/0379430 A1 | 12/2015 | Dirac et al. |
| 2016/0012465 A1 | 1/2016 | Sharp |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071112 A1 | 3/2016 | Unser |
| 2016/0099963 A1 | 4/2016 | Mahaffey et al. |
| 2016/0103963 A1 | 4/2016 | Mishra |
| 2016/0125550 A1 | 5/2016 | Joao et al. |
| 2016/0125749 A1 | 5/2016 | Delacroix et al. |
| 2016/0125751 A1 | 5/2016 | Barker et al. |
| 2016/0140466 A1 | 5/2016 | Sidebottom et al. |
| 2016/0143570 A1 | 5/2016 | Valacich et al. |
| 2016/0148143 A1 | 5/2016 | Anderson et al. |
| 2016/0162269 A1 | 6/2016 | Pogorelik et al. |
| 2016/0164915 A1 | 6/2016 | Cook |
| 2016/0180386 A1 | 6/2016 | Konig |
| 2016/0188450 A1 | 6/2016 | Appusamy et al. |
| 2016/0196189 A1 | 7/2016 | Miyagi et al. |
| 2016/0225000 A1 | 8/2016 | Glasgow |
| 2016/0232534 A1 | 8/2016 | Lacey et al. |
| 2016/0234319 A1 | 8/2016 | Griffin |
| 2016/0261631 A1 | 9/2016 | Vissamsetty et al. |
| 2016/0262163 A1 | 9/2016 | Gonzalez Garrido et al. |
| 2016/0321582 A1 | 11/2016 | Broudou et al. |
| 2016/0321748 A1 | 11/2016 | Mahatma et al. |
| 2016/0330237 A1 | 11/2016 | Edlabadkar |
| 2016/0342811 A1 | 11/2016 | Whitcomb et al. |
| 2016/0364736 A1 | 12/2016 | Maugans, III |
| 2016/0370954 A1 | 12/2016 | Burningham et al. |
| 2016/0378762 A1 | 12/2016 | Rohter |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0034101 A1 | 2/2017 | Kumar et al. |
| 2017/0041324 A1 | 2/2017 | Ionutescu et al. |
| 2017/0046753 A1 | 2/2017 | Deupree, IV |
| 2017/0068785 A1 | 3/2017 | Experton et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0140467 A1 | 5/2017 | Neag et al. |
| 2017/0142158 A1 | 5/2017 | Laoutaris et al. |
| 2017/0142177 A1 | 5/2017 | Hu |
| 2017/0154188 A1 | 6/2017 | Meier et al. |
| 2017/0161520 A1 | 6/2017 | Lockhart, III et al. |
| 2017/0171235 A1 | 6/2017 | Mulchandani et al. |
| 2017/0177324 A1 | 6/2017 | Frank et al. |
| 2017/0180378 A1 | 6/2017 | Tyler et al. |
| 2017/0180505 A1 | 6/2017 | Shaw et al. |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0220685 A1 | 8/2017 | Yan et al. |
| 2017/0220964 A1 | 8/2017 | Datta Ray |
| 2017/0249710 A1 | 8/2017 | Guillama et al. |
| 2017/0269791 A1 | 9/2017 | Meyerzon et al. |
| 2017/0270318 A1 | 9/2017 | Ritchie |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2018/0039975 A1 | 2/2018 | Hefetz |
| 2018/0041498 A1 | 2/2018 | Kikuchi |
| 2018/0046753 A1 | 2/2018 | Shelton |
| 2018/0063174 A1 | 3/2018 | Grill et al. |
| 2018/0063190 A1 | 3/2018 | Wright et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0165637 A1 | 6/2018 | Romero et al. |
| 2018/0198614 A1 | 7/2018 | Neumann |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Maung |
| 2018/0307859 A1 | 10/2018 | Lafever et al. |
| 2018/0351888 A1 | 12/2018 | Howard |
| 2018/0352003 A1 | 12/2018 | Winn et al. |
| 2018/0357243 A1 | 12/2018 | Yoon |
| 2018/0365720 A1 | 12/2018 | Goldman et al. |
| 2018/0374030 A1 | 12/2018 | Barday et al. |
| 2018/0375814 A1 | 12/2018 | Hart |
| 2019/0005210 A1 | 1/2019 | Wiederspohn et al. |
| 2019/0012672 A1 | 1/2019 | Francesco |
| 2019/0019184 A1 | 1/2019 | Lacey et al. |
| 2019/0108353 A1 | 4/2019 | Sadeh et al. |
| 2019/0130132 A1 | 5/2019 | Barbas et al. |
| 2019/0138496 A1 | 5/2019 | Yamaguchi |
| 2019/0156053 A1 | 5/2019 | Vogel et al. |
| 2019/0156058 A1 | 5/2019 | Van Dyne et al. |
| 2019/0182294 A1 | 6/2019 | Rieke et al. |
| 2019/0188402 A1 | 6/2019 | Wang et al. |
| 2019/0266201 A1 | 8/2019 | Barday et al. |
| 2019/0266350 A1 | 8/2019 | Barday et al. |
| 2019/0268343 A1 | 8/2019 | Barday et al. |
| 2019/0268344 A1 | 8/2019 | Barday et al. |
| 2019/0294818 A1 | 9/2019 | Barday et al. |
| 2019/0333118 A1 | 10/2019 | Crimmins et al. |
| 2019/0362268 A1* | 11/2019 | Fogarty ................ G06N 5/047 |
| 2019/0378073 A1 | 12/2019 | Lopez et al. |
| 2019/0384934 A1 | 12/2019 | Kim |
| 2019/0392170 A1 | 12/2019 | Barday et al. |
| 2019/0392171 A1 | 12/2019 | Barday et al. |
| 2020/0020454 A1 | 1/2020 | McGarvey et al. |
| 2020/0090197 A1 | 3/2020 | Rodriguez et al. |
| 2020/0110589 A1 | 4/2020 | Bequet et al. |

FOREIGN PATENT DOCUMENTS

| | | |
|---|---|---|
| KR | 20130062500 | 6/2013 |
| WO | 2001033430 | 5/2001 |
| WO | 2005008411 | 1/2005 |
| WO | 2007002412 | 1/2007 |
| WO | 2012174659 | 12/2012 |
| WO | 2015116905 | 8/2015 |

OTHER PUBLICATIONS

Office Action, dated Jun. 24, 2019, from corresponding U.S. Appl. No. 16/410,336.

Office Action, dated Jun. 27, 2019, from corresponding U.S. Appl. No. 16/404,405.

Office Action, dated Mar. 11, 2019, from corresponding U.S. Appl. No. 16/220,978.

Office Action, dated Mar. 12, 2019, from corresponding U.S. Appl. No. 16/221,153.

Office Action, dated Mar. 25, 2019, from corresponding U.S. Appl. No. 16/278,121.

Office Action, dated Mar. 27, 2019, from corresponding U.S. Appl. No. 16/278,120.

Office Action, dated Mar. 30, 2018, from corresponding U.S. Appl. No. 15/894,890.

Office Action, dated Mar. 30, 2018, from corresponding U.S. Appl. No. 15/896,790.

Office Action, dated Mar. 4, 2019, from corresponding U.S. Appl. No. 16/237,083.

(56) References Cited

OTHER PUBLICATIONS

Office Action, dated May 16, 2018, from corresponding U.S. Appl. No. 15/882,989.
Office Action, dated May 17, 2019, from corresponding U.S. Appl. No. 16/277,539.
Office Action, dated May 2, 2018, from corresponding U.S. Appl. No. 15/894,809.
Office Action, dated May 2, 2019, from corresponding U.S. Appl. No. 16/104,628.
Office Action, dated Nov. 1, 2017, from corresponding U.S. Appl. No. 15/169,658.
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 15, 2018, from corresponding U.S. Appl. No. 16/054,780.
Office Action, dated Oct. 16, 2019, from corresponding U.S. Appl. No. 16/557,392.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 16, 2019, from corresponding U.S. Appl. No. 16/277,715.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Abdullah et al, "The Mapping Process of Unstructured Data to the Structured Data", ACM, pp. 151-155 (Year: 2013).
Acar, Gunes, et al, The Web Never Forgets, Computer and Communications Security, ACM, Nov. 3, 2014, pp. 674-689.
Aghasian, Erfan, et al, Scoring Users' Privacy Disclosure Across Multiple Online Social Networks,IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework" IEEE, pp. 659-662 (Year: 2009).
Antunes et al, "Preserving Digital Data in Heterogeneous Environments", ACM, pp. 345-348, 2009 (Year: 2009).
Avepoint, Automating Privacy Impact Assessments, AvePoint, Inc.
Avepoint, AvePoint Privacy Impact Assessment 1: User Guide, Cumulative Update 2, Revision E, Feb. 2015, AvePoint, Inc.
Avepoint, Installing and Configuring the APIA System, International Association of Privacy Professionals, AvePoint, Inc.
Barker, "Personalizing Access Control by Generalizing Access Control," ACM, pp. 149-158 (Year: 2010).
Bayardo et al, "Technological Solutions for Protecting Privacy," Computer 36.9 (2003), pp. 115-118, (Year: 2003).
Restriction Requirement, dated Jul. 28, 2017, from corresponding U.S. Appl. No. 15/169,658.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Sep. 9, 2019, from corresponding U.S. Appl. No. 16/505,426.
Salim et al, "Data Retrieval and Security using Lightweight Directory Access Protocol", IEEE, pp. 685-688 (Year: 2009).
Santhisree, et al, "Web Usage Data Clustering Using Dbscan Algorithm and Set Similarities," IEEE, pp. 220-224 (Year: 2010).
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Srivastava, Agrima, et al, Measuring Privacy Leaks in Online Social Networks, International Conference on Advances in Computing, Communications and Informatics (ICACCI), 2013.
Stern, Joanna, "iPhone Privacy Is Broken . . . and Apps Are to Blame", The Wall Street Journal, wsj.com, May 31, 2019.
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
The Cookie Collective, Optanon Cookie Policy Generator, The Cookie Collective, Year 2016, http://web.archive.org/web/20160324062743/https:/optanon.com/.
TRUSTe Announces General Availability of Assessment Manager for Enterprises to Streamline Data Privacy Management with Automation, PRNewswire, Mar. 4, 2015.
Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year: 2006).
Weaver et al, "Understanding Information Preview in Mobile Email Processing", ACM, pp. 303-312, 2011 (Year: 2011).
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.

(56) References Cited

OTHER PUBLICATIONS

Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Written Opinion of the International Searching Authority, dated Jan. 14, 2019, from corresponding International Application No. PCT/US2018/046949.
Written Opinion of the International Searching Authority, dated Jan. 7, 2019, from corresponding International Application No. PCT/US2018/055772.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated Nov. 19, 2018, from corresponding International Application No. PCT/US2018/046939.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
www.truste.com (1), 200150207, Internet Archive Wayback Machine, www.archive.org,2_7_2015.
Yang et al, "DAC-MACS: Effective Data Access Control for Multiauthority Cloud Storage Systems," IEEE, pp. 1790-1801 (Year: 2013).
Final Office Action, dated Dec. 9, 2019, from corresponding U.S. Appl. No. 16/410,336.
Final Office Action, dated Feb. 19, 2020, from corresponding U.S. Appl. No. 16/404,491.
Final Office Action, dated Feb. 3, 2020, from corresponding U.S. Appl. No. 16/557,392.
Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.
Final Office Action, dated Mar. 5, 2019, from corresponding U.S. Appl. No. 16/055,961.
Final Office Action, dated Nov. 29, 2017, from corresponding U.S. Appl. No. 15/619,237.
Final Office Action, dated Sep. 25, 2019, from corresponding U.S. Appl. No. 16/278,119.
Office Action, dated Apr. 18, 2018, from corresponding U.S. Appl. No. 15/894,819.
Office Action, dated Apr. 22, 2019, from corresponding U.S. Appl. No. 16/241,710.
Office Action, dated Apr. 5, 2019, from corresponding U.S. Appl. No. 16/278,119.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Office Action, dated Aug. 19, 2019, from corresponding U.S. Appl. No. 16/278,122.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 27, 2019, from corresponding U.S. Appl. No. 16/410,296.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 6, 2019, from corresponding U.S. Appl. No. 16/404,491.
Office Action, dated Dec. 11, 2019, from corresponding U.S. Appl. No. 16/578,712.
Office Action, dated Dec. 14, 2018, from corresponding U.S. Appl. No. 16/104,393.
Office Action, dated Dec. 15, 2016, from corresponding U.S. Appl. No. 15/256,419.

(56) References Cited

OTHER PUBLICATIONS

Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 23, 2019, from corresponding U.S. Appl. No. 16/593,639.
Office Action, dated Dec. 3, 2018, from corresponding U.S. Appl. No. 16/055,998.
Office Action, dated Dec. 31, 2018, from corresponding U.S. Appl. No. 16/160,577.
Office Action, dated Feb. 15, 2019, from corresponding U.S. Appl. No. 16/220,899.
Office Action, dated Feb. 26, 2019, from corresponding U.S. Appl. No. 16/228,250.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Jan. 18, 2019, from corresponding U.S. Appl. No. 16/055,984.
Office Action, dated Jan. 24, 2020, from corresponding U.S. Appl. No. 16/505,426.
Office Action, dated Jan. 24, 2020, from corresponding U.S. Appl. No. 16/700,049.
Office Action, dated Jan. 27, 2020, from corresponding U.S. Appl. No. 16/656,895.
Office Action, dated Jan. 28, 2020, from corresponding U.S. Appl. No. 16/712,104.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 7, 2020, from corresponding U.S. Appl. No. 16/572,182.
Office Action, dated Jul. 18, 2019, from corresponding U.S. Appl. No. 16/410,762.
Office Action, dated Jul. 21, 2017, from corresponding U.S. Appl. No. 15/256,430.
Office Action, dated Jul. 23, 2019, from corresponding U.S. Appl. No. 16/436,616.
Berezovskiy et al, "A framework for dynamic data source identification and orchestration on the Web", ACM, pp. 1-8 (Year: 2010).
Bertino et al, "On Specifying Security Policies for Web Documents with an XML-based Language," ACM, pp. 57-65 (Year: 2001).
Bhargav-Spantzel et al., Receipt Management—Transaction History based Trust Establishment, 2007, ACM, p. 82-91.
Bhuvaneswaran et al, "Redundant Parallel Data Transfer Schemes for the Grid Environment", ACM, pp. 18 (Year: 2006).
Binns, et al, "Data Havens, or Privacy Sans Frontieres? A Study of International Personal Data Transfers," ACM, pp. 273-274 (Year: 2002).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Cerpzone, "How to Access Data on Data Archival Storage and Recovery System", https://www.saj.usace.army.mil/Portals/44/docs/Environmental/Lake%20O%20Watershed/15February2017/How%20To%20Access%20Model%20Data%20on%20DASR.pdf?ver=2017-02-16-095535-633, Feb. 16, 2017.
Choi et al, "Retrieval Effectiveness of Table of Contents and Subject Headings," ACM, pp. 103-104 (Year: 2007).
Chowdhury et al, "A System Architecture for Subject-Centric Data Sharing", ACM, pp. 1-10 (Year: 2018).

Decision Regarding Institution of Post-Grant Review in Case PGR2018-00056 for U.S. Pat. No. 9,691,090 B1, Oct. 11, 2018.
Dimou et al, "Machine-Interpretable Dataset and Service Descriptions for Heterogeneous Data Access and Retrieval", ACM, pp. 145-152 (Year: 2015).
Dokholyan et al, "Regulatory and Ethical Considerations for Linking Clinical and Administrative Databases," American Heart Journal 157.6 (2009), pp. 971-982 (Year: 2009).
Dunkel et al, "Data Organization and Access for Efficient Data Mining", IEEE, pp. 522-529 (Year: 1999).
Dwork, Cynthia, Differential Privacy, Microsoft Research, p. 1-12.
Emerson, et al, "A Data Mining Driven Risk Profiling Method for Road Asset Management," ACM, pp. 1267-1275 (Year: 2013).
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.
Final Written Decision Regarding Post-Grant Review in Case PGR2018-00056 for U.S. Pat. No. 9,691,090 B1, Oct. 10, 2019.
Francis, Andre, Business Mathematics and Statistics, South-Western Cengage Learning, 2008, Sixth Edition.
Frikken, Keith B., et al, Yet Another Privacy Metric for Publishing Micro-data, Miami University, Oct. 27, 2008, p. 117-121.
Fung et al, "Discover Information and Knowledge from Websites using an Integrated Summarization and Visualization Framework", IEEE, pp. 232-235 (Year 2010).
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.
Guo, et al, "OPAL: A Passe-partout for Web Forms," ACM, pp. 353-356 (Year: 2012).
Gustarini, et al, "Evaluation of Challenges in Human Subject Studies "In-the-Wild" Using Subjects' Personal Smartphones," ACM, pp. 1447-1456 (Year 2013).
Hacigümüs, Hakan, et al, Executing SQL over Encrypted Data in the Database-Service-Provider Model, ACM, Jun. 4, 2002, pp. 216-227.
Hodge, et al, "Managing Virtual Data Marts with Metapointer Tables," pp. 1-7 (Year: 2002).
Huner et al, "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014.
Huo et al, "A Cloud Storage Architecture Model for Data-Intensive Applications," IEEE, pp. 1-4 (Year: 2011).
IAPP, Daily Dashboard, PIA Tool Stocked With New Templates for DPI, Infosec, International Association of Privacy Professionals, Apr. 22, 2014.
IAPP, ISO/IEC 27001 Information Security Management Template, Resource Center, International Association of Privacy Professionals.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.

(56) References Cited

OTHER PUBLICATIONS

International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Jan. 14, 2019, from corresponding International Application No. PCT/US2018/046949.
International Search Report, dated Jan. 7, 2019, from corresponding International Application No. PCT/US2018/055772.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Mar. 14, 2019, from corresponding International Application No. PCT/US2018/055736.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated Nov. 19, 2018, from corresponding International Application No. PCT/US2018/046939.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.

Islam, et al, "Mixture Model Based Label Association Techniques for Web Accessibility," ACM, pp. 67-76 (Year: 2010).
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Joonbakhsh et al, "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.1145/3200000/3196462/p78-joonbakhsh.pdf?(Year: 2018).
Jun et al, "Scalable Multi-Access Flash Store for Big Data Analytics," ACM, pp. 55-64 (Year: 2014).
Kirkam, et al, "A Personal Data Store for an Internet of Subjects," IEEE, pp. 92-97 (Year: 2011).
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Krol, Kat, et al, Control versus Effort in Privacy Warnings for Webforms, ACM, Oct. 24, 2016, pp. 13-23.
Lamb et al, "Role-Based Access Control for Data Service Integration", ACM, pp. 3-11 (Year: 2006).
Lebeau, Franck, et al, "Model-Based Vulnerability Testing for Web Applications," 2013 IEEE Sixth International Conference on Software Testing, Verification and Validation Workshops, pp. 445-452, IEEE, 2013 (Year: 2013).
Li, Ninghui, et al, t-Closeness: Privacy Beyond k-Anonymity and l-Diversity, IEEE, 2014, p. 106-115.
Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Maret et al, "Multimedia Information Interchange: Web Forms Meet Data Servers", IEEE, pp. 499-505 (Year: 1999).
McGarth et al, "Digital Library Technology for Locating and Accessing Scientific Data", ACM, pp. 188-194 (Year: 1999).
Mudepalli et al, "An efficient data retrieval approach using blowfish encryption on cloud CipherText Retrieval in Cloud Computing" IEEE, pp. 267-271 (Year: 2017).
Newman, "Email Archive Overviews using Subject Indexes", ACM, pp. 652-653, 2002 (Year: 2002).
Notice of Allowance, dated Apr. 12, 2017, from corresponding U.S. Appl. No. 15/256,419.
Notice of Allowance, dated Apr. 2, 2019, from corresponding U.S. Appl. No. 16/160,577.
Notice of Allowance, dated Apr. 25, 2018, from corresponding U.S. Appl. No. 15/883,041.
Notice of Allowance, dated Apr. 8, 2019, from corresponding U.S. Appl. No. 16/228,250.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 28, 2019, from corresponding U.S. Appl. No. 16/278,120.
Notice of Allowance, dated Aug. 30, 2018, from corresponding U.S. Appl. No. 15/996,208.
Notice of Allowance, dated Aug. 9, 2018, from corresponding U.S. Appl. No. 15/882,989.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Yin et al, "Multibank Memory Optimization for Parallel Data Access in Multiple Data Arrays", ACM, pp. 1-8 (Year: 2016).
Yiu et al, "Outsourced Similarity Search on Metric Data Assets", IEEE, pp. 338-352 (Year: 2012).

(56) References Cited

OTHER PUBLICATIONS

Yu, "Using Data from Social Media Websites to Inspire the Design of Assistive Technology", ACM, pp. 1-2 (Year: 2016).
Yu, et al, "Performance and Fairness Issues in Big Data Transfers," ACM, pp. 9-11 (Year: 2014).
Zannone, et al, "Maintaining Privacy on Derived Objects," ACM, pp. 10-19 (Year: 2005).
Zeldovich, Nickolai, et al, Making Information Flow Explicit in HiStar, OSDI '06: 7th USENIX Symposium on Operating Systems Design and Implementation, USENIX Association, p. 263-278.
Zhang et al, "Data Transfer Performance Issues for a Web Services Interface to Synchrotron Experiments", ACM, pp. 59-65 (Year: 2007).
Zhang et al, "Dynamic Topic Modeling for Monitoring Market Competition from Online Text and Image Data", ACM, pp. 1425-1434 (Year: 2015).
Zhu, et al, "Dynamic Data Integration Using Web Services," IEEE, pp. 1-8 (Year: 2004).
Carpineto et al, "Automatic Assessment of Website Compliance to the European Cookie Law with CooLCheck," Proceedings of the 2016 ACM on Workshop on Privacy in the Electronic Society, 2016, pp. 135-138 (Year: 2016).
Final Office Action, dated Mar. 6, 2020, from corresponding U.S. Appl. No. 16/595,342.
Friedman et al, "Informed Consent in the Mozilla Browser: Implementing Value-Sensitive Design," Proceedings of be 35th Annual Hawaii International Conference on System Sciences, 2002, IEEE, pp. 1-10 (Year: 2002).
Lizar et al, "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).
Mundada et al, "Half-Baked Cookies: Hardening Cookie-Based Authentication for the Modern Web," Proceedings of the 11th ACM on Asia Conference on Computer and Communications Security, 2016, pp. 675-685 (Year: 2016).
Notice of Allowance, dated Feb. 25, 2020, from corresponding U.S. Appl. No. 16/714,355.
Notice of Allowance, dated Mar. 16, 2020, from corresponding U.S. Appl. No. 16/778,704.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Office Action, dated Mar. 16, 2020, from corresponding U.S. Appl. No. 16/719,488.
Office Action, dated Mar. 17, 2020, from corresponding U.S. Appl. No. 16/565,395.
Office Action, dated Mar. 17, 2020, from corresponding U.S. Appl. No. 16/719,071.
Rozepz, "What is Google Privacy Checkup? Everything You Need to Know," Tom's Guide web post, Apr. 26, 2018, pp. 1-11 (Year: 2018).
Notice of Allowance, dated Jun. 6, 2019, from corresponding U.S. Appl. No. 16/159,628.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 2, 2018, from corresponding U.S. Appl. No. 15/858,802.
Notice of Allowance, dated Mar. 25, 2019, from corresponding U.S. Appl. No. 16/054,780.
Notice of Allowance, dated Mar. 27, 2019, from corresponding U.S. Appl. No. 16/226,280.
Notice of Allowance, dated Mar. 29, 2019, from corresponding U.S. Appl. No. 16/055,998.
Notice of Allowance, dated May 21, 2018, from corresponding U.S. Appl. No. 15/896,790.
Notice of Allowance, dated May 28, 2019, from corresponding U.S. Appl. No. 16/277,568.
Notice of Allowance, dated May 5, 2017, from corresponding U.S. Appl. No. 15/254,901.
Notice of Allowance, dated Nov. 14, 2019, from corresponding U.S. Appl. No. 16/436,616.
Notice of Allowance, dated Nov. 2, 2018, from corresponding U.S. Appl. No. 16/054,762.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Notice of Allowance, dated Oct. 3, 2019, from corresponding U.S. Appl. No. 16/511,700.
Notice of Allowance, dated Sep. 12, 2019, from corresponding U.S. Appl. No. 16/512,011.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 27, 2017, from corresponding U.S. Appl. No. 15/626,052.
Notice of Allowance, dated Sep. 28, 2018, from corresponding U.S. Appl. No. 16/041,520.
Notice of Allowance, dated Sep. 4, 2018, from corresponding U.S. Appl. No. 15/883,041.
Notice of Filing Date for Petition for Post-Grant Review of related U.S. Pat. No. 9,691,090 dated Apr. 12, 2018.
Olenski, Steve, for Consumers, Data Is a Matter of Trust, CMO Network, Apr. 18, 2016, https://www.forbes.com/sites/steveolenski/2016/04/18/for-consumers-data-is-a-matter-of-trust/#2e48496278b3.
Petition for Post-Grant Review of related U.S. Pat. No. 9,691,090 dated Mar. 27, 2018.
Petrie et al, "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Popescu-Zeletin, "The Data Access and Transfer Support in a Local Heterogeneous Network (HMINET)", IEEE, pp. 147-152 (Year: 1979).

(56) References Cited

OTHER PUBLICATIONS

Qing-Jiang et al, "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).
Qiu, et al, "Design and Application of Data Integration Platform Based on Web Services and XML," IEEE, pp. 253-256 (Year: 2016).
Restriction Requirement, dated Apr. 10, 2019, from corresponding U.S. Appl. No. 16/277,715.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Notice of Allowance, dated Dec. 11, 2019, from corresponding U.S. Appl. No. 16/593,634.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 13, 2019, from corresponding U.S. Appl. No. 16/512,033.
Notice of Allowance, dated Dec. 16, 2019, from corresponding U.S. Appl. No. 16/505,461.
Notice of Allowance, dated Dec. 18, 2019, from corresponding U.S. Appl. No. 16/659,437.
Notice of Allowance, dated Dec. 23, 2019, from corresponding U.S. Appl. No. 16/656,835.
Notice of Allowance, dated Dec. 3, 2019, from corresponding U.S. Appl. No. 16/563,749.
Notice of Allowance, dated Dec. 31, 2018, from corresponding U.S. Appl. No. 16/159,634.
Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Dec. 9, 2019, from corresponding U.S. Appl. No. 16/565,261.
Notice of Allowance, dated Feb. 10, 2020, from corresponding U.S. Appl. No. 16/552,765.
Notice of Allowance, dated Feb. 12, 2020, from corresponding U.S. Appl. No. 16/572,182.
Notice of Allowance, dated Feb. 13, 2019, from corresponding U.S. Appl. No. 16/041,561.
Notice of Allowance, dated Feb. 14, 2019, from corresponding U.S. Appl. No. 16/226,272.
Notice of Allowance, dated Feb. 19, 2019, from corresponding U.S. Appl. No. 16/159,632.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Jan. 14, 2020, from corresponding U.S. Appl. No. 16/277,715.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 26, 2018, from corresponding U.S. Appl. No. 15/619,469.
Notice of Allowance, dated Jan. 29, 2020, from corresponding U.S. Appl. No. 16/278,119.
Notice of Allowance, dated Jan. 8, 2020, from corresponding U.S. Appl. No. 16/600,879.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 17, 2019, from corresponding U.S. Appl. No. 16/055,961.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 31, 2019, from corresponding U.S. Appl. No. 16/221,153.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 21, 2019, from corresponding U.S. Appl. No. 16/404,439.
Notice of Allowance, dated Jun. 27, 2018, from corresponding U.S. Appl. No. 15/882,989.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Final Office Action, dated Apr. 7, 2020, from corresponding U.S. Appl. No. 16/595,327.
Moiso et al, "Towards a User-Centric Personal Data Ecosystem the Role of the Bank of Individual's Data," 2012 16th International Conference on Intelligence in Next Generation Networks, Berlin, 2012, pp. 202-209 (Year: 2012).
Notice of Allowance, dated Mar. 24, 2020, from corresponding U.S. Appl. No. 16/552,758.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 31, 2020, from corresponding U.S. Appl. No. 16/563,744.
Office Action, dated Apr. 7, 2020, from corresponding U.S. Appl. No. 16/788,633.
Office Action, dated Apr. 7, 2020, from corresponding U.S. Appl. No. 16/791,589.

(56) References Cited

OTHER PUBLICATIONS

Office Action, dated Mar. 20, 2020, from corresponding U.S. Appl. No. 16/778,709.
Office Action, dated Mar. 23, 2020, from corresponding U.S. Appl. No. 16/671,444.
Office Action, dated Mar. 25, 2020, from corresponding U.S. Appl. No. 16/701,043.
Office Action, dated Mar. 25, 2020, from corresponding U.S. Appl. No. 16/791,006.
Notice of Allowance, dated Apr. 9, 2020, from corresponding U.S. Appl. No. 16/791,075.
Restriction Requirement, dated Apr. 13, 2020, from corresponding U.S. Appl. No. 16/817,136.
Agrawal et al, "Securing Electronic Health Records Without Impeding the Flow of Information," International Journal of Medical Informatics 76, 2007, pp. 471-479 (Year: 2007).
Bang et al, "Building an Effective and Efficient Continuous Web Application Security Program," 2016 International conference on Cyber Security Situational Awareness, Data Analytics and Assessment (CyberSA), London, 2016, pp. 1-4 (Year: 2016).
Brandt et al, "Efficient Metadata Management in Large Distributed Storage Systems," IEEE, pp. 1-9 (Year: 2003).
Chapados et al, "Scoring Models for Insurance Risk Sharing Pool Optimization," 2008, IEEE, pp. 97-105 (Year: 2008).
Final Office Action, dated Apr. 23, 2020, from corresponding U.S. Appl. No. 16/572,347.
Gowadia et al, "Rdf Metadata for XML Access Control," Acm, pp. 31-48 (Year: 2003).
Notice of Allowance, dated Apr. 17, 2020, from corresponding U.S. Appl. No. 16/593,639.
Notice of Allowance, dated Apr. 29, 2020, from corresponding U.S. Appl. No. 16/700,049.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated May 1, 2020, from corresponding U.S. Appl. No. 16/586,202.
Notice of Allowance, dated May 11, 2020, from corresponding U.S. Appl. No. 16/186,196.
Notice of Allowance, dated May 5, 2020, from corresponding U.S. Appl. No. 16/563,754.
Notice of Allowance, dated May 7, 2020, from corresponding U.S. Appl. No. 16/505,426.
O'Keefe et al, "Privacy-Preserving Data Linkage Protocols," Proceedings of the 2004 ACM Workshop on Privacy in be Electronic Society, 2004, pp. 94-102 (Year 2004).
Office Action, dated Apr. 20, 2020, from corresponding U.S. Appl. No. 16/812,795.
Office Action, dated Apr. 22, 2020, from corresponding U.S. Appl. No. 16/811,793.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 29, 2020, from corresponding U.S. Appl. No. 16/791,337.
Office Action, dated May 5, 2020, from corresponding U.S. Appl. No. 16/410,336.
Porter, "De-Identified Data and Third Party Data Mining: The Risk of Re-Identification of Personal Information," Shidler JL Com. & Tech. 5, 2008, pp. 1-9 (Year: 2008).
Restriction Requirement, dated May 5, 2020, from corresponding U.S. Appl. No. 16/808,489.
Thuraisingham, "Security Issues for the Semantic Web," Proceedings 27th Annual International Computer Software and Applications Conference, Compsac 2003, Dallas, TX, USA, 2003, pp. 633-638 (Year: 2003).
Wang et al, "Revealing Key Non-Financial Factors for Online Credit-Scoring in E-Financing," 2013, IEEE, pp. 1-6 (Year: 2013).
Wang et al, "Secure and Efficient Access to Outsourced Data," ACM, pp. 55-65 (Year: 2009).
Office Action, dated May 14, 2020, from corresponding U.S. Appl. No. 16/808,497.
Office Action, dated May 14, 2020, from corresponding U.S. Appl. No. 16/808,503.
Office Action, dated May 15, 2020, from corresponding U.S. Appl. No. 16/808,493.
Notice of Allowance, dated May 19, 2020, from corresponding U.S. Appl. No. 16/505,430.
Notice of Allowance, dated May 19, 2020, from corresponding U.S. Appl. No. 16/808,496.
Advisory Action, dated Jun. 2, 2020, from corresponding U.S. Appl. No. 16/404,491.
Advisory Action, dated May 21, 2020, from corresponding U.S. Appl. No. 16/557,392.
Ahmad et al, "Task-Oriented Access Model for Secure Data Sharing Over Cloud," ACM, pp. 1-7 (Year: 2015).
Carminati et al, "Enforcing Access Control Over Data Streams," ACM, pp. 21-30 (Year: 2007).
Cha et al, "A Data-Driven Security Risk Assessment Scheme for Personal Data Protection," IEEE, pp. 50510-50517 year: 2018).
Chowdhury et al, "Managing Data Transfers in Computer Clusters with Orchestra," ACM, pp. 98-109 (Year: 2011).
Golfarelli et al, "Beyond Data Warehousing: What's Next in Business Intelligence?," ACM, pp. 1-6 (Year: 2004).
Mesbah et al, "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).
Notice of Allowance, dated Jun. 1, 2020, from corresponding U.S. Appl. No. 16/813,321.
Notice of Allowance, dated Jun. 16, 2020, from corresponding U.S. Appl. No. 16/798,818.
Notice of Allowance, dated Jun. 17, 2020, from corresponding U.S. Appl. No. 16/656,895.
Notice of Allowance, dated Jun. 8, 2020, from corresponding U.S. Appl. No. 16/712,104.
Notice of Allowance, dated May 20, 2020, from corresponding U.S. Appl. No. 16/107,762.
Notice of Allowance, dated May 27, 2020, from corresponding U.S. Appl. No. 16/820,208.
Notice of Allowance, dated May 28, 2020, from corresponding U.S. Appl. No. 16/799,279.
Office Action, dated Jun. 1, 2020, from corresponding U.S.,Appl. No. 16/862,952.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Pechenizkiy et al, "Process Mining Online Assessment Data," Educational Data Mining, pp. 279-288 (Year: 2009).
Ping et al, "Wide Area Placement of Data Replicas for Fast and Highly Available Data Access," ACM, pp. 1-8 (Year: 2011).
Sanzo et al, "Analytical Modeling of Lock-Based Concurrency Control with Arbitrary Transaction Data Access Patterns," ACM, pp. 69-78 (Year: 2010).
Srinivasan et al, "Descriptive Data Analysis of File Transfer Data," ACM, pp. 1-8 (Year: 2014).
Tsai et al, "Determinants of Intangible Assets Value: The Data Mining Approach," Knowledge Based System, pp. 67-77 http://www.elsevier.com/locate/knosys (Year 2012).
Ye et al, "An Evolution-Based Cache Scheme for Scalable Mobile Data Access," ACM, pp. 1-7 (Year: 2007).
Advisory Action, dated Jun. 19, 2020, from corresponding U.S. Appl. No. 16/595,342.
Notice of Allowance, dated Jun. 22, 2020, from corresponding U.S. Appl. No. 16/791,337.

* cited by examiner

ACME CORPORATION

Products  Services  Pricing  Company  Partners  Blog  Contact  RFP Template  Free Trial Request Demo

Privacy Policy

Effective Date: 17 April 2017

Policy Pages
Privacy Policy
Cookie Policy

We at OneTrust LLC and OneTrust Technology Limited (collectively, "OneTrust," "we" and "us") know you care about how your personal information is used and shared, and we take your privacy seriously. Please read the following to learn more about how we collect, store, use and disclose information about you when you interact or use any of the following websites: www.onetrust.com, www.cookielaw.org, www.optanon.com, www.governor.co.uk, and https://cookiepedia.co.uk/ (collectively the "Websites") or any related events, trade shows, sales or marketing, and/or if you use any of our products, services or applications (including any trial) (collectively the "Services") in any manner.

What does this Privacy Policy cover?
This Privacy Policy covers our treatment of information that we gather when you are accessing or Submit a Privacy Related Request

FIG. 7

ACME CORPORATION

I am a(n):   *Select One*
[ Customer ]  [ Employee ]  [ Other ]

My request involves:   *Select One*
[ Requesting Info ]  [ Deleting Data ]  [ Filing a Complaint ]
[ Opting Out ]  [ Updating Data ]  [ Other ]

First Name*:
Joe

Last Name*:
Lopez

Email Address*:                          Telephone:
Jlopez123456789@gmail.com                1234567890

Addr Line 1:                             Addr Line 2:
123 Main St.                             Box 502

City
Madrid

Country of Residence:
Spain

Details of my request:
Send me my Data

[ Submit ]

ACME Privacy
123 Main St.
Capital City, ST, USA 20219

+1 800-123-4578
emailaboutprivacy@ACME.com
Link to Privacy Policy

FIG. 9

ACME CORPORATION

I am a(n): *Select One*
[ Customer ] [ Employee ] [ Other ]

Thank you! A confirmation of your submission has been sent to the following email: Jlopez123456789@gmail.com

Your Request ID is: 5

OK

First Name*:
Joe

Last Name*:
Lopez

Email Address*:
Jlopez123456789@gmail.com

Telephone:
1234567890

Addr Line 1:
123 Main St.

Addr Line 2:
Box 502

City
Madrid

Country of Residence*:
Spain

Details of my request:
Send me my Data

ACME Privacy
123 Main St.
Capital City, ST, USA 20219

+1 800-123-4578
emailaboutprivacy@ACME.com
Link to Privacy Policy

FIG. 10

From: OneTrust Privacy Officer
Sent: Sunday, February 19, 2017 9:27 PM EST
To: Joe Lopez <jlopez123456789@gmail.com>
BCc: Amelia Davis <adavis09876@ACME.com>
Subject: *Your ACME Privacy Request is being processed*

Data Request

---

Thank you for your submission! Here are the details of your request:

Request ID: 5
Date Submitted: 2/21/2017 10:35AM EST
I am a(n): Customer
My request involves: Opting Out
**First Name\*:** Joe
**Last Name\*:** Lopez
**Email Address\*:** Jlopez123456789@gmail.com
Telephone: XXXXXX986
Addr Line 1: XXXXXXXXXX
Addr Line 2: XXXXXXXXXX
City: XXXXXXXXXX
**Count of Residence\*:** XXXXXXXXXX
Details of my request:
Send me my Data If you have any questions regarding your submission, please contact *Amelia Davis* via email or phone:
adavis09876@ACME.com
+00 123 123 9980

---

ACME Privacy
123 Main St.
Capital City, ST, USA 20219

+1 800-123-4578
emailaboutprivacy@ACME.com
Link to Privacy Policy

FIG. 11

Data Subject Request Queue

| | ID ▽ | Name | Status ▽ | Purpose | Days Left to Respond | Extension | Date Created | DSR Type | Respondent | |
|---|---|---|---|---|---|---|---|---|---|---|
| ☐ | 012 | Donald Blair | New | Retrieve | 30 | NO | 11/02/17 | Employee | Rena Doyle | ∧ |
| ☐ | 012 | Donald Blair | New | Retrieve | 30 | NO | 11/02/17 | Employee | Rena Doyle | ∧ |
| ☐ | 012 | Allison Smith | New | Retrieve | 30 | NO | 11/02/17 | Employee | Rena Doyle | ∧ |
| ☐ | 012 | Donald Blair | Complete | Retrieve | 30 | NO | 11/02/17 | Employee | Rena Doyle | ∧ |

FIG. 12

Data Subject Request Queue

| | ID ▽ | Name | Status ▽ | Purpose | Days Left to Respond | Extension | Date | ndent |
|---|---|---|---|---|---|---|---|---|
| ☐ | 012 | Donald Blair | New | Retrieve | 30 | NO | | Doyle |
| ☑ | 012 | Donald Blair | New | Retrieve | 30 | NO | | Doyle |
| ☐ | 012 | Allison Smith | New | Retrieve | 30 | NO | 11/02/17 | Employee — Rena Doyle |
| ☐ | 012 | Donald Blair | Complete | Retrieve | 30 | NO | 11/02/17 | Employee — Rena Doyle |

Popup menu:
- Verify Request
- Assign
- Request Extension
- Reject
- Suspend

Buttons: New Request, Edit, Filter

FIG. 13

Data Subject Request Queue

Enter Name 🔍     New Request     Edit     Filter

| | ID ▽ | Name | Status ▽ | Purpose | Days Left to Respond | Extension | Date Created | DSR Type | Respondent |
|---|---|---|---|---|---|---|---|---|---|
| ☐ | 012 | Donald Blair | New | Retrieve | 30 | NO | 11/02/17 | Employee | Rena Doyle ∧ |
| ☑ | 012 | Donald Blair | | | | | | Employee | Rena Doyle ∧ |
| ☐ | 012 | Allison Smith | | | | | | Employee | Rena Doyle ∧ |
| ☐ | 012 | Donald Blair | | | | | | Employee | Rena Doyle ∧ |

Authentication ✕

Are you sure you want to Authenticate?
Donald Blair

*Enter reason for rejecting request here*

📎 Upload Attachment

Cancel    Submit

Data Subject Request Queue

*Enter Name* 🔍    (New Request)  (Edit)  (Filter)

| | ID ▽ | Name | Status ▽ | Purpose | Days Left to Respond | Extension | Date Created | DSR Type | Respondent | |
|---|---|---|---|---|---|---|---|---|---|---|
| ☐ | 012 | Tim LePenne | (New) | Retrieve | 30 | NO | 11/02/17 | Employee | Rena Doyle | ∧ |
| ☐ | 012 | Donald Blair | (In progress) | Retrieve | 30 | NO | 11/02/17 | Employee | Rena Doyle | ∧ |
| ☐ | 012 | Allison Smith | (New) | Retrieve | 30 | NO | 11/02/17 | Employee | Rena Doyle | ∧ |
| ☐ | 012 | Franklin Howard | (Complete) | Retrieve | 30 | NO | 11/02/17 | Employee | Rena Doyle | ∧ |

FIG. 16

Data Subject Request Queue

| ID ▽ | Name | Status ▽ | Purpose | Days Left to Respond | Extension | Date | | |
|---|---|---|---|---|---|---|---|---|
| 012 | Tim LePenne | New | Retrieve | 30 | NO | | ndent | |
| 012 | Donald Blair | In progress | Retrieve | 30 | NO | 1 | Doyle | |
| 012 | Allison Smith | In progress | Retrieve | 30 | NO | 11/02/17 | Employee | Rena Doyle |
| 012 | Franklin Howard | Complete | Retrieve | 30 | NO | 11/02/17 | Employee | Rena Doyle |

Popup menu: Verify Request / Assign / Request Extension / Reject / Suspend

Data Subject Request Queue

Enter Name 🔍  New Request  Edit  Filter

| | ID ▾ | Name | Status ▾ | Purpose | Days Left to Respond | Extension | Date Created | DSR Type | Respondent | |
|---|---|---|---|---|---|---|---|---|---|---|
| ☐ | 012 | Tim LePenne | | | | | | Employee | Rena Doyle | ⌄ |
| ☑ | 012 | Donald Blair | | | | | | Employee | Rena Doyle | ⌄ |
| ☐ | 012 | Allison Smith | | | | | | Employee | Rena Doyle | ⌄ |
| ☐ | 012 | Franklin Howard | | | | | | Employee | Rena Doyle | ⌄ |

Request Assignment ✕

Approver: Jason Sabourin

[ Me ]  [ Someone Else ]

Respondent: Jason Sabourin

Comment: *Enter text here*

Cancel    ( Assign )

FIG. 19

Data Subject Request Queue

| | ID ▼ | Name | Status ▼ | Purpose | Days Left to Respond | Extension | Date | ndent | |
|---|---|---|---|---|---|---|---|---|---|
| ☐ | 012 | Tim LePenne | New | Retrieve | 30 | NO | | Doyle | ˅ |
| ☑ | 012 | Donald Blair | In progress | Retrieve | 30 | NO | 1 | Doyle | ˅ |
| ☐ | 012 | Allison Smith | In progress | Retrieve | 30 | NO | 11/02/17 | Employee — Rena Doyle | ˅ |
| ☐ | 012 | Franklin Howard | Complete | Retrieve | 30 | NO | 11/02/17 | Employee — Rena Doyle | ˅ |

Popup menu:
- Verify Request
- Assign
- Request Extension
- Reject
- Suspend

Buttons: Enter Name | New Request | Edit | Filter

Data Subject Request Queue

| | ID ▾ | Name | Status ▾ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | ∧ |
| ☑ | 012 | Donald Blair | Rejected | Retrieve | 30 | NO | 11/02/17 | Employee | Rena Doyle | ∧ |
| ☐ | 012 | Allison Smith | In progress | Retrieve | 30 | NO | 11/02/17 | Employee | Rena Doyle | ∧ |
| ☐ | 012 | Franklin Howard | Complete | Retrieve | 30 | NO | 11/02/17 | Employee | Rena Doyle | ∧ |

FIG. 23

From: OneTrust Privacy Officer
Sent: Sunday, February 19, 2017 9:27 PM EST
To: Allison Smith <asmith123456789@gmail.com>
Bcc: Amelia Davis <adavis09876@ACME.com>
Subject: *Your ACME Privacy Request is being Completed*

Data Response

Dear Allison,

The request submitted cannot be collected as no data regarding the Data Subject is maintained by *mycompany* any longer

---

Here are the details of your request:

Request ID: 5
Date Submitted: 2/21/2017 10:35AM EST
I am a(n): Employee
My request involves: Restrict
**First Name*:** Allison
**Last Name*:** Smith
**Email Address*:** asmith123456789@gmail.com
Telephone: XXXXXXXXX
Addr Line 1: XXXXXXXXXX
Addr Line 2: XXXXXXXXXX
City: XXXXXXXXXX
**Count of Residence*:** XXXXXXXXXX
Details of my request:
Restrict my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

Data Subject Request Queue

| | ID ▼ | Name | Status ▼ | Purpose | Days Left to Respond | Extension | Date Created | DSR Type | Respondent | |
|---|---|---|---|---|---|---|---|---|---|---|
| ☐ | 012 | Donald Blair | New | Retrieve | 30 | NO | 11/02/17 | Employee | Rena Doyle | ∨ |
| ☑ | 012 | Donald Blair | In progress | Retrieve | 2 | NO | 11/02/17 | Employee | Rena Doyle | ∨ |
| ☐ | 012 | Allison Smith | In progress | Retrieve | 30 | NO | 11/02/17 | Employee | Rena Doyle | ∨ |
| ☐ | 012 | Franklin Howard | | | | | | Employee | Rena Doyle | ∨ |

Reject Request

How many days do you want to Extend?

[ 90 ] Days

Due to the complexity of this request, the response has been delayed

Cancel    Submit

FIG. 26

Data Subject Request Queue

| | ID ▾ | Name | Status ▾ | Purpose | Days Left to Respond | Extension | Date Created | DSR Type | Respondent |
|---|---|---|---|---|---|---|---|---|---|
| ☐ | 012 | Tim LePenne | (New) | Retrieve | 30 | NO | 11/02/17 | Employee | Rena Doyle |
| ☐ | 012 | Donald Blair | (New) | Retrieve | 92 | YES | 11/02/17 | Employee | Rena Doyle |
| ☐ | 012 | Allison Smith | (In progress) | Retrieve | 30 | NO | 11/02/17 | Employee | Rena Doyle |
| ☐ | 012 | Franklin Howard | (Complete) | Retrieve | 30 | NO | 11/02/17 | Employee | Rena Doyle |

FIG. 27

From: OneTrust Privacy Officer
Sent: Sunday, February 19, 2017 9:27 PM EST
To: Allison Smith <asmith123456789@gmail.com>
Bcc: Amelia Davis <adavis09876@ACME.com>
Subject: Your ACME Privacy Request is being Completed

Data Response

Dear Allison,

Due to the complexity of this request, the response has been delayed

If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 28

Data Subject Request Details (In Progress)

Request Queue > Response-05

< Back to Queue

Edit

Assignee: Jason Sabourin

Date Opened: 11/02/17

Extended: No

Deadline: 3/25

Request Type: Data Retrieval

Request Count: 1

Tags:
+ Add New

Donald Blair

Request ID: 05
e-mail address: dblair@gmail.com
Address: 123 Main St
Apt 18
Atlanta, Ga 30320

Country: USA
Phone number: 323-420-4039
Subject Type: Customer

Inbox | Comments | Attachments

Today

○ From: Donald Blair
03/09/17 09:33 AM EST

From: OneTrust
03/09/17 09:33 AM EST
CC: Jason Sabourin, Brett Curtis

Monday

From: OneTrust
03/09/17 09:33 AM EST
CC: Jason Sabourin, Brett Curtis

FIG. 30

Data Subject Request Details

Request Queue > Response-05

Assignee: Jason Sabourin

Date Opened: 11/02/17

Extended: No

Deadline: 3/25

Request Type: Data Retrieval

Request Count: 1

Tags: + Add New

Donald Blair

| | | |
|---|---|---|
| Request ID: | 05 | Country: USA |
| e-mail address: | dblair@gmail.com | Phone number: 323-420-4039 |
| Address: | 123 Main St | Subject Type: Customer |
| | Apt 18 | |
| | Atlanta, Ga 30320 | |

Inbox | Comments | Attachments

Unverified Request

In order to respond to this request it must be verified ( Verify Now )

Edit

Back to Queue

FIG. 31

Data Subject Request Details (In progress)

Request Queue > Response-05

Back to Queue  |  Edit

Assignee: Jason Sabourin

Date Opened: 11/02/17

Extended: No

Deadline: 3/25

Request Type: Data Retrieval

Request Count: 1

Tags: + Add New

Donald Blair

| | | | |
|---|---|---|---|
| Request ID: | 05 | Country: | USA |
| e-mail address: | dblair@gmail.com | Phone number: | 323-420-4039 |
| Address: | 123 Main St Apt 18 Atlanta, Ga 30320 | Subject Type: | Customer |

Inbox | Comments | Attachments

Today

- From: Donald Blair
  03/09/17  09:33 AM EST
  Cras mattis consectetur purus sit amet fermentum. Cras justo odio, dapibus ac facilisis in, egestas eget quam. Nullam quis risus eget urna mollis ornare vel eu leo. Maecenas faucibus mollis interdum. Curabitur blandit tempus porttitor.

Monday

- From: OneTrust
  03/09/17  09:33 AM EST
  CC: Jason Sabourin, Brett Curtis

- From: OneTrust
  03/09/17  09:33 AM EST
  CC: Jason Sabourin, Brett Curtis

Reply ▾
- Reply as Rejected
- Reply as Pending
- Reply as Extended
- Reply as Completed
- Reply as Comp w/ Securlink

FIG. 32

Data Subject Request Details (In progress)

Request Queue > Response-05

< Back to Queue                                                                 ( Edit )

Donald Blair

| | | | |
|---|---|---|---|
| Assignee: | Request ID: | 05 | Country: USA |
| Jason Sabourin | e-mail address: | dblair@gmail.com | Phone number: 323-420-4039 |
| Date Opened: | Address: | 123 Main St | Subject Type: Customer |
| 11/02/17 | | Apt 18 | |
| | | Atlanta, Ga 30320 | |

Extended:
No

Deadline:
3/25

Request Type:
Data Retrieval

Request Count:
1

Tags:
( + Add New )

Inbox | Comments | Attachments

Today

✉ From: Donald Blair  03/09/17  09:33 AM EST

Cras mattis consectetur purus sit amet fermentum. Cras justo odio, dapibus ac facilisis in, egestas eget quam. Nullam quis risus eget urna mollis ornare vel eu leo. Maecenas faucibus mollis interdum. Curabitur blandit tempus portitor.

Draft to Donald Blair
CC: *Enter CC Here*

Cras mattis consectetur purus sit amet fermentum. Cras justo odio, dapibus ac facilisis in, egestas eget quam. Nullam quis risus eget urna mollis ornare vel eu leo. Maecenas faucibus mollis interdum. Curabitur blandit tempus portitor.

( Save )   ( Send as Complete 👆 )

✉ From: OneTrust  03/09/17  09:33 AM EST

CC: Jason Sabourin, Brett Curtis

FIG. 33

< Back to Queue

Data Subject Request Details
Request Queue > Response-05

Assignee:
Jason Sabourin

Date Opened:
11/02/17

Extended:
No

Deadline:
3/25

Request Type:
Data Retrieval

Request Count:
1

Tags:
( + Add New )

Donald Blair  ( Complete )

Request ID: 05    Country: USA
e-mail address: dblair@gmail.com   Phone number: 323-420-4039
Address: 123 Main St    Subject Type: Customer
 Apt 18
 Atlanta, Ga 30320

| Inbox | Comments | Attachments |

Today

From: OneTrust
03/09/17 09:33 AM EST       ( Replied as Complete )
CC: Jason Sabourin, Brett Curtis

From: Donald Blair
03/09/17 09:33 AM EST
CC: Jason Sabourin, Brett Curtis

Monday

From: OneTrust
03/09/17 09:33 AM EST
CC: Jason Sabourin, Brett Curtis ( Edit )

FIG. 34

From: OneTrust Privacy Officer
Sent: Sunday, February 19, 2017 9:27 PM EST
To: Joe Lopez <jlopez123456789@gmail.com>
Bcc: Amelia Davis <adavis09876@ACME.com>
Subject: *Your ACME Privacy Request is Completed*

Data Response

Dear Joe,

Your privacy-related request has been completed. In order to access the data you requested, please click the secure link below.

http://www.securelink.onetrust.com/1124ahawlu091284

If you have any questions regarding your submission, please contact *Amelia Davis* via email or phone:
adavis09876@ACME.com
+00 123 123 9980

---

Here are the details of your request:

Request ID: 5
Date Submitted: 2/21/2017 10:35AM EST
I am a(n): Customer
My request involves: Opting Out
**First Name*:** Joe
**Last Name*:** Lopez
**Email Address*:** Jlopez123456789@gmail.com
Telephone: XXXXXXXXX
Addr Line 1: XXXXXXXXXX
Addr Line 2: XXXXXXXXXX
City: XXXXXXXXXX
**Count of Residence*:** XXXXXXXXXX
Details of my request:
Send me my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 35

OneTrust
Privacy Management Software

Request ID

☐ I'm not a robot

Welcome to OneTrust

Features:
- Unlimited usage and respondents
- Centralized record keeping and reporting
- Readiness & PIA Templates
- Data Mapping Automation
- Website Scanning & Cookie Compliance
- Ability to tailor questionnaire templates for use cases including: GDPR, DPIA, Privacy Threshold assessment (PTA), Vendor Risk Assessments, Information Security Assessments, and more Questions? Contact Us support@onetrust.com

FIG. 36

From: OneTrust Privacy Officer
Sent: Sunday, February 19, 2017 9:27 PM EST
To: Joe Lopez <jlopez123456789@gmail.com>
Bcc: Amelia Davis <adavis09876@ACME.com>
Subject: *Your ACME Privacy Request is being Completed*

Auth Token

TOKEN: ABSHI&&@12131JEJE

ACME Privacy
123 Main St.
Capital City, ST, USA 20219

+1 800-123-4578
emailaboutprivacy@ACME.com
Link to Privacy Policy

OneTrust
Privacy Management Software

Request ID

5

Email Token

ABSHI&&@12131JEJE

Log In

Welcome to OneTrust

Features:
- Unlimited usage and respondents
- Centralized record keeping and reporting
- Readiness & PIA Templates
- Data Mapping Automation
- Website Scanning & Cookie Compliance
- Ability to tailor questionnaire templates for use cases including: GDPR, DPIA, Privacy Threshold assessment (PTA), Vendor Risk Assessments, Information Security Assessments, and more Questions? Contact Us support@onetrust.com

FIG. 38

From: Generitech Privacy officer
Sent: Monday, February 20, 2017 9:27 PM EST
To: Alison Smith <asmith123456789@gmail.com>
Bcc: Amelia Davis <adavis09876@generitech.com>
Subject: Your Generitech Privacy Request is completed

OneTrust
Privacy Management Software

Data Subject Request Assignment

Dear Joe,

The following data subject request has been filed, and you have been identified as someone who knows how to fulfill the request. Please click the link below, in order to fulfill the request Click here to access the request ( Access Request )

If you have questions regarding your submission, please contact Amelia Davis via email or phone:

adavis09876@ACME.com
+00 123 123 9980

Generitech Privacy
123 Main St.
Capital City, ST, USA 20219

+1 800-123-4578
emailaboutprivacy@generitech.com
Link to Privacy Policy

Verify Your Identity

Name: Joe Lopez

To verify your identity, please answer the following questions.
- Which of the following STREETS have you NEVER lived or used as your address?
  ○
  ○
  ○
  ○
  ○ ALL OF THE ABOVE
- With which of the following PEOPLE are you most closely associated?
  ○
  ○
  ○
  ○
  ○ NONE OF THE ABOVE
- Which of the following CITIES have you PREVIOUSLY OR CURRENTLY used as your address?
  ○
  ○
  ○
  ○
  ○ NONE OF THE ABOVE

DATA PROCESSING SYSTEMS FOR FULFILLING DATA SUBJECT ACCESS REQUESTS AND RELATED METHODS

CROSS REFERENCE TO RELATED APPLICATIONS

This application is a continuation of U.S. patent application Ser. No. 16/659,437, filed Oct. 21, 2019, which is a continuation-in-part of U.S. patent application Ser. No. 16/410,566, filed May 13, 2019, now U.S. Pat. No. 10,452,866, issued Oct. 22, 2019, which is a continuation-in-part of U.S. patent application Ser. No. 16/055,083, filed Aug. 4, 2018, now U.S. Pat. No. 10,289,870, issued May 14, 2019, which claims priority from U.S. Provisional Patent Application Ser. No. 62/547,530, filed Aug. 18, 2017, and is also a continuation-in-part of U.S. patent application Ser. No. 15/996,208, filed Jun. 1, 2018, now U.S. Pat. No. 10,181,051, issued Jan. 15, 2019, which claims priority from U.S. Provisional Patent Application Ser. No. 62/537,839, filed Jul. 27, 2017, and is also a continuation-in-part of U.S. patent application Ser. No. 15/853,674, filed Dec. 22, 2017, now U.S. Pat. No. 10,019,597, issued Jul. 10, 2018, which claims priority from U.S. Provisional Patent Application Ser. No. 62/541,613, filed Aug. 4, 2017, and is also a continuation-in-part of U.S. patent application Ser. No. 15/619,455, filed Jun. 10, 2017, now U.S. Pat. No. 9,851,966, issued Dec. 26, 2017, which is a continuation-in-part of U.S. patent application Ser. No. 15/254,901, filed Sep. 1, 2016, now U.S. Pat. No. 9,729,583, issued Aug. 8, 2017, which claims priority from: (1) U.S. Provisional Patent Application Ser. No. 62/360,123, filed Jul. 8, 2016; (2) U.S. Provisional Patent Application Ser. No. 62/353,802, filed Jun. 23, 2016; and (3) U.S. Provisional Patent Application Ser. No. 62/348,695, filed Jun. 10, 2016. The disclosures of all of the above patent applications and patents are hereby incorporated herein by reference in their entirety.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, and even their preferences (e.g., likes and dislikes, as provided or obtained through social media).

Many organizations that obtain, use, and transfer personal data, including sensitive personal data, have begun to address these privacy and security issues. To manage personal data, many companies have attempted to implement operational policies and processes that comply with legal and organizations, or other entities) with certain rights related to the data subject's personal data that is collected, stored, or otherwise processed by an organization. These rights may include, for example, a right to obtain confirmation of whether a particular organization is processing their personal data, a right to obtain information about the purpose of the processing (e.g., one or more reasons for which the personal data was collected), and other such rights. Some regulations require organizations to comply with requests for such information (e.g., Data Subject Access Requests) within relatively short periods of time (e.g., 30 days).

Existing systems for complying with such requests can be inadequate for producing and providing the required information within the required timelines. This is especially the case for large corporations, which may store data on several different platforms in differing locations. Accordingly, there is a need for improved systems and methods for complying with data subject access requests.

SUMMARY

A computer-implemented method, according to various embodiments, for receiving data subject access requests (DSAR's) via multiple websites and managing the data subject access requests, comprises: (1) presenting, by at least one computer processor, a first webform on a first website, the first webform being adapted to receive data subject access requests and to route the requests to a first designated individual for processing; (2) presenting, by at least one computer processor, a second webform on a second website, the second webform being adapted to receive data subject access requests and to route the requests to a second designated individual for processing; (3) receiving, by at least one computer processor, via the first webform, a first data subject access request; (4) at least partially in response to the receiving the first data subject access request, automatically routing the first data subject access request to the first designated individual for handling; and (5) at least partially in response to the receiving the second data subject access request, automatically routing the second data subject access request to the second designated individual for handling.

A computer system for receiving data subject access requests via a webform and automatically processing the requests, according to various embodiments, comprises: (1) one or more computer processors; and (2) computer memory operatively coupled to the one or more processors, wherein the one or more computer processors are adapted to: (A) present a webform on a website, the webform being adapted to receive data subject access requests and to route the requests to a designated individual for processing; (B) receiving, via the webform, a data subject access request from a data subject access requestor; and (C) at least partially in response to the receiving the data subject access request, automatically processing the data subject access request.

A computer-implemented method for prioritizing a plurality of data subject access requests, according to particular embodiments, comprises: (1) receiving a data subject access request; (2) at least partially in response to receiving the data subject access request, obtaining metadata regarding a data subject of the data subject access request; and (3) using the metadata to determine whether a priority of the DSAR should be adjusted based on the obtained metadata; and in response to determining that the priority of the DSAR should be adjusted based on the obtained metadata, adjusting the priority of the DSAR.

A computer-implemented method for processing a request to delete a data subject's personal data from one or more computer systems of an organization, according to various embodiments, comprises: (1) receiving, by one or more computer processors, a request from a data subject to delete the data subject's personal data from one or more computer systems of an organization; (2) at least partially in response to receiving the request: (A) automatically identifying, by one or more computer processors, one or more computing devices on which the data subject's personal data is stored; and (B) in response to determining, by one or more computer processors, the location of the data subject's personal data, automatically facilitating the deletion of (e.g., deleting) the data subject's personal data from the one or more computing devices.

The following is listing of various additional concepts according to various embodiments:

Concept 1. A non-transitory computer-readable medium storing computer-executable instructions for processing a request to delete personal data from a plurality of computing devices associated with a particular organization by:
  receiving a plurality of delete personal data requests, each delete personal data request being a request, from a respective data subject, to delete personal data associated with the data subject; and
  at least partially in response to receiving each respective delete personal data request:
    automatically using a data model to identify: (A) a first computing device on which first respective personal data associated with the respective data subject is stored; and (B) a second computing device on which second respective personal data associated with the respective data subject is stored, wherein:
    the data model defines:
      at least one storage location utilized in the storage of a plurality of different items of personal data for the data subject as part of a processing activity; and at least one transfer location to which the plurality of different items of personal data for the data subject are transferred; and
    automatically using the data model to identify the first computing device and the second computing device comprises: (A) using a unique identifier associated with the data subject in combination with the data model to identify the first computing device as storing the first respective personal data associated with the respective data subject; and (B) using the unique identifier associated with the data subject in combination with the data model to identify the second computing device as storing the second respective personal data associated with the respective data subject;
  at least partially in response to identifying the first computing device as storing the first respective personal data associated with the respective data subject, facilitating the deletion of the first respective personal data from the first computing device; and
  at least partially in response to identifying the second computing device as storing the second respective personal data associated with the respective data subject, facilitating the deletion of the second respective personal data from the second computing device, wherein:
  the data model stores information regarding respective storage locations of the plurality of different items of personal data for the data subject.

Concept 2. The non-transitory computer-readable medium of Concept 1, wherein the non-transitory computer-readable medium stores computer-executable instructions for concurrently processing at least five of the plurality of delete personal data requests in an automated manner.

Concept 3. The non-transitory computer-readable medium of Concept 2, wherein the data model stores information regarding respective storage locations of a plurality of different respective items of personal data for each of a plurality of individuals other than the data subject.

Concept 4. The non-transitory computer-readable medium of Concept 1, wherein the non-transitory computer-readable medium stores computer-executable instructions for facilitating the execution of multiple delete personal data requests in response to a single command from a user.

Concept 5. The non-transitory computer-readable medium of Concept 1, wherein the non-transitory computer-readable medium stores computer-executable instructions for facilitating the concurrent execution of multiple delete personal data requests in response to a single command from a user.

Concept 6. The non-transitory computer-readable medium of Concept 1, wherein the non-transitory computer-readable medium stores computer-executable instructions for:
  automatically verifying an identity of the respective data subject; and
  at least partially in response to verifying the identity of the respective data subject, processing the respective delete personal data request.

Concept 7. The non-transitory computer-readable medium of Concept 1, wherein the non-transitory computer-readable medium stores computer-executable instructions for:
  at least partially in response to receiving each respective delete personal data request, obtaining metadata regarding the respective data subject;
  using the metadata to determine whether a priority of the respective request should be adjusted based on the obtained metadata; and
  in response to determining that the priority of the respective request should be adjusted based on the obtained metadata, adjusting the priority of the respective request, wherein the metadata comprises metadata selected from a group consisting of: (A) a location from which the respective request was made; (B) one or more current sensitivities to world events; and (C) a status of the data subject; and
  fulfilling the respective request according to the adjusted priority of the respective request.

Concept 8. The non-transitory computer-readable medium of Concept 7, wherein the metadata comprises a location from which the respective request was made.

Concept 9. The non-transitory computer-readable medium of Concept 7, wherein the metadata comprises a status of the respective data subject.

Concept 10. The non-transitory computer-readable medium of Concept 1, wherein each of the first and second computing devices is associated with a different respective corporate entity of a plurality of corporate entities.

Concept 11. The non-transitory computer-readable medium of Concept 10, wherein the plurality of corporate entities are sub-organizations of the particular organization.

Concept 12. A computer-implemented data processing method for processing requests to delete personal data associated with respective data subjects from one or more computer systems of an organization, the method comprising:
  receiving, by one or more computer processors, a plurality of delete personal data requests, each delete personal data request being a request, from a respective data subject, to delete personal data associated with the data subject; and
  at least partially in response to receiving each respective request of the plurality of requests:

automatically identifying, by one or more computer processors, one or more computing devices of the one or more computer systems on which the personal data associated with the respective data subject is stored, wherein identifying the one or more computing devices on which the personal data associated with the respective data subject is stored comprises:

accessing, by one or more computer processors, a data model defining:

at least one storage location where a plurality of pieces of personal data are stored as part of a processing activity;

at least one transfer location to which the plurality of pieces of personal data are transferred from the at least one storage location as part of the processing activity; and using a unique identifier associated with the data subject, in combination with the data model, to identify the personal data associated with the respective data subject; and in response to identifying, by one or more computer processors, the one or more computing devices on which the personal data associated with the respective data subject is stored, automatically facilitating the deletion of the personal data associated with the respective data subject from the one or more computing devices.

Concept 13. The computer-implemented data processing method of Concept 12, wherein the method further comprises concurrently processing, by one or more computer processors, at least five of the plurality of delete personal data requests in an automated manner.

Concept 14. The computer-implemented data processing method of Concept 12, wherein automatically facilitating the deletion of the personal data associated with the respective data subject from the one or more computing devices comprises overwriting the personal data associated with the respective data subject in computer memory associated with the one or more computing devices.

Concept 15. The computer-implemented data processing method of Concept 12, wherein facilitating the deletion of the personal data associated with the respective data subject from the one or more computing devices comprises facilitating the deletion of the respective data subject's personal data from both the at least one storage location and the at least one transfer location.

Concept 16. The computer-implemented data processing method of Concept 12, wherein the unique identifier associated with the data subject comprises a unique identifier generated in response to receiving consent from the respective data subject for the initial storage of the personal data associated with the respective data subject as part of the processing activity.

Concept 17. The computer-implemented data processing method of Concept 12, wherein identifying one or more computing devices of the one or more computer systems on which the personal data associated with the respective data subject is stored comprises identifying the one or more computing devices using one or more data modeling means.

Concept 18. The computer-implemented data processing method of Concept 12, wherein the method further comprises:

identifying a first processing activity under which the respective data subject has previously provided consent for the collection of personal data; and electronically accessing a first data inventory associated with the first processing activity, the first data inventory identifying:

a first data asset of the one or more computer systems on which the personal data collected as part of the first processing activity is stored;

transfer data associated with the first data asset; and access data associated with the first data asset; and facilitating the deletion of the personal data associated with the respective data subject from the one or more computing devices by:

automatically assigning a first task to delete the personal data associated with the respective data subject from the first data asset;

identifying a second data asset based at least in part on the transfer data;

automatically assigning a second task to delete the personal data associated with the respective data subject from the second data asset;

identifying a third data asset based at least in part on the access data; and automatically assigning a third task to delete the personal data associated with the respective data subject from the third data asset.

Concept 19. A computer-implemented data processing method for deleting one or more pieces of personal data in response to a data subject access request, the method comprising:

receiving, using one or more electronic receiving means, a data subject access request from a requestor comprising one or more request parameters;

accessing, using one or more electronic access means, a data model defining:

at least one storage location utilized in the storage of a plurality of pieces of personal data as part of a processing activity; and at least one transfer location to which the plurality of pieces of personal data are transferred, wherein the data model comprises information regarding a respective storage location of each of one or more pieces of personal data associated with the requestor;

using the data model and a unique identifier associated with the requestor to identify the respective storage location of each of the one or more pieces of personal data associated with the requestor, the one or more pieces of personal data being stored in one or more data repositories associated with a particular organization;

determining whether the one or more request parameters comprise a request to delete the one or more pieces of personal data; and in response to determining that the one or more request parameters comprise the request to delete, automatically facilitating the deletion, using one or more data deletion means, of the one or more pieces of personal data.

Concept 20. The computer-implemented data processing method of Concept 19, wherein:

the method further comprises identifying, using one or more consent receipt management means, one or more processing activities undertaken by the particular organization that involve the storage of the one or more pieces of personal data; and processing the request further comprises identifying the respective storage location of each of the one or more pieces of personal data based at least in part on storage data associated with the one or more processing activities.

BRIEF DESCRIPTION OF THE DRAWINGS

Various embodiments of a data subject access request fulfillment system are described below. In the course of this description, reference will be made to the accompanying drawings, which are not necessarily drawn to scale, and wherein:

FIGS. 3-43 are computer screen shots that demonstrate the operation of various embodiments.

Figure 44:
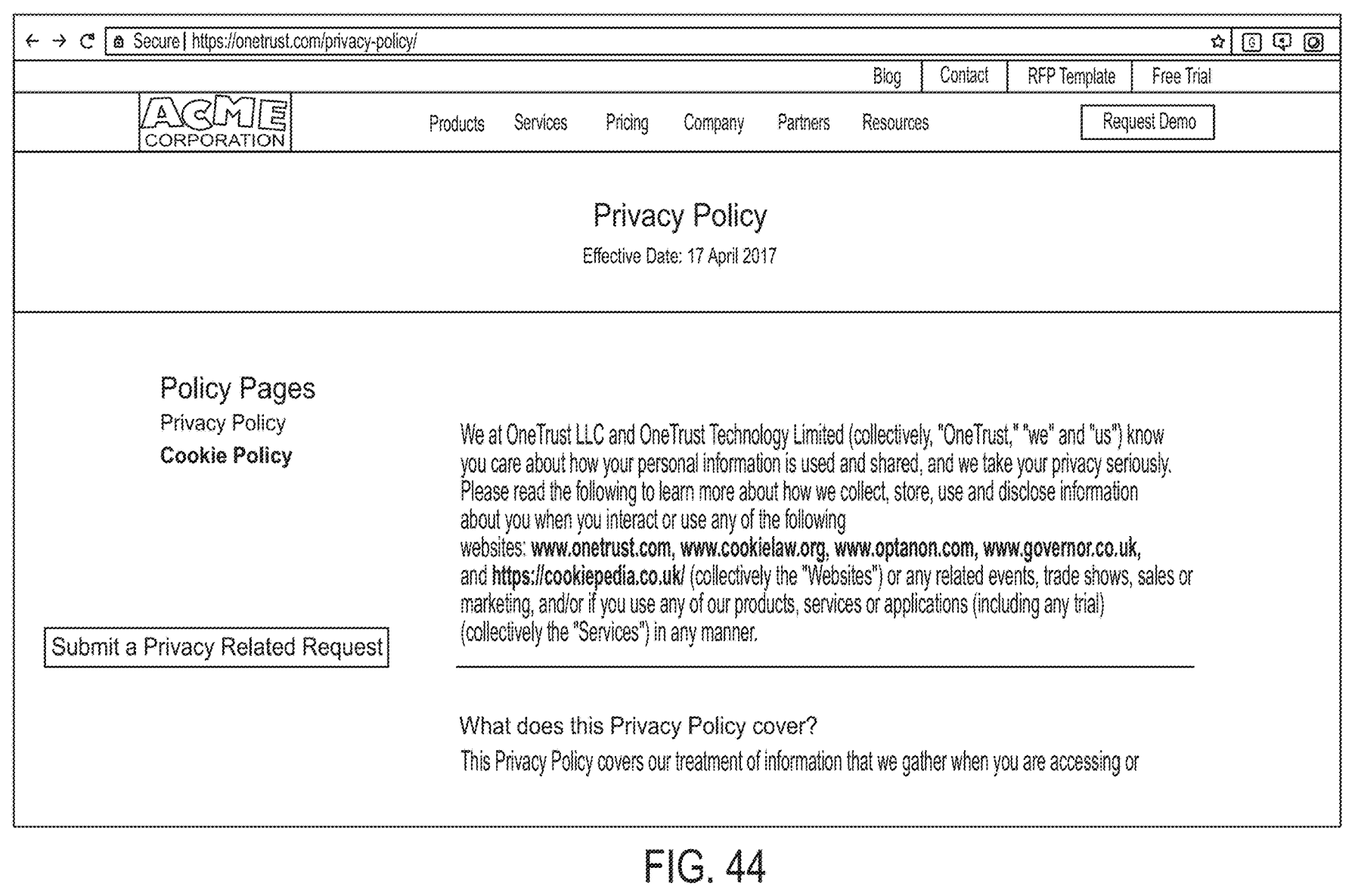

FIGS. 44-49 depict various exemplary screen displays and user interfaces that a user of various embodiments of the system may encounter (FIGS. 47 and 48 collectively show four different views of a Data Subject Request Queue).

DETAILED DESCRIPTION

Figure 1:
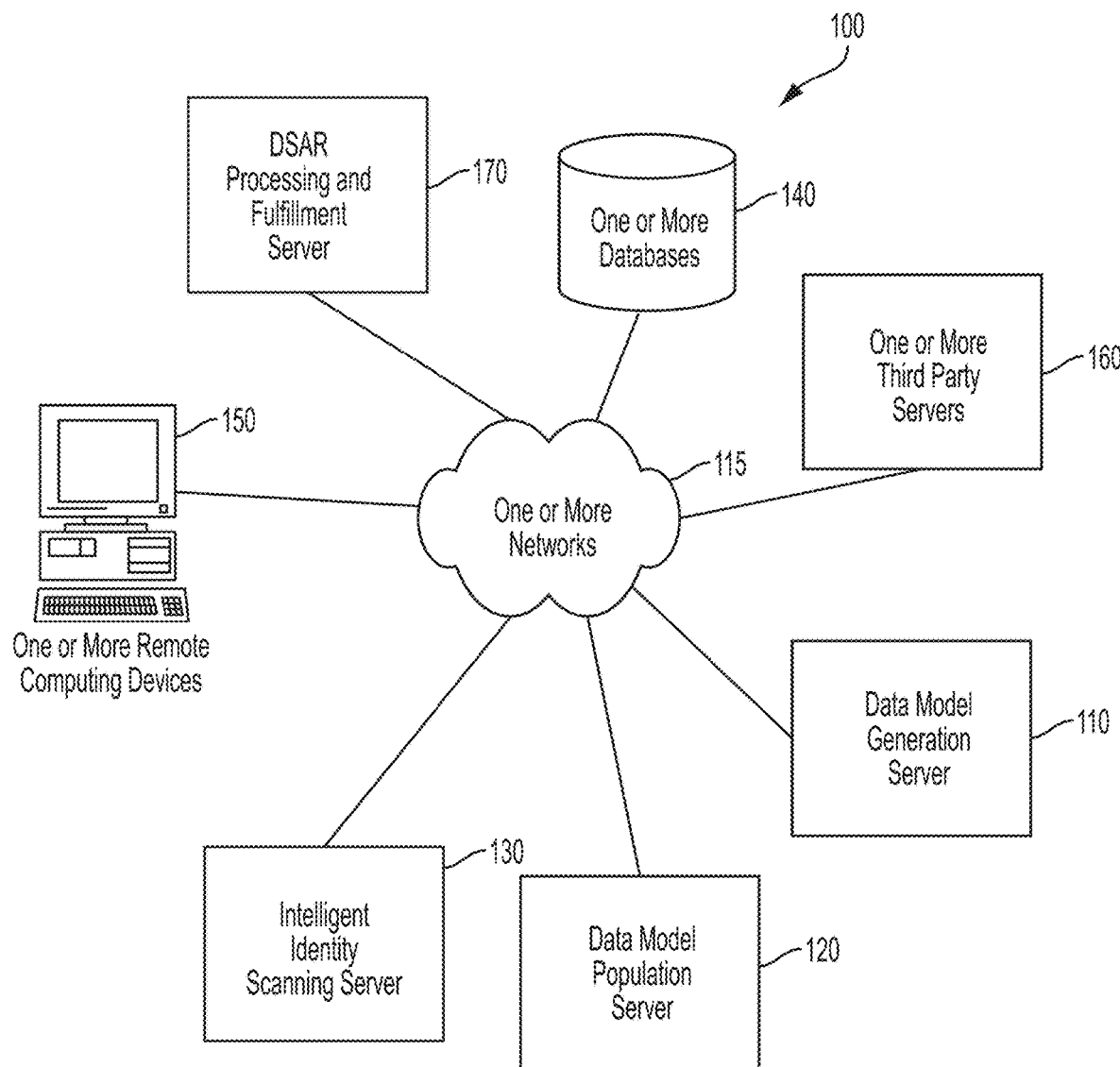
FIG. 1 depicts a data subject request processing and fulfillment system according to particular embodiments.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Ticket management systems, according to various embodiments, are adapted to receive data subject access requests (DSAR's) from particular data subjects, and to facilitate the timely processing of valid DSAR's by an appropriate respondent. In particular embodiments, the ticket management system receives DSAR's via one or more webforms that each may, for example, respectively be accessed via an appropriate link/button on a respective web page. In other embodiments, the system may receive DSAR's through any other suitable mechanism, such as via a computer software application (e.g., a messaging application such as Slack, Twitter), via a chat bot, via generic API input from another system, or through entry by a representative who may receive the information, for example, via suitable paper forms or over the phone.

The ticket management system may include a webform creation tool that is adapted to allow a user to create customized webforms for receiving DSAR's from various different data subject types and for routing the requests to appropriate individuals for processing. The webform creation tool may, for example, allow the user to specify the language that the form will be displayed in, what particular information is to be requested from the data subject and/or provided by the data subject, who any DSAR's that are received via the webform will be routed to, etc. In particular embodiments, after the user completes their design of the webform, the webform creation tool generates code for the webform that may be cut and then pasted into a particular web page.

The system may be further adapted to facilitate processing of DSAR's that are received via the webforms, or any other suitable mechanism. For example, the ticket management system may be adapted to execute one or more of the following steps for each particular DSAR received via the webforms (or other suitable mechanism) described above:

(1) before processing the DSAR, confirm that the DSAR was actually submitted by the particular data subject of the DSAR (or, for example, by an individual authorized to make the DSAR on the data subject's behalf, such as a parent, guardian, power-of-attorney holder, etc.)—any suitable method may be used to confirm the identity of the entity/individual submitting the DSAR—for example, if the system receives the DSAR via a third-party computer system, the system may validate authentication via API secret, or by requiring a copy of one or more particular legal documents (e.g., a particular contract between two particular entities)—the system may validate the identity of an individual by, for example, requiring the individual (e.g., data subject) to provide particular account credentials, by requiring the individual to provide particular out-of-wallet information, through biometric scanning of the individual (e.g., finger or retinal scan), or via any other suitable identity verification technique; (2) if the DSAR was not submitted by the particular data subject, deny the request; (3) if the DSAR was submitted by the particular data subject, advance the processing of the DSAR; (4) route the DSAR to the correct individual(s) or groups internally for handling; (5) facilitate the assignment of the DSAR to one or more other individuals for handling of one or more portions of the DSAR; (6) facilitate the suspension of processing of the data subject's data by the organization; and/or (7) change the policy according to which the data subject's personal data is retained and/or processed by the system. In particular embodiments, the system may perform any one or more of the above steps automatically. The system then generates a receipt for the DSAR request that the user can use as a transactional record of their submitted request.

In particular embodiments, the ticket management system may be adapted to generate a graphical user interface (e.g., a DSAR request-processing dashboard) that is adapted to allow a user (e.g., a privacy officer of an organization that is receiving the DSAR) to monitor the progress of any of the DSAR requests. The GUI interface may display, for each DSAR, for example, an indication of how much time is left (e.g., quantified in days and/or hours) before a legal and/or internal deadline to fulfill the request. The system may also display, for each DSAR, a respective user-selectable indicium that, when selected, may facilitate one or more of the following: (1) verification of the request; (2) assignment of the request to another individual; (3) requesting an extension to fulfill the request; (4) rejection of the request; or (5) suspension of the request.

As noted immediately above, and elsewhere in this application, in particular embodiments, any one or more of the above steps may be executed by the system automatically. As a particular example, the system may be adapted to automatically verify the identity of the DSAR requestor and then automatically fulfill the DSAR request by, for example, obtaining the requested information via a suitable data model and communicating the information to the requestor. As another particular example, the system may be configured to automatically route the DSAR to the correct individual for handling based at least in part on one or more pieces of information provided (e.g., in the webform).

In various embodiments, the system may be adapted to prioritize the processing of DSAR's based on metadata about the data subject of the DSAR. For example, the system may be adapted for: (1) in response to receiving a DSAR, obtaining metadata regarding the data subject; (2) using the metadata to determine whether a priority of the DSAR should be adjusted based on the obtained metadata; and (3) in response to determining that the priority of the DSAR should be adjusted based on the obtained metadata, adjusting the priority of the DSAR.

Examples of metadata that may be used to determine whether to adjust the priority of a particular DSAR include: (1) the type of request; (2) the location from which the request is being made; (3) the country of residency of the data subject and, for example, that county's tolerance for enforcing DSAR violations; (4) current sensitivities to world events; (5) a status of the requestor (e.g., especially loyal customer); or (6) any other suitable metadata.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general-purpose computer, special-purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a data subject access request processing and fulfillment system 100 according to a particular embodiment. In various embodiments, the data subject access request processing and fulfillment system is part of a privacy compliance system (also referred to as a privacy management system), or other system, which may, for example, be associated with a particular organization and be configured to aid in compliance with one or more legal or industry regulations related to the collection and storage of personal data.

As may be understood from FIG. 1, the data subject access request processing and fulfillment system 100 includes one or more computer networks 115, a Data Model Generation Server 110, a Data Model Population Server 120, an Intelligent Identity Scanning Server 130 (which may automatically validate a DSAR requestor's identity), One or More Databases 140 or other data structures, one or more remote computing devices 150 (e.g., a desktop computer, laptop computer, tablet computer, smartphone, etc.), and One or More Third Party Servers 160. In particular embodiments, the one or more computer networks 115 facilitate communication between the Data Model Generation Server 110, Data Model Population Server 120, Intelligent Identity Scanning/Verification Server 130, One or More Databases 140, one or more remote computing devices 150 (e.g., a desktop computer, laptop computer, tablet computer, smartphone, etc.), One or More Third Party Servers 160, and DSAR Processing and Fulfillment Server 170. Although in the embodiment shown in FIG. 1, the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160, and DSAR Processing and Fulfillment Server 170 are shown as separate servers, it should be understood that in other embodiments, the functionality of one or more of these servers and/or computing devices may, in different embodiments, be executed by a larger or smaller number of local servers, one or more cloud-based servers, or any other suitable configuration of computers.

The one or more computer networks 115 may include any of a variety of types of wired or wireless computer networks such as the Internet, a private intranet, a public switch telephone network (PSTN), or any other type of network. The communication link between the DSAR Processing and Fulfillment Server 170 and the One or More Remote Computing Devices 150 may be, for example, implemented via a Local Area Network (LAN) or via the Internet. In other embodiments, the One or More Databases 140 may be stored either fully or partially on any suitable server or combination of servers described herein.

Figure 2A:
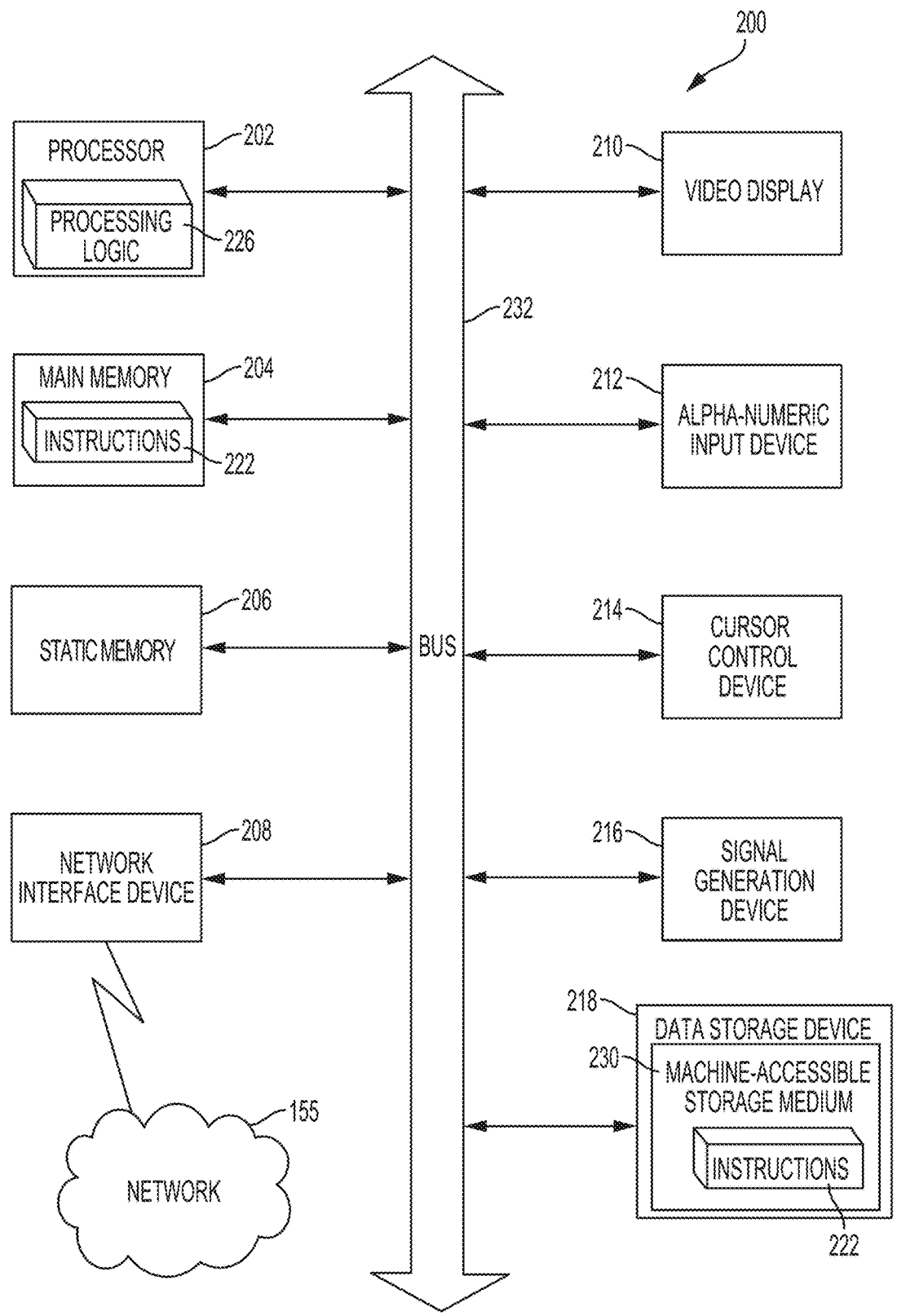
FIG. 2A is a schematic diagram of a computer (such as the data model generation server 110, or data model population server 120 of FIG. 1) that is suitable for use in various embodiments of the data subject request processing and fulfillment system shown in FIG. 1.

FIG. 2A illustrates a diagrammatic representation of a computer 200 that can be used within the data subject access request processing and fulfillment system 100, for example, as a client computer (e.g., one or more remote computing devices 150 shown in FIG. 1), or as a server computer (e.g., Data Model Generation Server 110 shown in FIG. 1). In particular embodiments, the computer 200 may be suitable for use as a computer within the context of the data subject access request processing and fulfillment system 100 that is configured for routing and/or processing DSAR requests and/or generating one or more data models used in automatically fulfilling those requests.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200-main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The terms "computer-accessible storage medium", "computer-readable medium", and like terms should also be understood to include any medium that is capable of storing, encoding or carrying a set of instructions for execution by the computer and that cause the computer to perform any one or more of the methodologies of the present invention. These terms should accordingly be understood to include, but not be limited to, solid-state memories, optical and magnetic media, etc.

Systems for Managing Data Subject Access Requests

In various embodiments, the system may include a ticket management system and/or other systems for managing data subject access requests. In operation, the system may use one or more computer processors, which are operatively coupled to memory, to execute one or more software modules (which may be included in the Instructions 222 referenced above) such as: (1) a DSAR Request Routing Module 1000; and (4) a DSAR Prioritization Module. An overview of the functionality and operation of each of these modules is provided below.

Data Subject Access Request Routing Module 1000

Figure 2B:
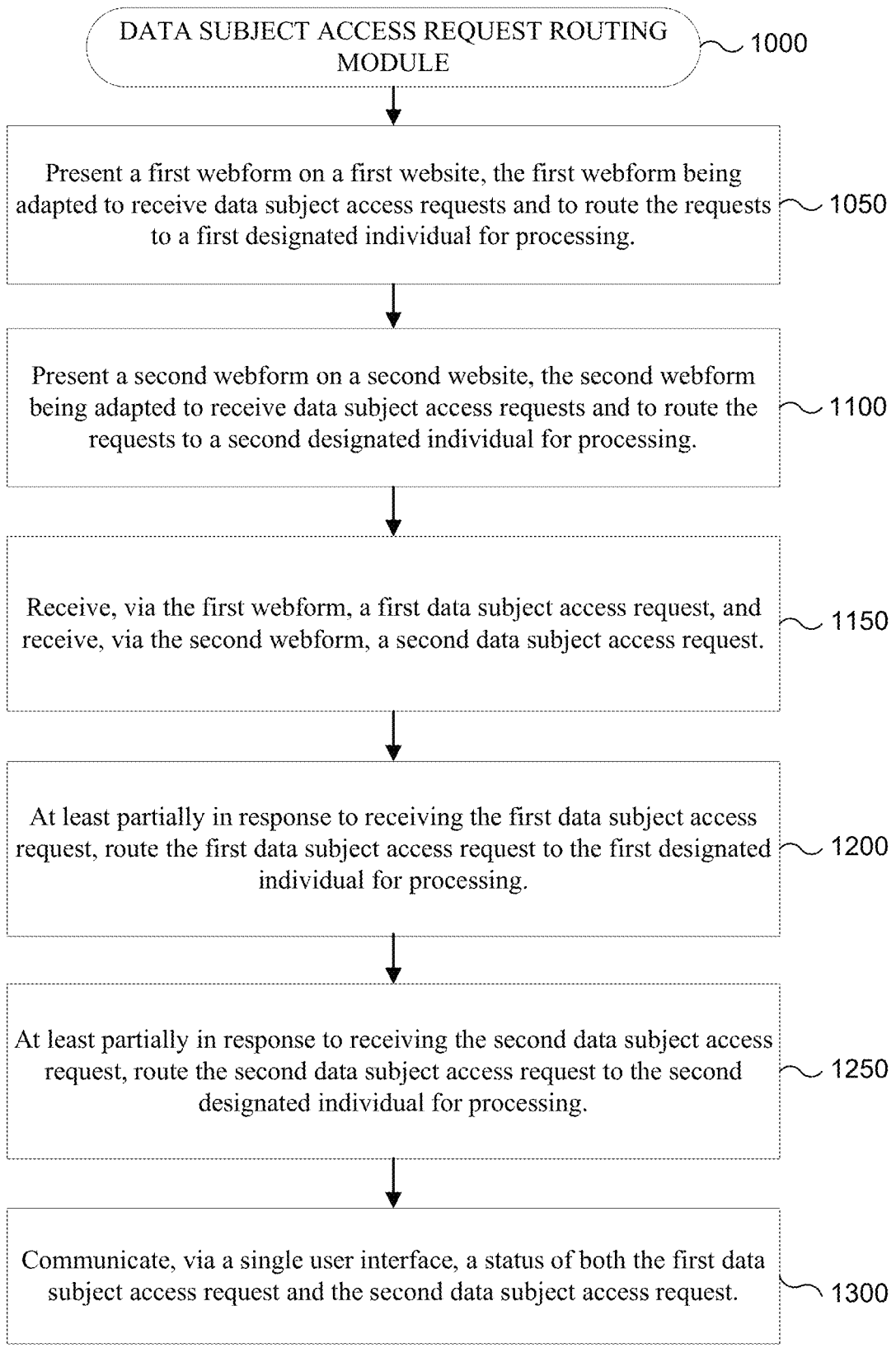
FIG. 2B is a flow chart depicting exemplary steps executed by a Data Subject Access Request Routing Module according to a particular embodiment

As shown in FIG. 2B, a Data Subject Access Request Routing Module 1000, according to particular embodiments, is adapted for executing the steps of: (1) at Step 1050, presenting, by at least one computer processor, a first webform on a first web site, the first webform being adapted to receive data subject access requests and to route the requests to a first designated individual (e.g., an individual who is associated with a first sub-organization of a particular organization—e.g., an employee of the first sub-organization) for processing (in various embodiments, "presenting a webform on a website" may comprise, for example: (A) providing a button, link, or other selectable indicium on the website that, when selected, causes the system to display the webform, or (B) displaying the webform directly on the website); (2) at Step 1100 presenting, by at least one computer processor, a second webform on a second website, the second webform being adapted to receive data subject access requests and to route the requests to a second designated individual (e.g., an individual who is associated with a second sub-organization of a particular organization—e.g., an employee of the second sub-organization) for processing; (3) at Step 1150, receiving, by at least one computer processor, via the first webform, a first data subject access request; (4) at Step 1200, at least partially in response to the receiving the first data subject access request, automatically routing the first data subject access request to the first designated individual for handling; (5) at Step 1250, at least partially in response to the receiving the second data subject access request, automatically routing the second data subject access request to the second designated individual for handling; and (6) at Step 1300, communicating, via a single user interface, a status of both the first data subject access request and the second data subject access request.

In particular embodiments: (1) the first website is a website of a first sub-organization of a particular parent organization; (2) the second website is a website of a second sub-organization of the particular parent organization; and (3) the computer-implemented method further comprises communicating, by at least one computer processor, via a single user interface, a status of each of said first data subject access request and said second data subject access request (e.g., to an employee of—e.g., privacy officer of—the parent organization). As discussed in more detail below, this single user interface may display an indication, for each respective one of the first and second data subject access requests, of a number of days remaining until a deadline for fulfilling the respective data subject access request.

In certain embodiments, the single user interface is adapted to facilitate the deletion or assignment of multiple data subject access requests to a particular individual for handling in response to a single command from a user (e.g., in response to a user first selecting multiple data subject access requests from the single user interface and then executing an assign command to assign each of the multiple requests to a particular individual for handling).

In particular embodiments, the system running the Data Subject Access Request Routing Module 1000, according to particular embodiments, may be adapted for, in response to receiving each data subject access request, generating an ID number (e.g., a transaction ID or suitable Authentication Token) for the first data subject access request, which may be used later, by the DSAR requestor, to access information related to the DSAR, such as personal information requested via the DSAR, the status of the DSAR request, etc. To facilitate this, the system may be adapted for receiving the ID number from an individual and, at least partially in response to receiving the ID number from the individual, providing the individual with information regarding status of the data subject access request and/or information previously requested via the data subject access request.

In particular embodiments, the system may be adapted to facilitate the processing of multiple different types of data subject access requests. For example, the system may be adapted to facilitate processing: (1) requests for all personal data that an organization is processing for the data subject (a copy of the personal data in a commonly used, machine-readable format); (2) requests for all such personal data to be deleted; (3) requests to update personal data that the organization is storing for the data subject; (4) requests to opt out of having the organization use the individual's personal information in one or more particular ways (e.g., per the organization's standard business practices), or otherwise change the way that the organization uses the individual's personal information; and/or (5) the filing of complaints.

In particular embodiments, the system may execute one or more steps (e.g., any suitable step or steps discussed herein) automatically. For example, the system may be adapted for: (1) receiving, from the first designated individual, a request to extend a deadline for satisfying the first data subject access request; (2) at least partially in response to receiving the extension request, automatically determining, by at least one processor, whether the requested extension complies with one or more applicable laws or internal policies; and (3) at least partially in response to determining that the requested extension complies with the one or more applicable laws or internal policies, automatically modifying the deadline, in memory, to extend the deadline according to the extension request. The system may be further adapted for, at least partially in response to determining that the requested extension does not comply with the one or more applicable laws or internal policies, automatically rejecting the extension request. In various embodiments, the system may also, or alternatively, be adapted for: (1) at least partially in response to determining that the requested extension does not comply with the one or more applicable laws or internal policies, automatically modifying the length of the requested extension to comply with the one or more applicable laws or internal policies; and (2) automatically modifying the deadline, in memory, to extend the deadline according to the extension request.

In various embodiments, the system may be adapted for: (1) automatically verifying an identity of a particular data subject access requestor placing the first data subject access request; (2) at least partially in response to verifying the identity of the particular data subject access requestor, automatically obtaining, from a particular data model, at least a portion of information requested in the first data subject access request; and (3) after obtaining the at least a portion of the requested information, displaying the obtained information to a user as part of a fulfillment of the first data subject access request. The information requested in the first data subject access request may, for example, comprise at least substantially all (e.g., most or all) of the information regarding the first data subject that is stored within the data model.

In various embodiments, the system is adapted for: (1) automatically verifying, by at least one computer processor, an identity of a particular data subject access requestor placing the first data subject access request; and (2) at least partially in response to verifying the identity of the particular data subject access requestor, automatically facilitating an update of personal data that an organization associated with the first webform is processing regarding the particular data subject access requestor.

Similarly, in particular embodiments, the system may be adapted for: (1) automatically verifying, by at least one computer processor, an identity of a particular data subject access requestor placing the first data subject access request; and (2) at least partially in response to verifying the identity of the particular data subject access requestor, automatically processing a request, made by the particular data subject access requestor, to opt out of having the organization use the particular data subject access requestor's personal information in one or more particular ways.

The system may, in various embodiments, be adapted for: (1) providing, by at least one computer processor, a webform creation tool that is adapted for receiving webform creation criteria from a particular user, the webform creation criteria comprising at least one criterion from a group consisting of: (A) a language that the form will be displayed in; (B) what information is to be requested from data subjects who use the webform to initiate a data subject access request; and (C) who any data subject access requests that are received via the webform will be routed to; and (2) executing the webform creation tool to create both the first webform and the second webform.

In light of the discussion above, although the Data Subject Access Request Routing Module 1000 is described as being adapted to, in various embodiments, route data subject access requests to particular individuals for handling, it should be understood that, in particular embodiments, this module may be adapted to process at least part of, or all of, particular data subject access requests automatically (e.g., without input from a human user). In such cases, the system may or may not route such automatically-processed requests to a designated individual for additional handling or monitoring. In particular embodiments, the system may automatically fulfill all or a portion of a particular DSAR request, automatically assign a transaction ID and/or authentication token to the automatically fulfilled transaction, and then display the completed DSAR transaction for display on a system dashboard associated with a particular responsible individual that would otherwise have been responsible for processing the DSAR request (e.g., an individual to whom the a webform receiving the DSAR would otherwise route DSAR requests). This may be helpful in allowing the human user to later track, and answer any questions about, the automatically-fulfilled DSAR request.

It should also be understood that, although the system is described, in various embodiments, as receiving DSAR requests via multiple webforms, each of which is located on a different website, the system may, in other embodiments, receive requests via only a single webform, or through any other suitable input mechanism other than a webform (e.g., through any suitable software application, request via SMS message, request via email, data transfer via a suitable API, etc.)

In various embodiments, the system may be adapted to access information needed to satisfy DSAR requests via one or more suitable data models. Such data models include those that are described in greater detail in U.S. patent application Ser. No. 15/996,208, filed Jun. 1, 2018, which, as noted above, is incorporated herein by reference. In various embodiments, the system is adapted to build and access such data models as described in this earlier-filed U.S. patent application.

As an example, in fulfilling a request to produce, modify, or delete, any of a data subject's personal information that is stored by a particular entity, the system may be adapted to access a suitable data model to identify any personal data of the data subject that is currently being stored in one or more computer systems associated with the particular entity. After using the data model to identify the data, the system may automatically process the data accordingly (e.g., by modifying or deleting it, and/or sharing it with the DSAR requestor). In particular embodiments, the system may be configured to automatically process a plurality of data subject access requests (DSARs) (e.g., 2, 3, 4, 5, 6, 7, or more DSARs) simultaneously (e.g., in response to a single or multiple commends from one or more users).

DSAR Prioritization Module

A DSAR Prioritization Module, according to various embodiments, is adapted for (1) executing the steps of receiving a data subject access request; (2) at least partially in response to receiving the data subject access request, obtaining metadata regarding a data subject of the data subject access request; (3) using the metadata to determine whether a priority of the DSAR should be adjusted based on the obtained metadata; and (4) in response to determining that the priority of the DSAR should be adjusted based on the obtained metadata, adjusting the priority of the DSAR.

The operation of various embodiments of the various software modules above is described in greater detail below. It should be understood that the various steps described herein may be executed, by the system, in any suitable order and that various steps may be omitted, or other steps may be added in various embodiments.

Operation of Example Implementation

Figure 4:

FIGS. 3-43 are screen shots that demonstrate the operation of a particular embodiment. FIGS. 3-6 show a graphical user interface (GUI) of an example webform construction tool. FIG. 3 shows a user working to design a webform called "Web_form_1". As may be understood from the vertical menu shown on the left-hand side of the screen, the webform construction tool allows users to design a webform by: (1) specifying the details of the form (via the "Form Details" tab); (2) defining the fields that will be displayed on the webform (via the "Webform Fields" tab); (3) defining the styling of the webform (via the "Form Styling" tab); and (4) defining various settings associated with the webform (via the "Settings" tab). As shown in FIGS. 4-6, the user may also specify text to be displayed on the webform (e.g., via a "Form Text" tab).

FIG. 4 shows that, by selecting the "Form Details" tab, the user may define which answers a requestor will be able to specify on the webform in response to prompts for information regarding what type of individual they are (customer, employee, etc.) and what type of request they are making via the webform. Example request types include: (1) a request for all personal data that an organization is processing for the data subject (a copy of the personal data in a commonly used, machine-readable format); (2) a request for all such personal data to be deleted; (3) a request to update personal data that the organization is storing for the data subject; (4) a request to opt out of having the organization use the individual's personal information in one or more particular ways (e.g., per the organization's standard business practices); (5) file a complaint; and/or (6) other.

Figure 5:
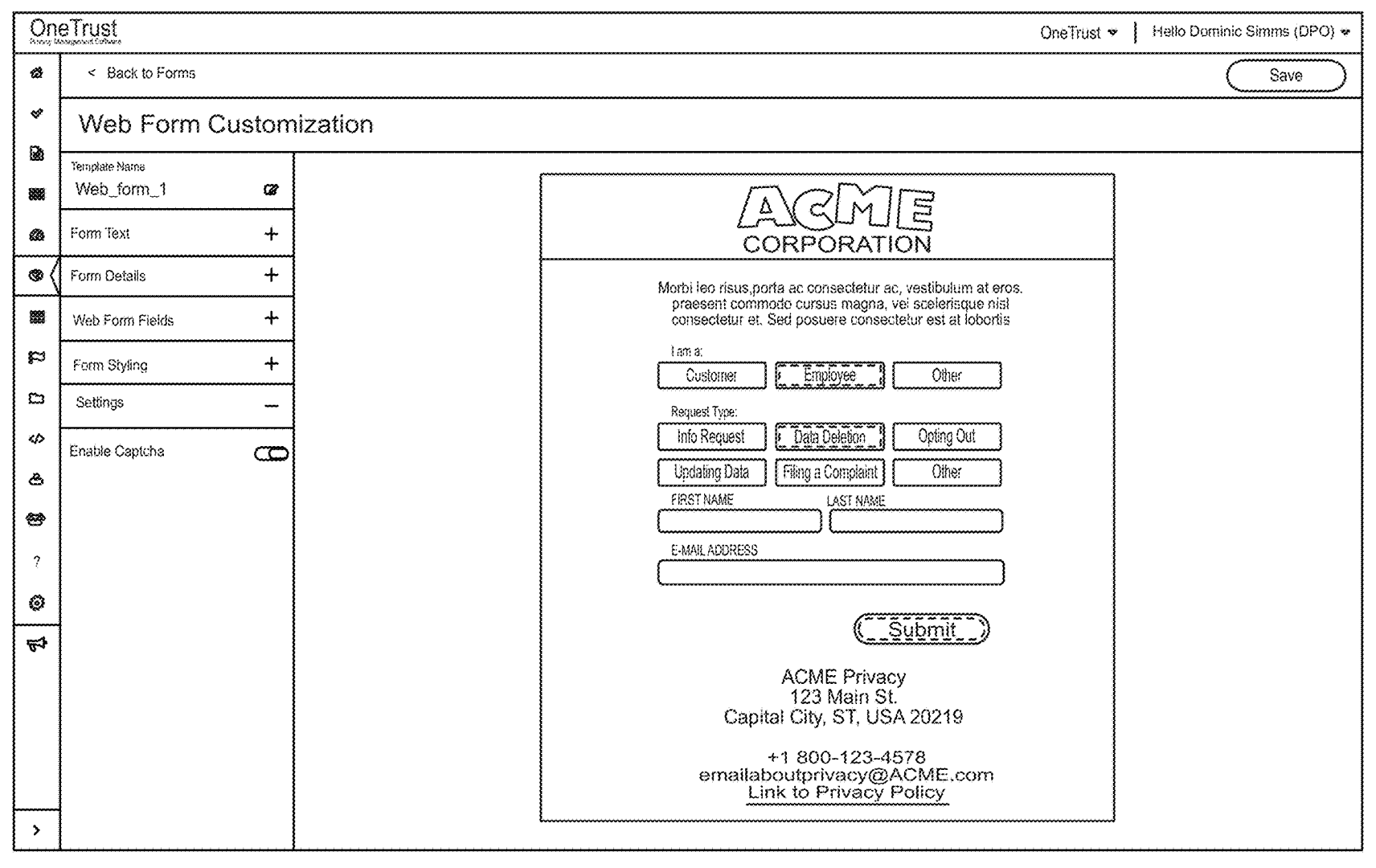

FIG. 5 shows that, by selecting the "Settings" tab, the user may specify various system settings, such as whether Captcha will be used to verify that information is being entered by a human, rather than a computer.

Figure 6:
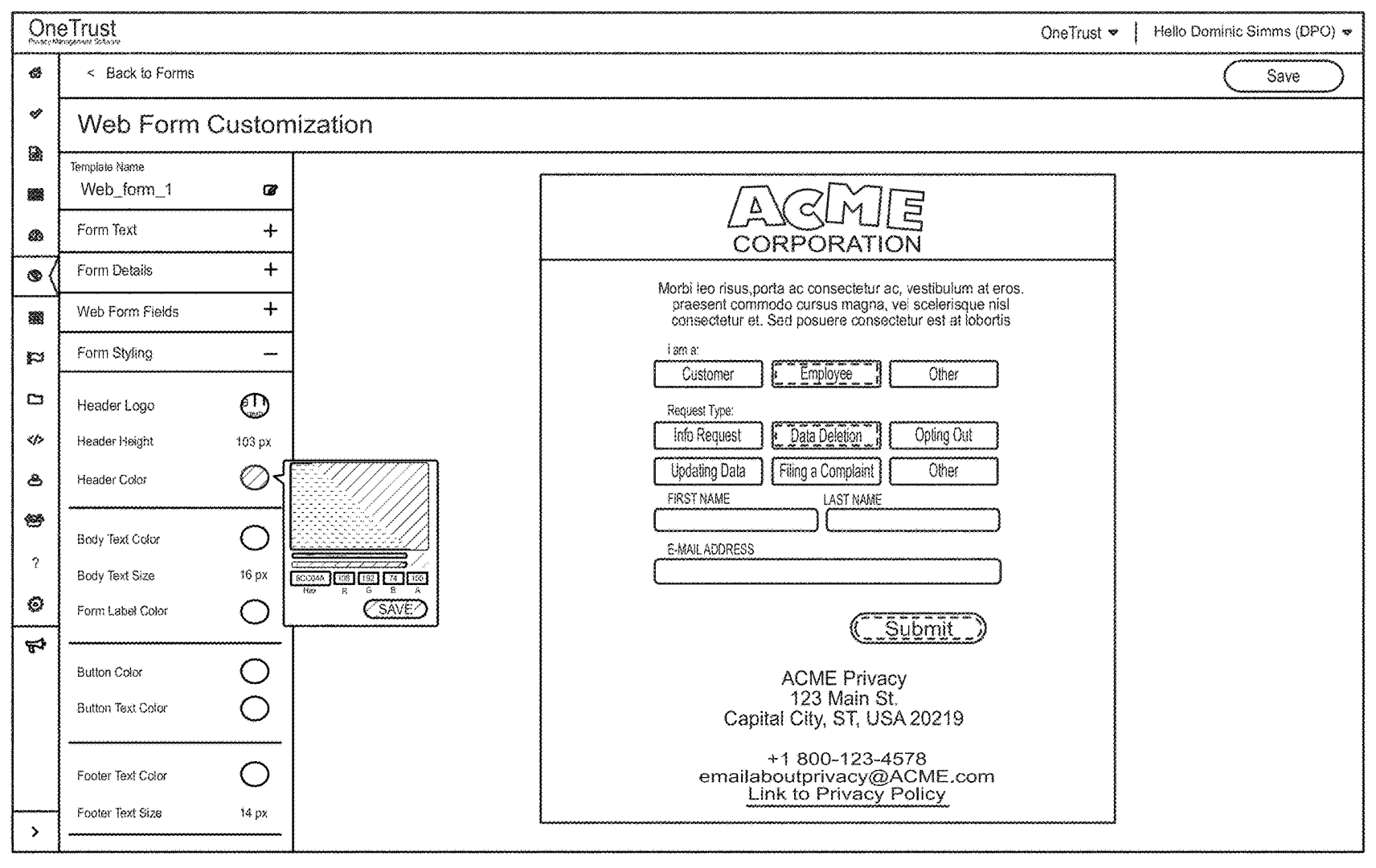

FIG. 6 shows that, by selecting the Form Styling tab, the user may specify the styling of the webform. The styling may include, for example: (1) a header logo; (2) header height; (3) header color; (4) body text color; (5) body text size; (6) form label color; (7) button color; (8) button text color; (9) footer text color; (10) footer text size; and/or any other suitable styling related to the webform.

In other embodiments, the system is configured to enable a user to specify, when configuring a new webform, what individual at a particular organization (e.g., company) will be responsible for responding to requests made via the webform. The system may, for example, enable the user to define a specific default sub-organization (e.g., within the organization) responsible for responding to DSAR's submitted via the new webform. As such, the system may be configured to automatically route a new DSAR made via the new webform to the appropriate sub-organization for processing and fulfillment. In various embodiments, the system is configured to route one or more various portions of the DSAR to one or more different sub-organizations within the organization for handling.

In particular embodiments, the system may include any suitable logic for determining how the webform routes data subject access requests. For example, the system may be adapted to determine which organization or individual to route a particular data subject access request to based, at least in part, on one or more factors selected from a group consisting of: (1) the data subject's current location; (2) the data subject's country of residence; (3) the type of request being made; (4) the type of systems that contain (e.g., store and/or process) the user's personal data (e.g., in ADP, Salesforce, etc.); or any other suitable factor.

In particular embodiments, the system is configured to enable a user generating webforms to assign multiple webforms to multiple different respective suborganizations within an organization. For example, an organization called ACME, Inc. may have a website for each of a plurality of different brands (e.g., sub-organizations) under which ACME sells products (e.g., UNICORN Brand T-shirts, GRIPP Brand Jeans, etc.). As may be understood in light of this disclosure, each website for each of the particular brands may include an associated webform for submitting DSAR's (either a webform directly on the web site, or one that is accessible via a link on the website). Each respective webform may be configured to route a DSAR made via its associated brand website to a particular sub-organization and/or individuals within ACME for handling DSAR's related to the brand.

As noted above, after the user uses the webform construction tool to design a particular webform for use on a particular web page, the webform construction tool generates code (e.g., HTML code) that may be pasted into the particular web page to run the designed webform page. In particular embodiment, when pasted into the particular web page, the code generates a selectable button on the web page that, when selected, causes the system to display a suitable DSAR request webform.

FIG. 7 shows the privacy webpage of a company (e.g., the ACME corporation). As shown in this figure, a requestor may submit a DSAR by selecting a "Submit a Privacy Related Request" button on the web page.

Figure 8:
Figure 29:
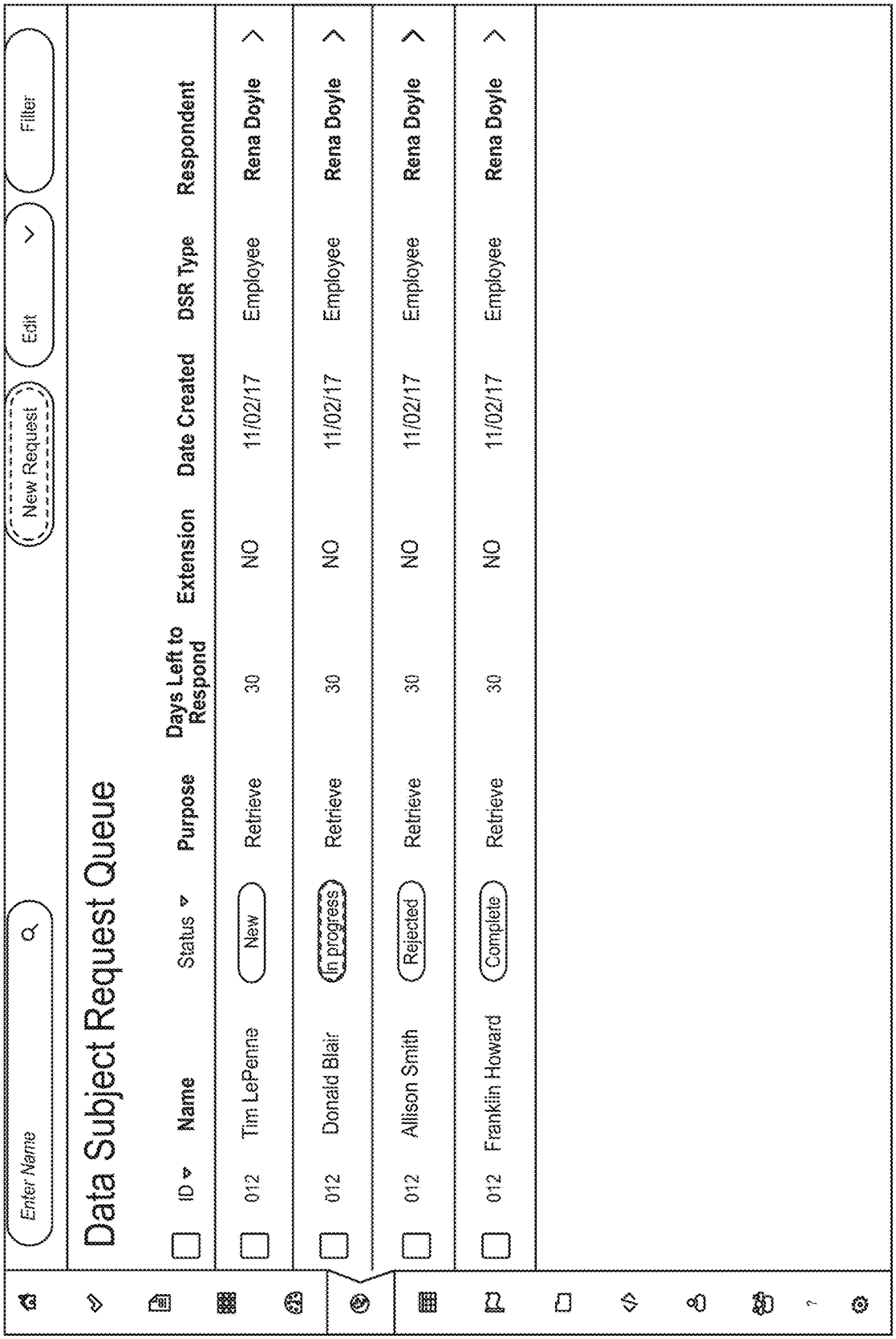
Figure 37:
Figure 39:
Figure 41:
Figure 42:
Figure 43:
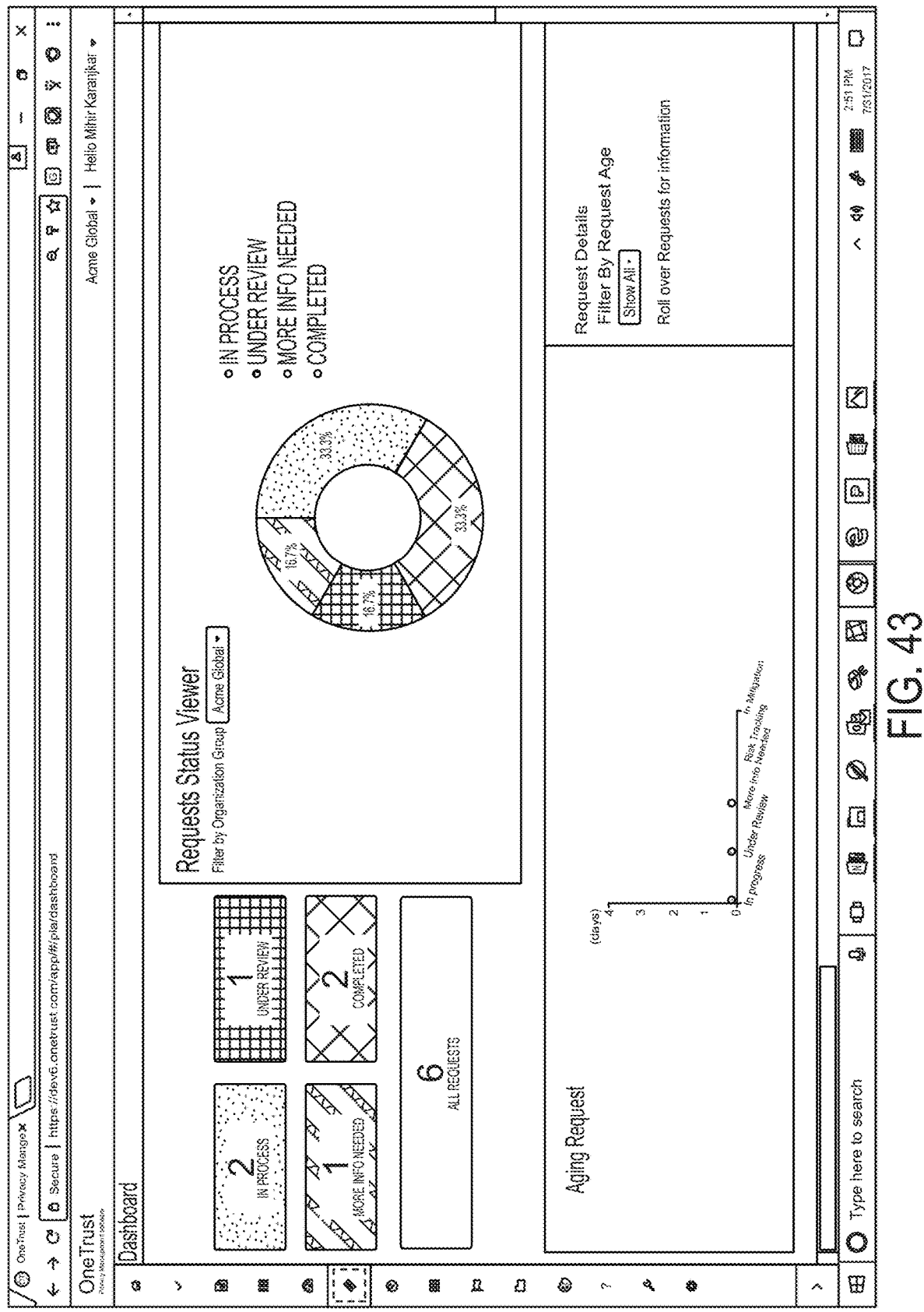
Figure 45:

FIG. 8 shows a webform that is displayed after a requestor selects the "Submit a Privacy Related Request" button on the privacy webpage of FIG. 7. As may be understood from this figure, the requestor may complete the webform by specifying which type of user they are, and what type of request they are making. The webform also asks the requestor to provide enough personal information to confirm their identity (e.g., and fulfill the request). As shown in this figure, the system may prompt a user submitting a DSAR to provide information for the user such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; (8) one or more other pieces of identifying information; and/or (9) one or more details associated with the request. FIG. 9 shows an example populated version of the webform.

As shown in FIG. 10, after a requestor completes the webform and selects a "submit" indicia, the system displays a message to the requestor indicating that their DSAR has been successfully submitted. The system also displays a Request ID associated with the request. In response to the requestor successfully submitting the request, the system may also send an email (or other suitable communication) to the requestor confirming the request. An example of a suitable confirmation email is shown in FIG. 11.

In various embodiments, the system includes a dashboard that may be used by various individuals within an organization (e.g., one or more privacy officers of an organization) to manage multiple DSAR requests. As discussed above, the dashboard may display DSAR's submitted, respectively, to a single organization, any of multiple different sub-organizations (divisions, departments, subsidiaries etc.) of a particular organization, and/or any of multiple independent organizations. For example, the dashboard may display a listing of DSAR's that were submitted from a parent organization and from the parent organization's U.S. and European subsidiaries. This may be advantageous, for example, because it may allow an organization to manage all DSAR requests of all of its sub-organizations (and/or other related organizations) centrally.

FIGS. 12-23, 25-27, 29-34, and 41-43 depict various example user-interface screens of a DSAR request-management dashboard. As may be understood from FIG. 12, after an appropriate user (e.g., a privacy officer associated with a particular organization) logs into the system, the system may display a Data Subject Request Queue that may, for example, display a listing of all data subject access requests that the appropriate individual has been designated to process. As shown in FIG. 12, each data subject access request may be represented by a respective row of information that includes: (1) an ID number for the request; (2) the name of the data subject who has submitted the request; (3) the status of the request; (4) the number of days that are left to respond to the request (e.g., according to applicable laws and/or internal procedures); (5) an indication as to whether the deadline to respond to the request has been extended; (6) a creation date of the request; (7) an indication of the type of requestor that submitted the request (customer, employee, etc.); (8) the name of the individual who has been assigned to process the request (e.g., the respondent). This screen may also include selectable "Edit" and "Filter" buttons that respectively facilitate acting on and filtering the various requests displayed on the page.

As shown in FIG. 13, in response to a respondent selecting the edit button while a particular DSAR is highlighted, the system displays a dropdown menu allowing the respondent to select between taking the following actions: (1) verify the request; (2) assign the request to another individual; (3) request an extension; (4) reject the request; or (5) suspend the request.

Figure 15:
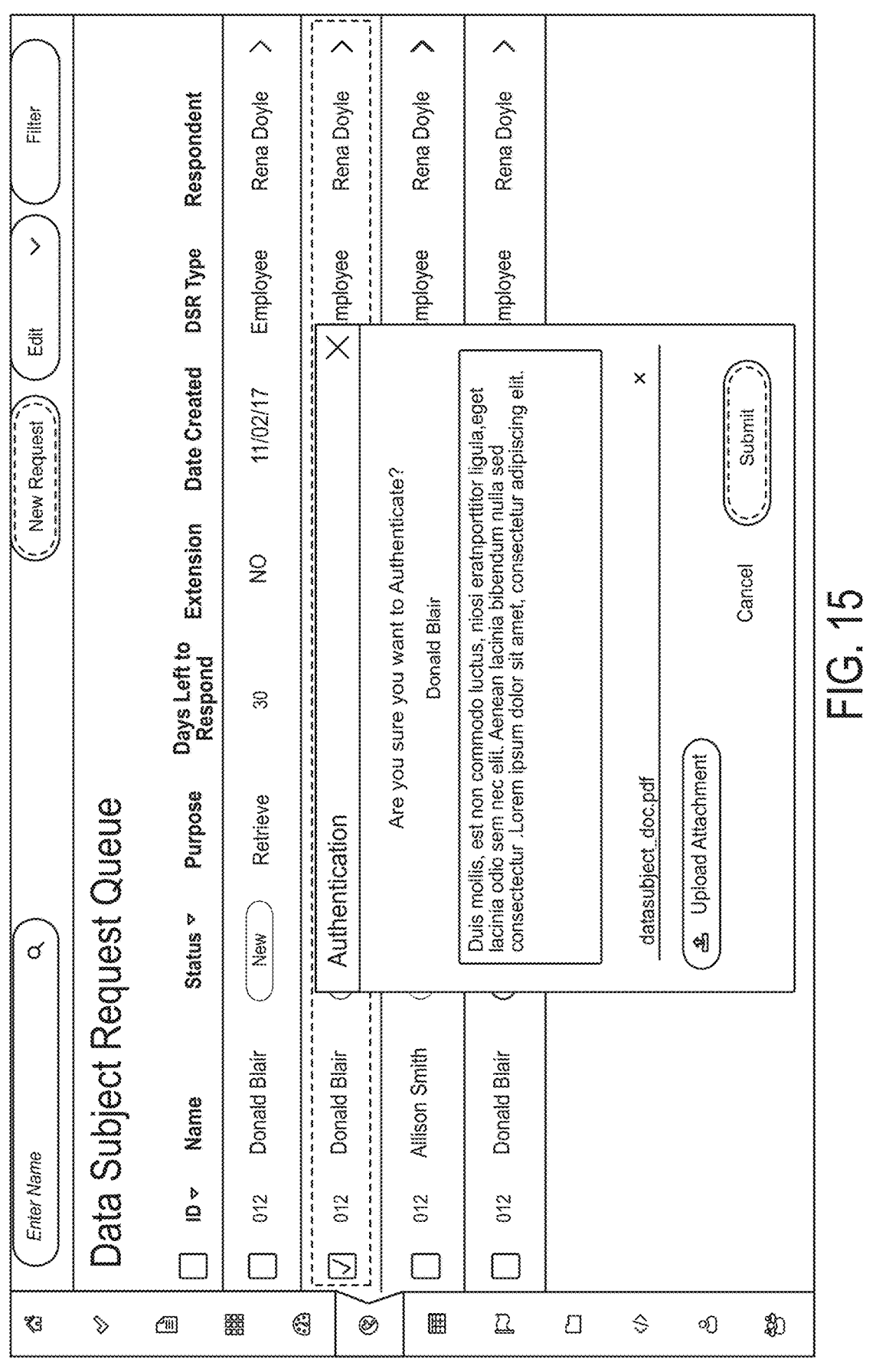

FIGS. 14 and 15 show a message that the system displays to the respondent in response to the respondent selecting the "verify" option. As shown in this figure, the system prompts the respondent to indicate whether they are sure that they wish to authenticate the request. The system also presents an input field where the respondent can enter text to be displayed to the requestor along with a request for the requestor to provide information verifying that they are the data subject associated with the request. After the respondent populates the input field, they may submit the request by selecting a "Submit" button.

In particular embodiments, the input field may enable the respondent to provide one or more supporting reasons for a decision, by the respondent, to authenticate the request. The respondent may also upload one or more supporting documents (such as an attachment). The supporting documents or information may include, for example, one or more documents utilized in confirming the requestor's identity, etc.

In response to the respondent selecting the Submit button, the system changes the status of the request to "In Progress" and also changes the color of the request's status from orange to blue (or from any other suitable color to any different suitable color)—see FIG. 16. The system also generates and sends a message (e.g., an electronic or paper message) to the requestor asking them to submit information verifying the request. The message may include the text that the respondent entered in the text box of FIG. 14.

Figure 18:
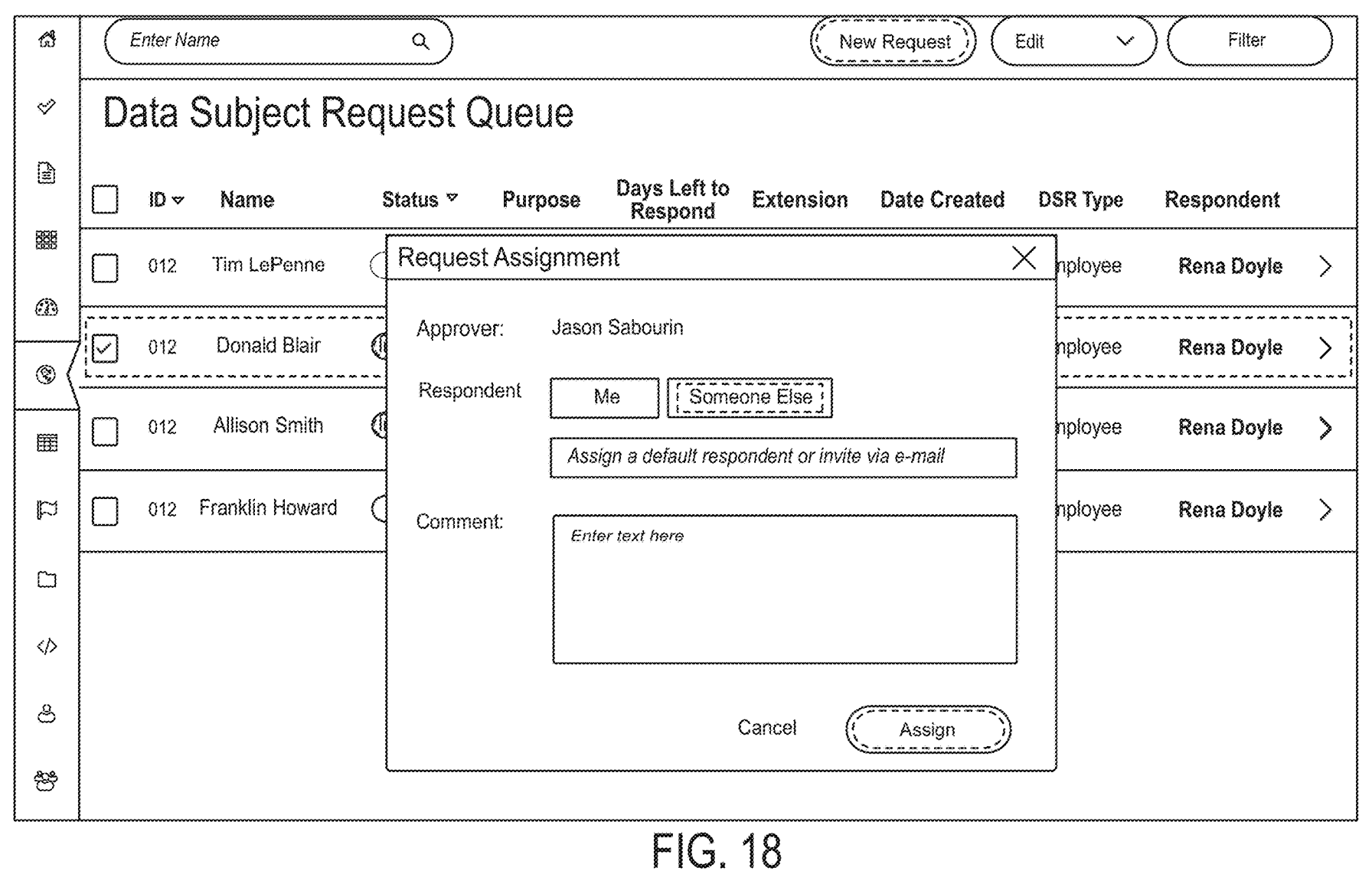

As shown in FIGS. 17-19, in response to a respondent selecting the "Edit" button and then selecting the "Assign" indicia from the displayed dropdown menu, the system displays a Request Assignment interface that allows a respondent to indicate who the request should be assigned to. For example, the respondent may indicate that they will be handling the request, or assign the request to another suitable individual, who may, for example, then be designated as the respondent for the request. If the respondent assigns the request to another individual for handling, the respondent may also provide an email address or other correspondence information for the individual. The Request Assignment interface includes a comment box for allowing a respondent to add a message to the individual that the assignment will be assigned to regarding the assignment. In response to the respondent selecting the "Assign" button, the system assigns the request to the designated individual for handling. If the request has been assigned to another, designated individual, the system automatically generates and sends a message (e.g., an electronic message such as an email or SMS message) to the designated individual informing them of the assignment.

Figure 21:
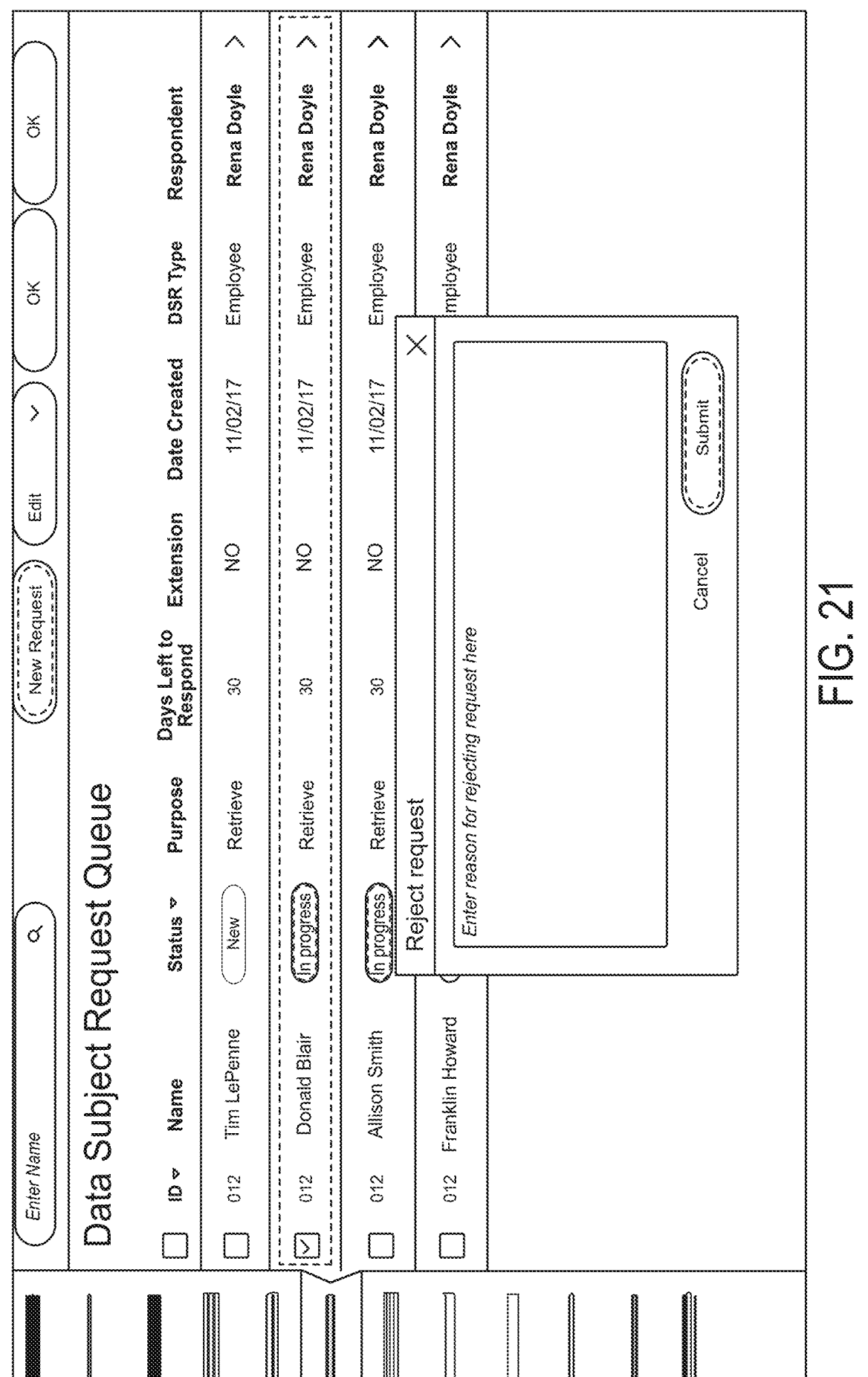
Figure 22:
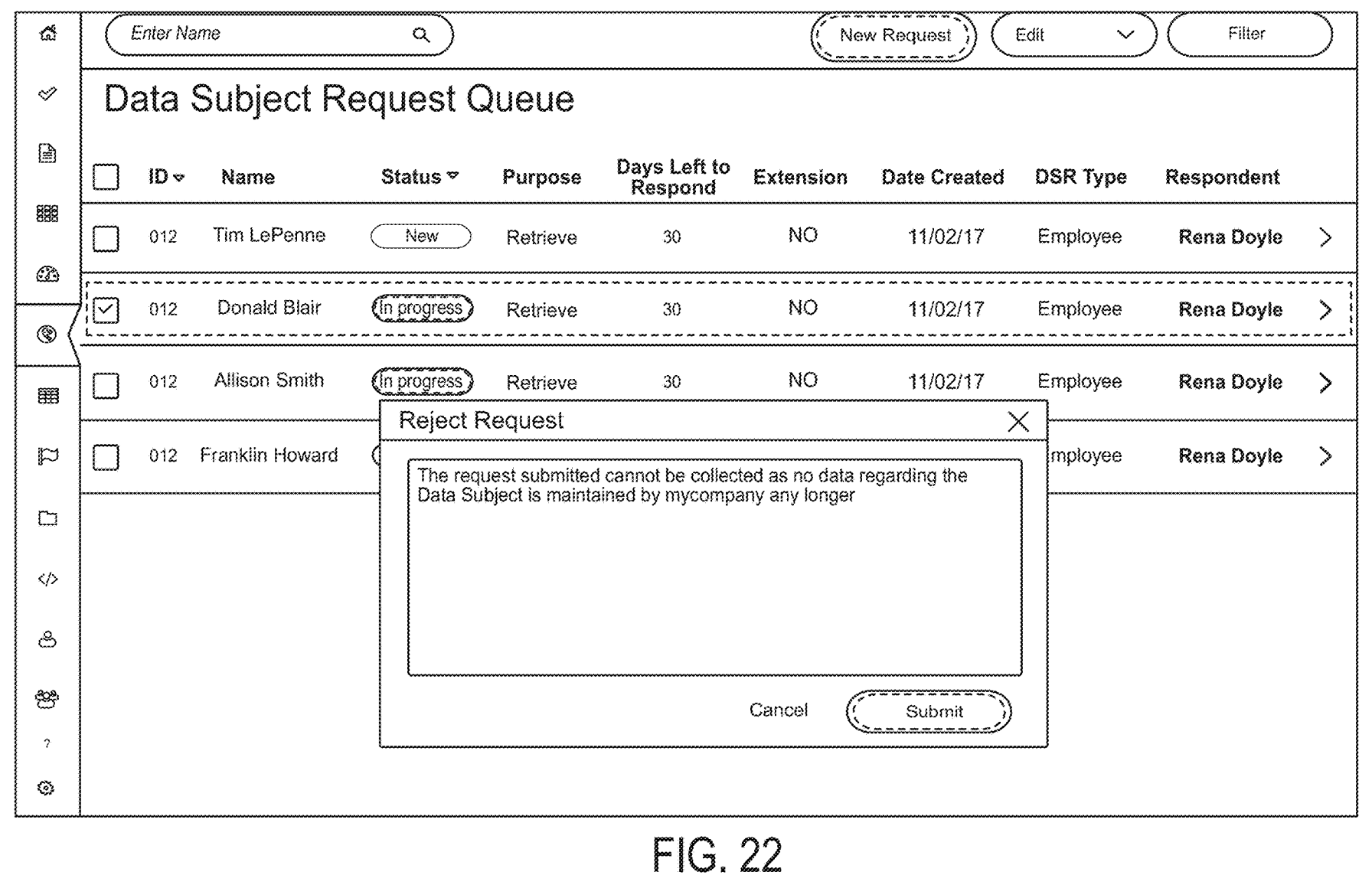

As shown in FIGS. 20-22, in response to a respondent selecting the "Edit" button and then selecting the "Reject"

indicia from the displayed dropdown menu, the system displays a Reject Request interface. This interface includes a comment box for allowing a respondent to add a message to the requestor as to why the request was rejected. In response to the respondent selecting the "Submit" button, the system changes the status of the request to "Rejected" and changes the color of the request's status indicator to red (See FIG. 23). The system may also automatically generate a message (e.g., an electronic or paper message) to the requestor notifying them that their request has been rejected and displaying the text that the respondent entered into the Reject Request interface of FIG. 22. An example of such a message is shown in FIG. 24.

Figure 25:
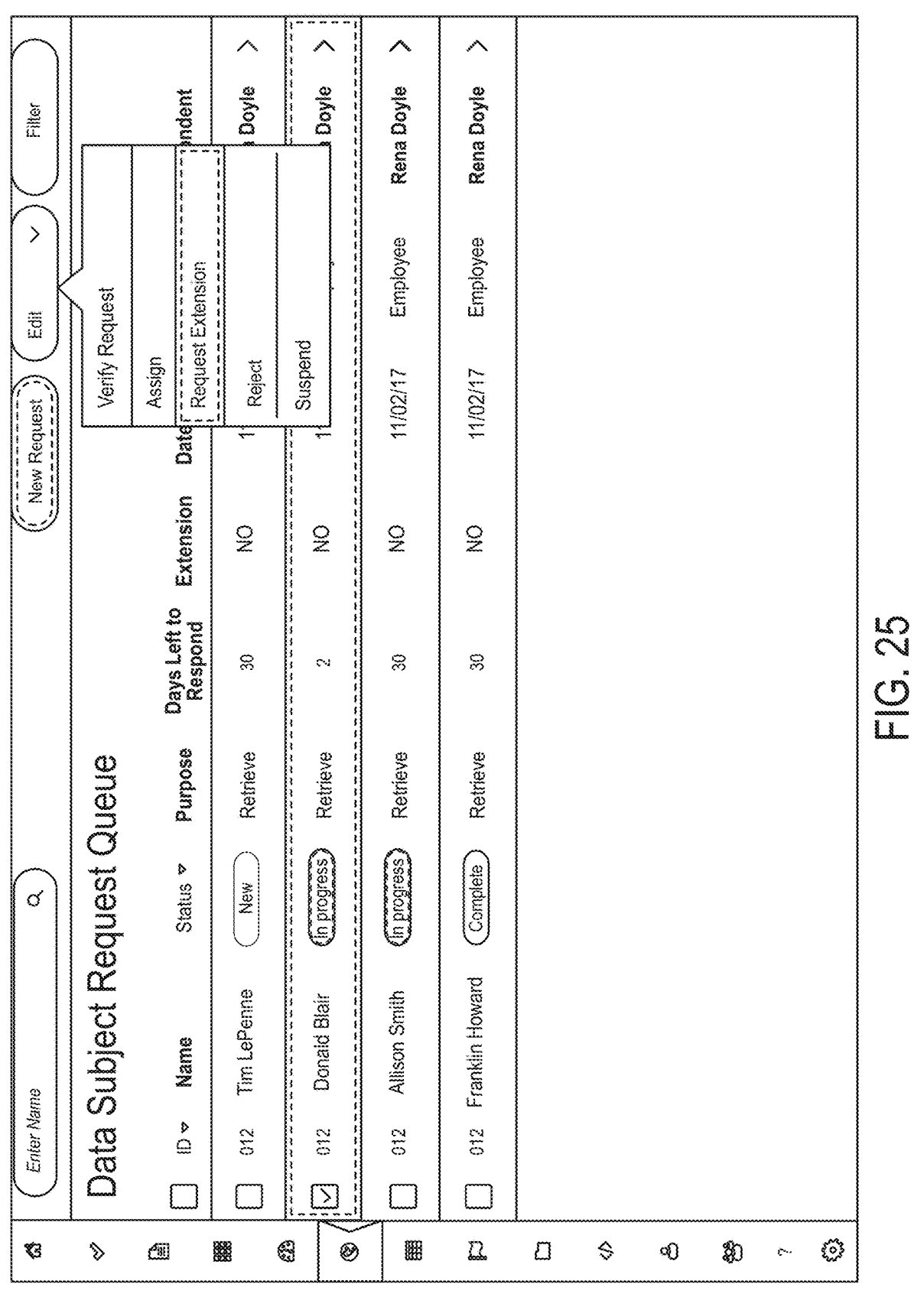

As shown in FIGS. 25-26, in response to a respondent selecting the "Edit" button and then selecting the "Request Extension" indicia from the displayed dropdown menu, the system displays a Request Extension interface. This includes a text box for allowing a user to indicate the number of days for which they would like to extend the current deadline for responding to the request. For example, the dialog box of FIG. 26 shows the respondent requesting that the current deadline be extended by 90 days. In response to the respondent entering a desired extension duration and selecting the "Submit" button, the system updates the deadline in the system's memory (e.g., in an appropriate data structure) to reflect the extension. For instance, in the example of FIG. 26, the system extends the deadline to be 90 days later than the current deadline. As shown in FIG. 27, the system also updates the "Days Left to Respond" field within the Data Subject Request Queue to reflect the extension (e.g., from 2 days from the current date to 92 days from the current date). As shown in FIG. 28, the system may also generate an appropriate message (e.g., an electronic, such as an email, or a paper message) to the requestor indicating that the request has been delayed. This message may provide a reason for the delay and/or an anticipated updated completion date for the request.

In particular embodiments, the system may include logic for automatically determining whether a requested extension complies with one or more applicable laws or internal policies and, in response, either automatically grant or reject the requested extension. For example, if the maximum allowable time for replying to a particular request is 90 days under the controlling laws and the respondent requests an extension that would result in the fulfillment of the request 91 or more days from the date that the request was submitted, the system may automatically reject the extension request. In various embodiments, the system may also communicate, to the respondent (e.g., via a suitable electronic message or text display on a system user interface) an explanation as to why the extension request was denied, and/or a maximum amount of time (e.g., a maximum number of days) that the deadline may be extended under the applicable laws or policies. In various embodiments, if the system determines that the requested extension is permissible under the applicable laws and/or policies, the system may automatically grant the extension.

In other embodiments, the system may be configured to automatically modify a length of the requested extension to conform with one or more applicable laws and/or policies. For example, if the request was for a 90-day extension, but only a 60 day extension is available under the applicable laws or regulations, the system may automatically grant a 60-day extension rather than a 90 day extension. The system may be adapted to also automatically generate and transmit a suitable message (e.g., a suitable electronic or paper communication) notifying them of the fact that the extension was granted for a shorter, specified period of time than requested.

As shown in FIGS. 29-34, a respondent may obtain additional details regarding a particular request by selecting (e.g., clicking on) the request on the Data Subject Request Queue screen. For example, FIG. 30 shows a Data Subject Request Details screen that the system displays in response to a respondent selecting the "Donald Blair" request on the user interface screen of FIG. 35. As shown in FIG. 30, the Data Subject Request Details screen shows all correspondence between the organization and the requesting individual regarding the selected data subject access request. As may be understood from FIG. 31, when a respondent selects a particular correspondence (e.g., email), the system displays the correspondence to the respondent for review or other processing.

As shown in FIG. 32, in various embodiments, the system may provide a selectable "Reply" indicia that allows the respondent to reply to particular correspondence from an individual. As may be understood from this figure, in response to the respondent selecting the "Reply" indicia, the system may display a dropdown menu of various standard replies. For example, the dropdown menu may provide the option of generating a reply to the requestor indicating that the request has been rejected, is pending, has been extended, or that the request has been completed.

As shown in FIG. 33, in response to the respondent selecting "Reply as Completed", the system may generate a draft email to the requestor explaining that the request has been completed. The respondent may then edit this email and send the edited correspondence (e.g., via email) to the requestor by selecting a "Send as Complete" indicia. As shown in FIG. 34, the system may, in response, display an indicator adjacent the correspondence indicating that the correspondence included a reply indicating that the request was complete. This may be useful in allowing individuals to understand the contents of the correspondence without having to open it.

FIG. 35 shows an example email automatically generated by the system in response to the respondent selecting "Reply as Completed" on the screen shown in FIG. 32. As shown in FIG. 35, the correspondence may include a secure link that the requestor may select to access the data that was requested in the DSAR. In particular embodiments, the link is a link to a secure website, such as the website shown in FIG. 36, that provides access to the requested data (e.g., by allowing a user to download a .pdf file, or other suitable file, that includes the requested data). As shown in FIG. 36, the website may require multiple pieces of data to verify that the requestor is permitted to access the site. For example, in order to access the website, the requestor may be required to provide both the unique ID number of the request, and an authentication token, which the system may send to the user via email—See FIGS. 37 and 38.

FIGS. 39-43 are computer screen shots that depict additional user interfaces according to various embodiments.

Additional Concepts

Intelligent Prioritization of DSAR's

In various embodiments, the system may be adapted to prioritize the processing of DSAR's based on metadata about the data subject of the DSAR. For example, the system may be adapted for: (1) in response to receiving a DSAR, obtaining metadata regarding the data subject; (2) using the metadata to determine whether a priority of the DSAR should be adjusted based on the obtained metadata; and (3) in response to determining that the priority of the DSAR should be adjusted based on the obtained metadata, adjusting the priority of the DSAR.

Examples of metadata that may be used to determine whether to adjust the priority of a particular DSAR include: (1) the type of request, (2) the location from which the request is being made, (3) current sensitivities to world events, (4) a status of the requestor (e.g., especially loyal customer), or (5) any other suitable metadata.

In various embodiments, in response to the system determining that the priority of a particular DSAR should be elevated, the system may automatically adjust the deadline for responding to the DSAR. For example, the system may update the deadline in the system's memory and/or modify the "Days Left to Respond" field (See FIG. 13) to include a fewer number of days left to respond to the request. Alternatively, or in addition, the system may use other techniques to convey to a respondent that the request should be expedited (e.g., change the color of the request, send a message to the respondent that they should process the request before non-prioritized requests, etc.)

In various embodiments, in response to the system determining that the priority of a particular DSAR should be lowered, the system may automatically adjust the deadline for responding to the DSAR by adding to the number of days left to respond to the request.

Automatic Deletion of Data Subject Records Based on Detected Systems

In particular embodiments, in response a data subject submitting a request to delete their personal data from an organization's systems, the system may: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the personal data. In particular embodiments, as part of this process, the system uses an appropriate data model (see discussion above) to efficiently determine where all of the data subject's personal data is stored.

Automatic Determination of Business Processes that Increase Chance of Deletion Requests In various embodiments, the system is adapted to store, in memory, a log of DSAR actions. The system may also store, in memory, additional information regarding the data subjects of each of the requests. The system may use this information, for example, to determine which business processes are most commonly associated with a data subject submitting a request to have their personal information deleted from the organization's systems. The organization may then use this information to revise the identified business processes in an effort to reduce the number of deletion requests issued by data subjects associated with the business processes.

As a particular example, the system may analyze stored information to determine that a high number (e.g., 15%) of all participants in a company's loyalty program submit requests to have their personal information deleted from the company's systems. In response to making this determination, the system may issue an electronic alert to an appropriate individual (e.g., a privacy officer of the company), informing them of the high rate of members of the company's loyalty program issuing personal data delete requests. This alert may prompt the individual to research the issue and try to resolve it.

Automated Data Subject Verification

In various embodiments, before a data subject request can be processed, the data subject's identity may need to be verified. In various embodiments, the system provides a mechanism to automatically detect the type of authentication required for a particular data subject based on the type of Data Subject Access Request being made and automatically issues a request to the data subject to verify their identity against that form of identification. For example, a subject rights request might only require two types of authentication, but a deletion request may require four types of data to verify authentication. The system may automatically detect which is type of authentication is required based on the DSAR and send an appropriate request to the data subject to verify their identity.

Stated more particularly, when processing a data subject access request, the system may be configured to verify an identity of the data subject prior to processing the request (e.g., or as part of the processing step). In various embodiments, confirming the identity of the data subject may, for example, limit a risk that a third-party or other entity may gain unlawful or unconsented to access to the requestor's personal data. The system may, for example, limit processing and fulfillment of requests relating to a particular data subject to requests that are originated by (e.g., received from) the particular data subject. When processing a data subject access request, the system may be configured to use various reasonable measures to verify the identity of the data subject who requests access (e.g., in particular in the context of online services and online identifiers). In particular embodiments, the system is configured to substantially automatically validate an identity of a data subject when processing the data subject access request.

For example, in particular embodiments, the system may be configured to substantially automatically (e.g., automatically) authenticate and/or validate an identity of a data subject using any suitable technique. These techniques may include, for example: (1) one or more credit-based and/or public- or private-information-based verification techniques; (2) one or more company verification techniques (e.g., in the case of a business-to-business data subject access request); (3) one or more techniques involving integration with a company's employee authentication system; (4) one or more techniques involving a company's (e.g., organization's) consumer portal authentication process; (5) etc. Various exemplary techniques for authenticating a data subject are discussed more fully below.

In particular embodiments, when authenticating a data subject (e.g., validating the data subject's identity), the system may be configured to execute particular identity confirmation steps, for example, by interfacing with one or more external systems (e.g., one or more third-party data aggregation systems). For example, the system, when validating a data subject's identity, may begin by verifying that a person with the data subject's name, address, social security number, or other identifying characteristic (e.g., which may have been provided by the data subject as part of the data subject access request) actually exists. In various embodiments, the system is configured to interface with (e.g., transmit a search request to) one or more credit reporting agencies (e.g., Experian, Equifax, TransUnion, etc.) to confirm that a person with one or more characteristics provided by the data subject exists. The system may, for example, interface with such credit reporting agencies via a suitable plugin (e.g., software plugin). Additionally, there might be a verification on behalf of a trusted third-party system (e.g., the controller).

In still other embodiments, the system may be configured to utilize one or more other third-party systems (e.g., such as LexisNexis, IDology, RSA, etc.), which may, for example, compile utility and phone bill data, property deeds, rental agreement data, and other public records for various individuals. The system may be configured to interface with one or more such third-party systems to confirm that a person with one or more characteristics provided by the data subject exists.

After the step of confirming the existence of a person with the one or more characteristics provided by the data subject, the system may be configured to confirm that the person making the data subject access request is, in fact, the data subject. The system may, for example, verify that the requestor is the data subject by prompting the requestor to answer one or more knowledge-based authentication questions (e.g., out-of-wallet questions). In particular embodiments, the system is configured to utilize one or more third-party services as a source of such questions (e.g., any of the suitable third-party sources discussed immediately above). The system may use third-party data from the one or more third-party sources to generate one or more questions. These one or more questions may include questions that a data subject should know an answer to without knowing the question ahead of time (e.g., one or more previous addresses, a parent or spouse name and/or maiden name, etc.).

FIG. 46 depicts an exemplary identity verification questionnaire. As may be understood from this figure, an identity verification questionnaire may include one or more questions whose responses include data that the system may derive from one or more credit agencies or other third-party data aggregation services (e.g., such as previous street addresses, close associates, previous cities lived in, etc.). In particular embodiments, the system is configured to provide these one or more questions to the data subject in response to receiving the data subject access request. In other embodiments, the system is configured to prompt the data subject to provide responses to the one or more questions at a later time (e.g., during processing of the request). In particular other embodiments, the system is configured to substantially automatically compare one or more pieces of information provided as part of the data subject access request to one or more pieces of data received from a third-party data aggregation service in order to substantially automatically verify the requestor's identity.

In still other embodiments, the system may be configured to prompt a requestor to provide one or more additional pieces of information in order to validate the requestor's identity. This information may include, for example: (1) at least a portion of the requestor's social security number (e.g., last four digits); (2) a name and/or place of birth of the requestor's father; (3) a name, maiden name, and/or place of birth of the requestor's mother; and/or (4) any other information which may be useful for confirming the requestor's identity (e.g., such as information available on the requestor's birth certificate). In other embodiments, the system may be configured to prompt the requestor to provide authorization for the company to check the requestor's social security or other private records (e.g., credit check authorization, etc.) to obtain information that the system may use to confirm the requestor's identity. In other embodiments, the system may prompt the user to provide one or more images (e.g., using a suitable mobile computing device) of an identifying document (e.g., a birth certificate, social security card, driver's license, etc.).

The system may, in response to a user providing one or more responses that matches information that the system receives from one or more third-party data aggregators or through any other suitable background, credit, or other search, substantially automatically authenticate the requestor as the data subject. The system may then continue processing the data subject's request, and ultimately fulfill their request.

In particular embodiments, such as embodiments in which the requestor includes a business (e.g., as in a business to business data subject access request), the system may be configured to authenticate the requesting business using one or more company verification techniques. These one or more company validation techniques may include, for example, validating a vendor contract (e.g., between the requesting business and the company receiving the data subject access request); receiving a matching token, code, or other unique identifier provided by the company receiving the data subject access request to the requesting business; receiving a matching file in possession of both the requesting business and the company receiving the data subject access request; receiving a signed contract, certificate (e.g., digital or physical), or other document memorializing an association between the requesting business and the company receiving the data subject access request; and/or any other suitable method of validating that a particular request is actually made on behalf of the requesting business (e.g., by requesting the requesting business to provide one or more pieces of information, one or more files, one or more documents, etc. that may only be accessible to the requesting business).

In other embodiments, the system may be configured to authenticate a request via integration with a company's employee or customer (e.g., consumer) authentication process. For example, in response to receiving a data subject access request that indicates that the data subject is an employee of the company receiving the data subject access request, the system may be configured to prompt the employee to login to the company's employee authentication system (e.g., Okta, Azure, AD, etc.) In this way, the system may be configured to authenticate the requestor based at least in part on the requestor successfully logging into the authentication system using the data subject's credentials. Similarly, in response to receiving a data subject access request that indicates that the data subject is a customer of the company receiving the data subject access request, the system may be configured to prompt the customer to login to an account associated with the company (e.g., via a consumer portal authentication process). In a particular example, this may include, for example, an Apple ID (for data subject access requests received by Apple). In this way, the system may be configured to authenticate the requestor based at least in part on the requestor successfully logging into the authentication system using the data subject's credentials. In some embodiments, the system may be configured to require the requestor to login using two-factor authentication or other suitable existing employee or consumer authentication process.

Data Subject Blacklist

In various embodiments, a particular organization may not be required to respond to a data subject access request that originates (e.g., is received from) a malicious requestor. A malicious requestor may include, for example: (1) a requestor (e.g., an individual) that submits excessive or redundant data subject access requests; (2) a group of requestors such as researchers, professors, students, NGOs, etc. that submit a plurality of requests for reasons other than those reasons provided by policy, law, etc.; (3) a competitor of the company receiving the data subject access request that is submitting such requests to tie up the company's resources unnecessarily; (4) a terrorist or other organization that may spam requests to disrupt the company's operation and response to valid requests; and/or (5) any other request that may fall outside the scope of valid requests made for reasons proscribed by public policy, company policy, or law. In particular embodiments, the system is configured to maintain a blacklist of such malicious requestors.

In particular embodiments, the system is configured to track a source of each data subject access request and analyze each source to identify sources from which: (1) the company receives a large volume of requests; (2) the company receives a large number of repeat requests; (3) etc. These sources may include, for example: (1) one or more particular IP addresses; (2) one or more particular domains; (3) one or more particular countries; (4) one or more particular institutions; (5) one or more particular geographic regions; (6) etc. In various embodiments, in response to analyzing the sources of the requests, the system may identify one or more sources that may be malicious (e.g., are submitting excessive requests).

In various embodiments, the system is configured to maintain a database of the identified one or more sources (e.g., in computer memory). In particular embodiments, the database may store a listing of identities, data sources, etc. that have been blacklisted (e.g., by the system). In particular embodiments, the system is configured to, in response to receiving a new data subject access request, cross reference the request with the blacklist to determine if the requestor is on the blacklist or is making the request from a blacklisted source. The system may then, in response to determining that the requestor or source is blacklisted, substantially automatically reject the request. In particular embodiments, the blacklist cross-referencing step may be part of the requestor authentication (e.g., verification) discussed above. In various embodiments, the system may be configured to analyze request data on a company by company basis to generate a blacklist. In other embodiments, the system may analyze global data (e.g., all data collected for a plurality of companies that utilize the data subject access request fulfillment system) to generate the blacklist.

In particular embodiments, the system may be configured to fulfill data subject access requests for the purpose of providing a data subject with information regarding what data the company collects and for what purpose, for example, so the data subject can ensure that the company is collecting data for lawful reasons. As such, the system may be configured to identify requestors and other sources of data requests that are made for other reasons (e.g., one or more reasons that would not obligate the company to respond to the request). These reasons may include, for example, malicious or other reasons such as: (1) research by an academic institution by one or more students or professors; (2) anticompetitive requests by one or more competitors; (3) requests by disgruntled former employees for nefarious reasons; (4) etc.

In particular embodiments, the system may, for example, maintain a database (e.g., in computer memory) of former employees. In other embodiments, the system may, for example: (1) identify a plurality of IP addresses associated with a particular entity (e.g., academic organization, competitor, etc.); and (2) substantially automatically reject a data subject access request that originates from the plurality of IP addresses. In such embodiments, the system may be configured to automatically add such identified IP addresses and/or domains to the blacklist.

In still other embodiments, the system is configured to maintain a listing of blacklisted names of particular individuals. These may include, for example, one or more individuals identified (e.g., by an organization or other entity) as submitting malicious data subject access requests).

Figure 47:
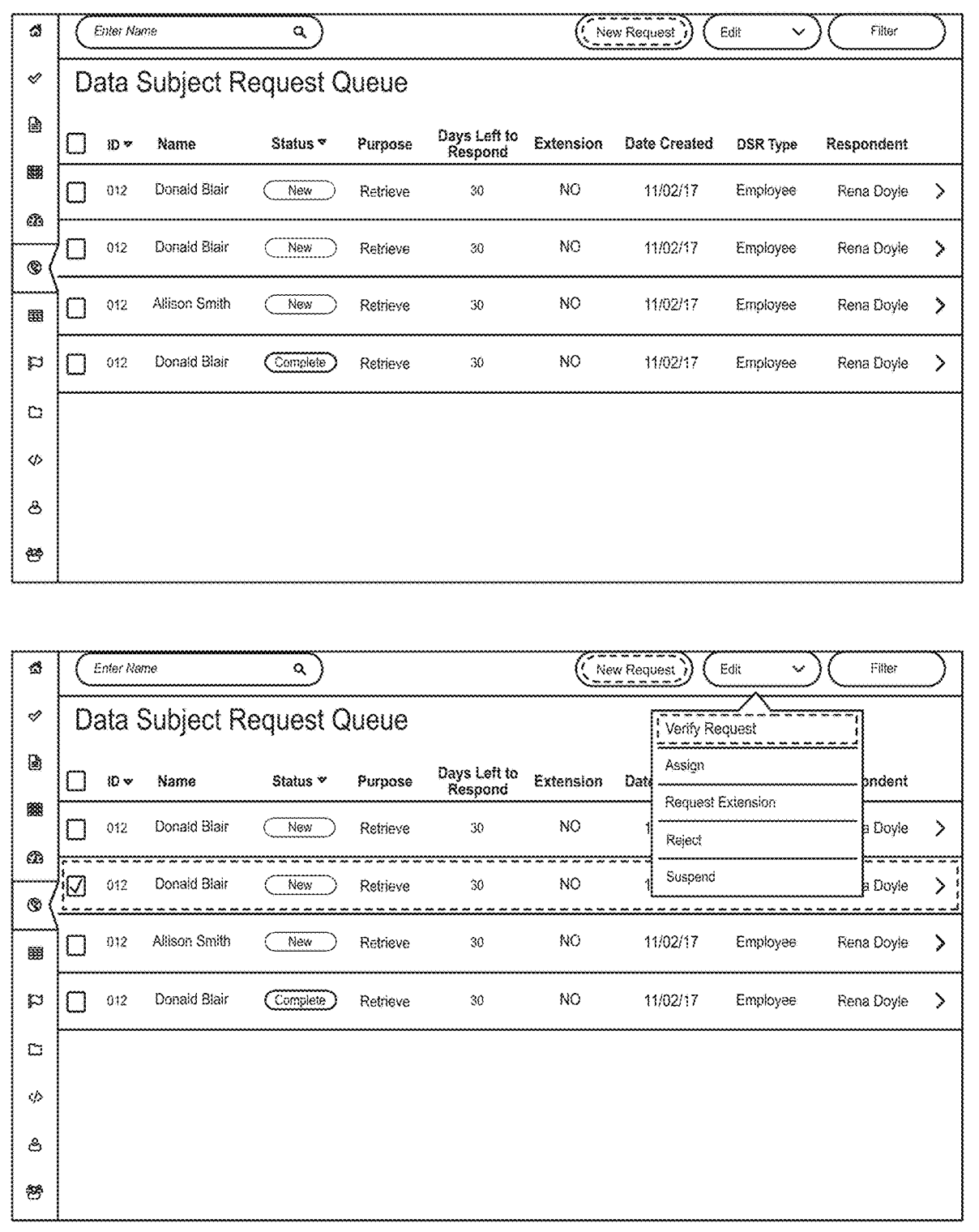
Figure 48:
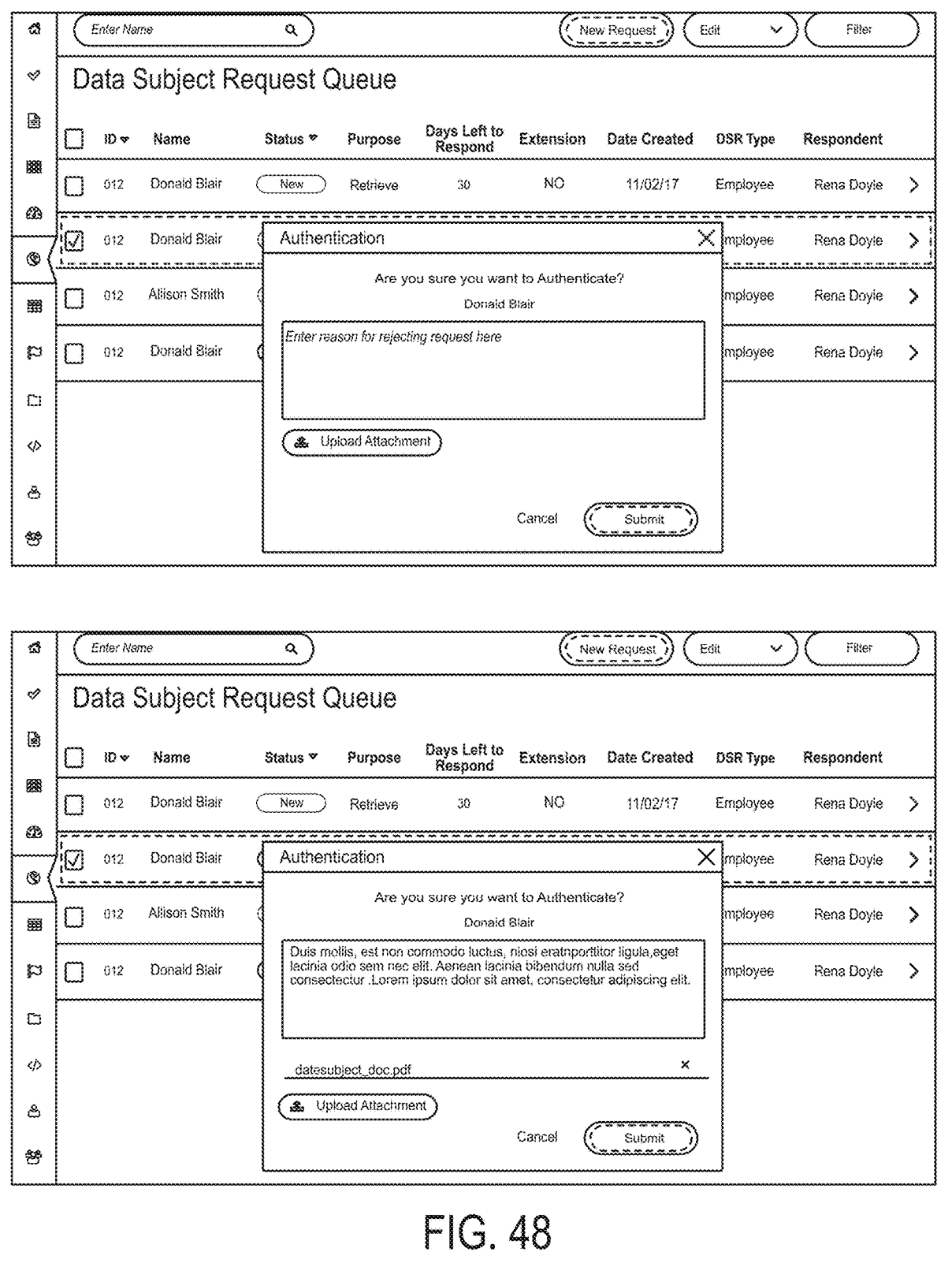

FIG. 47 depicts a queue of pending data subject access requests. As shown in this figure, the first three listed data subject access requests are new and require verification before processing and fulfillment can begin. As shown in this figure, a user (e.g., such as a privacy officer or other privacy controller) may select a particular request, and select an indicia for verifying the request. The user may also optionally select to reject the request. FIG. 48 depicts an authentication window that enables the user to authenticate a particular request. In various embodiments, the user may provide an explanation of why the user is authenticating the request (e.g., because the requestor successfully completed on or more out-of-wallet questions or for any other suitable reason). The user may further submit one or more attachments to support the verification. In this way, the system may be configured to document that the authentication process was performed for each request (e.g., in case there was an issue with improperly fulfilling a request, the company could show that they are following procedures to prevent such improper processing). In other embodiments, the system may enable the user to provide similar support when rejecting a request (e.g., because the requestor was blacklisted, made excessive requests, etc.).

Data Subject Access Request Fulfillment Cost Determination

In various embodiments, as may be understood in light of this disclosure, fulfilling a data subject access request may be particularly costly. In some embodiments, a company may store data regarding a particular data subject in multiple different locations for a plurality of different reasons as part of a plurality of different processing and other business activities. For example, a particular data subject may be both a customer and an employee of a particular company or organization. Accordingly, in some embodiments, fulfilling a data subject access request for a particular data subject may involve a plurality of different information technology (IT) professionals in a plurality of different departments of a particular company or organization. As such, it may be useful to determine a cost of a particular data subject access request (e.g., particularly because, in some cases, a data subject is entitled to a response to their data subject access request as a matter of right at no charge).

In particular embodiments, in response to receiving a data subject access request, the system may be configured to: (1) assign the request to at least one privacy team member; (2) identify one or more IT teams required to fulfill the request (e.g., one or more IT teams associated with one or more business units that may store personal data related to the request); (3) delegate one or more subtasks of the request to each of the one or more IT teams; (4) receive one or more time logs from each individual involved in the processing and fulfillment of the data subject access request; (5) calculate an effective rate of each individual's time (e.g., based at least in part on the individual's salary, bonus, benefits, chair cost, etc.); (6) calculate an effective cost of fulfilling the data subject access request based at least in part on the one or more time logs and effective rate of each of the individual's time; and (7) apply an adjustment to the calculated effective cost that accounts for one or more external factors (e.g., overhead, etc.) in order to calculate a cost of fulfilling the data subject access request.

In particular embodiments, the system is configured to substantially automatically track an amount of time spent by each individual involved in the processing and fulfillment of the data subject access request. The system may, for example, automatically track an amount of time between each individual opening and closing a ticket assigned to them as part of their role in processing or fulfilling the data subject access request. In other embodiments, the system may determine the time spent based on an amount of time provided by each respective individual (e.g., the individual may track their own time and submit it to the system).

In various embodiments, the system is configured to measure a cost of each particular data subject access request received, and analyze one or more trends in costs of, for example: (1) data subject access requests over time; (2) related data subject access requests; (3) etc. For example, the system may be configured to track and analyze cost and time-to-process trends for one or more social groups, one or more political groups, one or more class action groups, etc. In particular, the system may be configured to identify a particular group from which the system receives particularly costly data subject access request (e.g., former and/or current employees, members of a particular social group, members of a particular political group, etc.).

In particular embodiments, the system may be configured to utilize data subject access request cost data when processing, assigning, and/or fulfilling future data subject access requests (e.g., from a particular identified group, individual, etc.). For example, the system may be configured to prioritize requests that are expected to be less costly and time-consuming (e.g., based on past cost data) over requests identified as being likely more expensive. Alternatively, the system may prioritize more costly and time-consuming requests over less costly ones in the interest of ensuring that the system is able to respond to each request in a reasonable amount of time (e.g., within a time required by law, such as a thirty day period, or any other suitable time period).

Customer Satisfaction Integration with Data Subject Access Requests

In various embodiments, the system may be configured to collect customer satisfaction data, for example: (1) as part of a data subject access request submission form; (2) when providing one or more results of a data subject access request to the data subject; or (3) at any other suitable time. In various embodiments, the customer satisfaction data may be collected in the form of a suitable survey, free-form response questionnaire, or other suitable satisfaction data collection format (e.g., thumbs up vs. thumbs down, etc.).

Figure 49:
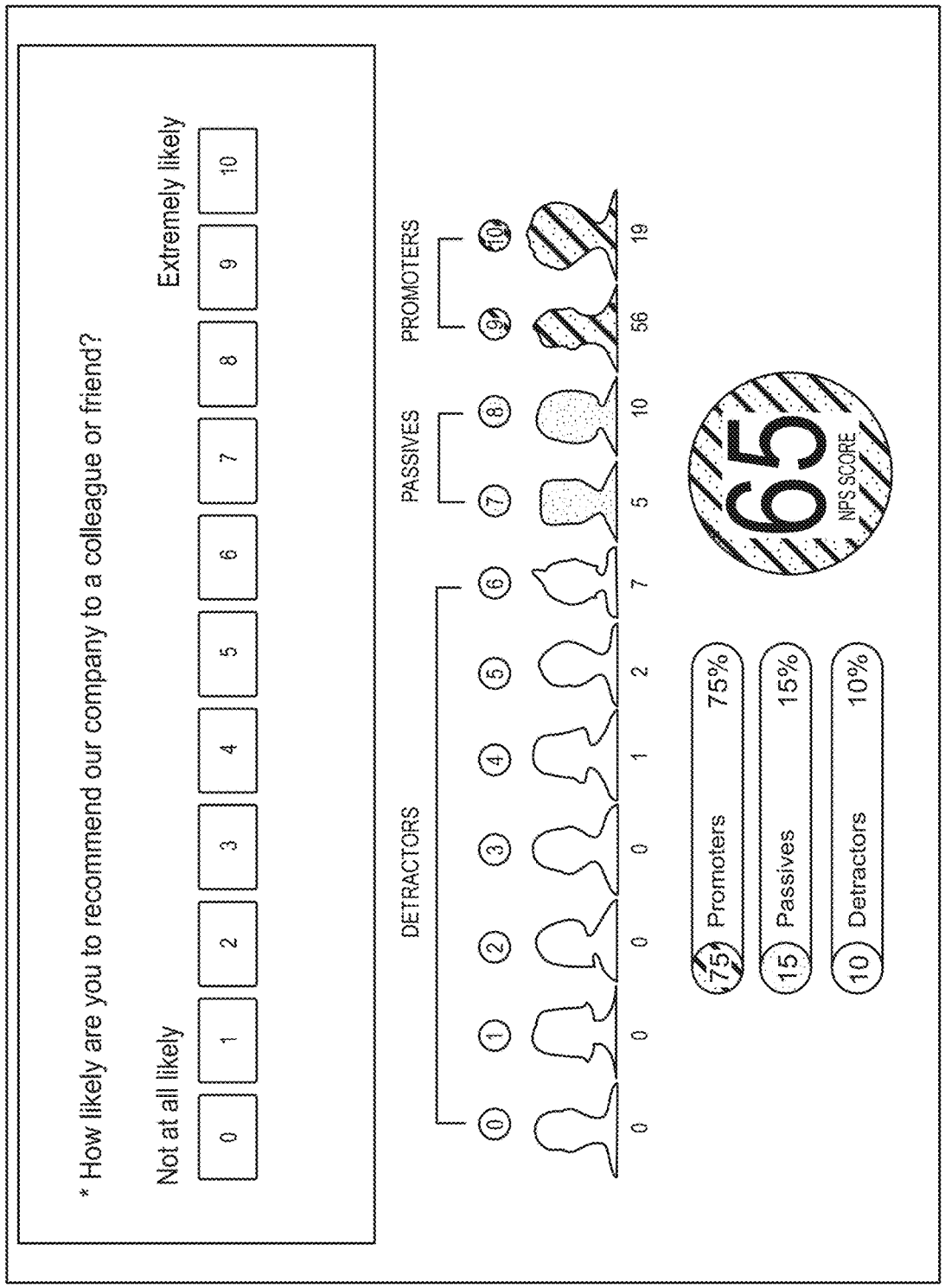

FIG. 49 depicts an exemplary customer satisfaction survey that may be included as part of a data subject access request form, provided along with the results of a data subject access request, provided in one or more messages confirming receipt of a data subject access request, etc. As shown in the figure, the customer satisfaction survey may relate to how likely a customer (e.g., a data subject) is to recommend the company (e.g., to which the data subject has submitted the request) to a friend (e.g., or colleague). In the example shown in FIG. 49, the satisfaction survey may relate to a Net Promoter score (NPS), which may indicate a loyalty of a company's customer relationships. Generally speaking, the Net Promoter Score may measure a loyalty that exists between a provider and a consumer. In various embodiments, the provider may include a company, employer, or any other entity. In particular embodiments, the consumer may include a customer, employee, or other respondent to an NPS survey.

In particular embodiments, the question depicted in FIG. 49 is the primary question utilized in calculating a Net Promoter Score (e.g., "how likely is it that you would recommend our company/product/service to a friend or colleague?"). In particular embodiments, the question is presented with responses ranging from 0 (not at all likely) to 10 (extremely likely). In particular embodiments, the question may include any other suitable scale. As may be understood from FIG. 49, the system may be configured to assign particular categories to particular ratings on the 10 point scale. The system may be configured to track and store responses provided by consumers and calculate an overall NPS score for the provider. The system may be further configured to generate a visual representation of the NPS score, including a total number of responses received for each particular score and category as shown in FIG. 49.

In various embodiments, the system may be configured to measure data related to any other suitable customer satisfaction method (e.g., in addition to NPS). By integrating a customer satisfaction survey with the data subject access request process, the system may increase a number of consumers that provide one or more responses to the customer satisfaction survey. In particular embodiments, the system is configured to require the requestor to respond to the customer satisfaction survey prior to submitting the data subject access request.

CONCLUSION

Although embodiments above are described in reference to various data subject access fulfillment systems, it should be understood that various aspects of the system described above may be applicable to other privacy-related systems, or to other types of systems, in general.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. In addition, it should be understood that terms such as "in some embodiments", "in various embodiments", and "in certain embodiments" are intended to indicate that the stated features may be implemented in any suitable embodiment described herein.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer system for processing a request to delete personal data from a plurality of computing devices associated with a particular organization, the computer system comprising:
   one or more computer processors;
   computer memory embodied in one or more computer storage locations operatively coupled to the one or more computer processors that stores particular computer code, wherein the computer system is configured for:
      receiving a plurality of delete personal data requests, each delete personal data request of the plurality of delete personal data requests being a request, from a respective data subject, to delete personal data associated with the data subject from one or more computer storage locations; and
      at least partially in response to receiving each respective delete personal data request:
         automatically using a data model to identify at least one computer storage location of the one or more computer storage locations on which first respective personal data associated with the respective data subject is stored, wherein: the data model:
            defines the at least one computer storage location utilized in the storage of a plurality of different items of personal data for each respective data subject as part of a processing activity;
            stores information regarding respective storage locations of the plurality of different items of personal data for each respective data subject; and
            comprises a respective data inventory for each of the one or more computer storage locations and maps one or more relationships between one or more aspects of each data inventory and the one or more computer storage locations; and
         automatically using the data model to identify the at least one computer storage location comprises using a unique identifier associated with the respective data subject in combination with the data model to identify the at least one computer storage location as storing the first respective personal data associated with the respective data subject; and
         at least partially in response to identifying the at least one computer storage location as storing the first respective personal data associated with the respective data subject, facilitating the deletion of the first respective personal data from the at least one computer storage location, wherein using the unique identifier associated with the respective data subject in combination with the data model to identify the at least one computer storage location as storing the first respective personal data associated with the respective data subject comprises:
            analyzing each respective data inventory to identify one or more data inventory attributes associated with each of the one or more computer storage locations; and
            scanning the one or more data inventory attributes using the unique identifier to determine the at least one computer storage location.

2. The computer system of claim 1, wherein the system is further configured for concurrently processing at least five of the plurality of delete personal data requests in an automated manner.

3. The computer system of claim 2, wherein the data model stores information regarding respective storage locations of a plurality of different respective items of personal data for each of a plurality of individuals other than the respective data subject.

4. The computer system of claim 1, wherein the system is further configured for facilitating the execution of multiple delete personal data requests in response to a single command from a user.

5. The computer system of claim 1, wherein the computer system is configured for at least partially in response to receiving each respective delete personal data request of the plurality of delete personal data requests:
   obtaining metadata regarding each respective data subject;
   using the metadata to determine whether a priority of each respective delete personal data request should be adjusted based on the metadata;
   in response to determining that the priority of a particular delete personal data request should be adjusted based on the metadata, adjusting the priority of the particular delete personal data request, wherein the metadata comprises metadata selected from a group consisting of: (A) a location from which each respective delete personal data request was made; (B) one or more current sensitivities to world events; and (C) a status of each respective data subject; and
   fulfilling the respective request according to the adjusted priority of the respective request.

6. The computer system of claim 1, wherein facilitating the deletion of the first respective personal data from the at least one computer storage location comprises the first respective personal data in computer memory associated with the at least one computer storage location.

7. The computer system of claim 1, wherein the unique identifier associated comprises a first unique identifier generated in response to receiving consent from the respective data subject for processing of the first respective personal data by the particular organization.

8. The computer system of claim 1 wherein:
   the data model further defines at least one transfer location to which the plurality of different items of personal data are transferred from the at least one computer storage location; and
   facilitating the deletion of the first respective personal data from the at least one computer storage location comprises facilitating the deletion of the first respective personal data from both at least one computer storage location and the at least one transfer location.

9. The computer system of claim 8, wherein the one or more computer storage locations comprise the at least one storage location.

10. A computer system for processing a request to delete personal data from a plurality of computing devices associated with a particular organization, the computer system comprising:
one or more computer processors;
computer memory embodied in one or more computer storage locations operatively coupled to the one or more computer processors that stores particular computer code, wherein the computer system is configured for:
receiving, by the one or more computer processors, a plurality of delete personal data requests, each delete personal data request being a request, from a respective data subject, to delete personal data associated with the data subject; and
at least partially in response to receiving each respective request of the plurality of requests:
automatically identifying, by the one or more computer processors, at least one computing device of the one or more computer storage locations on which the personal data associated with the respective data subject is stored, wherein identifying the at least one computing device comprises:
accessing, by the one or more computer processors, a data model defining:
at least one storage location where a plurality of pieces of personal data are stored as part of a processing activity;
at least one transfer location to which the plurality of pieces of personal data are transferred from the at least one storage location as part of the processing activity; and
using a unique identifier associated with the respective data subject, in combination with the data model, to identify the personal data associated with the respective data subject; and
in response to identifying, by the one or more computer processors, the at least one computing device on which the personal data associated with the respective data subject is stored, automatically facilitating deletion of the personal data associated with the respective data subject from the at least one storage location and the at least one transfer location, wherein:
the data model comprises a respective data inventory for each of the one or more computer storage locations and maps one or more relationships between one or more aspects of each data inventory and the one or more computer storage locations;
using the unique identifier associated with the respective data subject in combination with the data model to identify the personal data associated with the respective data subject comprises:
analyzing each respective data inventory to identify one or more data inventory attributes associated with each of the one or more computer storage locations; and
scanning the one or more data inventory attributes using the unique identifier to determine the at least one computing device of the one or more computer storage locations.

11. The computer system of claim 10, wherein the at least one computing device comprises both the at least one storage location and the at least one transfer location.

12. The computer system of claim 11, wherein the computer system is further configured for concurrently processing, by the one or more computer processors, at least five of the plurality of delete personal data requests in an automated manner.

13. The computer system of claim 11, wherein automatically facilitating the deletion of the personal data associated with the respective data subject from the at least one storage location and the at least one transfer location comprises overwriting the personal data associated with the respective data subject in computer memory associated with both the at least one storage location and the at least one transfer location.

14. The computer system of claim 10, wherein the unique identifier associated with the respective data subject comprises a unique identifier generated in response to receiving consent provided by the respective data subject for an initial storage of the personal data associated with the respective data subject as part of the processing activity.

15. The computer system of claim 10, wherein the at least one computing device on which the personal data associated with the respective data subject is stored comprises identifying the at least one computing device using one or more data modeling means.

16. The computer system of claim 10, wherein the method further comprises:
identifying a first processing activity under which the respective data subject has previously provided consent for the collection of personal data; and
electronically accessing a first data inventory associated with the first processing activity, the first data inventory identifying:
a first data asset of the one or more computer storage locations on which the personal data collected as part of the first processing activity is stored;
transfer data associated with the first data asset; and
access data associated with the first data asset; and
facilitating the deletion of the personal data associated with the respective data subject from the one or more computer storage locations by:
automatically assigning a first task to delete the personal data associated with the respective data subject from the first data asset;
identifying a second data asset based at least in part on the transfer data;
automatically assigning a second task to delete the personal data associated with the respective data subject from the second data asset;
identifying a third data asset based at least in part on the access data; and
automatically assigning a third task to delete the personal data associated with the respective data subject from the third data asset.

17. A personal data processing and deletion system comprising;
one or more processors;
one or more data assets that store a plurality of personal data associated with a plurality of data subjects, each piece of the plurality of personal data being associated with a respective particular processing activity of a plurality of processing activities undertaken by an organization; and
computer memory, wherein:
the computer memory stores one or more data models defining one or more data transfers among the one or more data assets; and the data processing and deletion system is configured for:
receiving a first data subject request associated with a first data subject from a remote computing device, the first data subject request comprising a request to delete one or more first pieces of personal data from the personal data processing and deletion system, one or more first pieces of personal data being associated with the first data subject;
in response to receiving the first data subject request, identifying, based at least in part on the one or more data models and the plurality of processing activities undertaken by the organization, a respective storage location of each of the one or more first pieces of personal data on the one or more data assets; and
in response to identifying the respective storage location of each of the one or more pieces of personal data, automatically facilitating the deletion of each of the one or more first pieces of personal data from each respective storage location, wherein:
the one or more data models comprise a respective data inventory for each of the one or more data assets and maps one or more relationships between one or more aspects of each data inventory and the one or more data assets; and the data processing and deletion system is further configured for using a unique identifier associated with the first data subject in combination with the one or more data models to identify the one or more first pieces of personal data data subject comprises:
analyzing each respective data inventory to identify one or more data inventory attributes associated with each of the one or more data assets; and
scanning the one or more data inventory attributes using the unique identifier to determine the respective storage location of each of the one or more first pieces of personal data on the one or more data assets.

18. The personal data processing and deletion system of claim 17, wherein automatically facilitating the deletion of each of the one or more first pieces of personal data from each respective storage location comprises overwriting each of the one or more first pieces of personal data at each respective storage location.

19. The personal data processing and deletion system of claim 17, wherein the personal data processing and deletion system is further configured for concurrently processing, by the one or more processors, a plurality of data subject requests simultaneously.

* * * * *